United States Patent [19]
Sotoda et al.

[11] Patent Number: 5,835,641
[45] Date of Patent: Nov. 10, 1998

[54] IMAGE PICK-UP APPARATUS FOR DETECTING AND ENLARGING REGISTERED OBJECTS

[75] Inventors: Shuji Sotoda; Yoshihiro Nishida; Takashi Nakajima; Shigeki Tsuji, all of Nagaokakyo, Japan

[73] Assignee: Mitsubishi Denki Kabushiki Kaisha, Tokyo, Japan

[21] Appl. No.: 584,154

[22] Filed: Jan. 11, 1996

Related U.S. Application Data

[63] Continuation of Ser. No. 133,300, Oct. 8, 1993, abandoned.

[30] Foreign Application Priority Data

| Oct. 14, 1992 | [JP] | Japan | 4-275801 |
| Oct. 23, 1992 | [JP] | Japan | 4-309659 |
| Oct. 26, 1992 | [JP] | Japan | 4-287673 |
| Nov. 27, 1992 | [JP] | Japan | 4-318485 |

[51] Int. Cl.$^6$ .............. G06K 9/36; G06K 9/32; G06K 9/20; G06K 9/40
[52] U.S. Cl. .......... 382/291; 348/240; 348/358; 348/169; 382/298; 382/282; 382/103; 382/255
[58] Field of Search .................. 382/298, 282, 382/291, 292, 255, 293, 103; 348/347, 348, 352, 358, 361, 240, 345, 169

[56] References Cited

U.S. PATENT DOCUMENTS

| 4,291,334 | 9/1981 | Mese et al. | 348/94 |
| 4,843,475 | 6/1989 | Imai | 348/358 |
| 4,942,417 | 7/1990 | Miyazawa et al. | 354/400 |
| 5,005,083 | 4/1991 | Grage et al. | 358/181 |
| 5,063,603 | 11/1991 | Bust | 382/115 |
| 5,083,201 | 1/1992 | Ohba | 348/399 |
| 5,086,480 | 2/1992 | Sexton | 382/18 |
| 5,113,214 | 5/1992 | Nagata | 348/305 |
| 5,121,152 | 6/1992 | Wagner | 342/345 |
| 5,140,357 | 8/1992 | Suda | 348/347 |
| 5,173,807 | 12/1992 | Kaneda et al. | 348/305 |
| 5,223,934 | 6/1993 | Hong | 348/240 |
| 5,325,206 | 6/1994 | Fujita | 348/347 |
| 5,420,632 | 5/1995 | Yamagiwa | 348/240 |

FOREIGN PATENT DOCUMENTS

| 61-255173 | 11/1986 | Japan | H04N 5/232 |
| 61-269475 | 11/1986 | Japan | H04N 7/00 |
| 2-157980 | 6/1990 | Japan | H04N 5/232 |

OTHER PUBLICATIONS

Photographic Industries, vol. 48, No. 11, (no translation) Nov. 1990, pp. 76–78, Shashin Kogyo Publishing Co, Ltd.

*Primary Examiner*—Bipin Shalwala

[57] ABSTRACT

An image pick-up apparatus having an optical zoom mechanism and an electronic zoom mechanism, wherein the optical zoom mechanism and the electronic zoom mechanism are adjusted in accordance with information on a position and size of an area recognized as an object (a human face). An image pick-up apparatus in which the control gain for restoring the rotating lens barrel to a reference position is increased by static detection of a housing, thereby attaining a compatibility between a high vibration-proofing performance and a high-accuracy origin restoration. A motion vector detection apparatus, in which by making the motion vector detection area movable, a motion vector is detected without any feeling of disorder regardless of the image pattern. An image swing correction apparatus is also disclosed in which the phase of a read clock of a video memory is adjusted in accordance with the result of detection of a time-base error of the video signal, and read out by a clock of regular intervals. The time base of the video signal is thus corrected while at the same time moving the read position of the video memory in accordance with the result of detection of the swing amount of the whole image, thereby correcting the swing of the whole image.

4 Claims, 46 Drawing Sheets

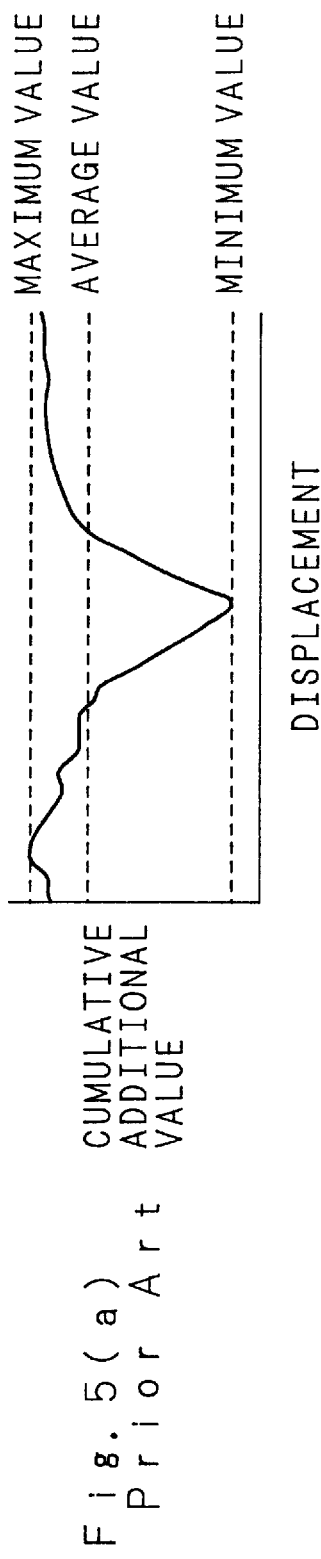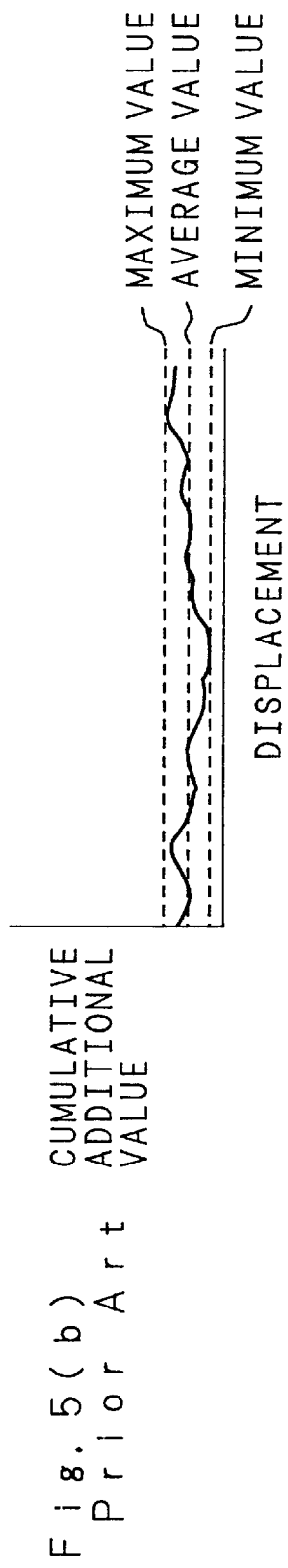

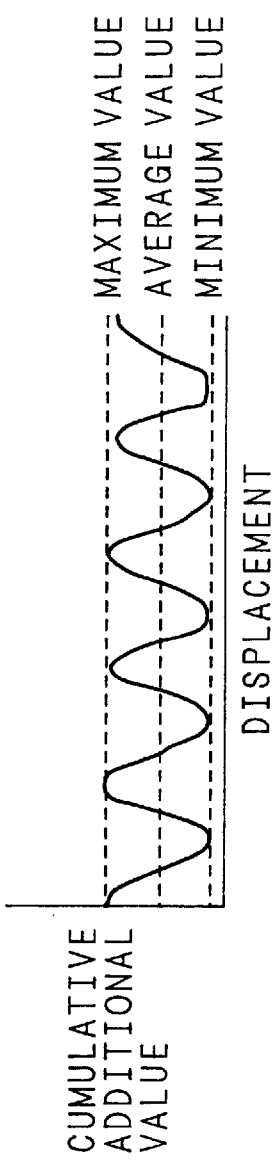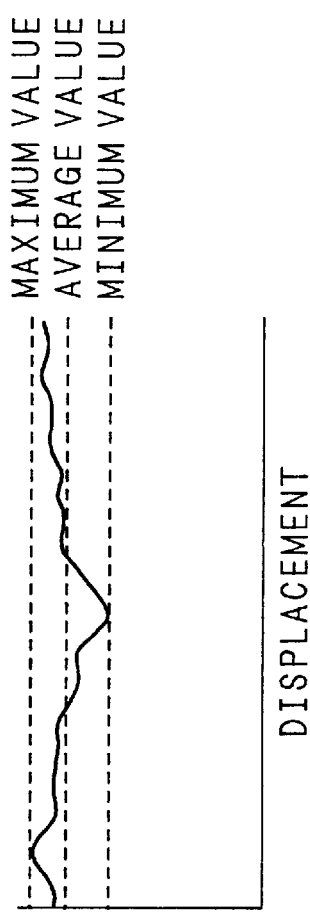
Fig. 5(c) Prior Art
Fig. 5(d) Prior Art

IMAGE PICK-UP APPARATUS FOR DETECTING AND ENLARGING REGISTERED OBJECTS

This application is a continuation, of application Ser. No. 08/133,300 filed on Oct. 8, 1993, now abandoned.

BACKGROUND OF THE INVENTION

1. Field of the Invention

The present invention relates to an image pick-up apparatus used for camcorders, a motion vector detection apparatus for detecting the motion of an image from a video signal, and an image swing correction apparatus for correcting the swing of the whole image due to vibrations or the like of the video camera.

2. Description of the Related Art

In recent years, automatic control techniques for video movies have become indispensable. At present, some single-lens reflex cameras have an auto zoom function for adjusting the zoom automatically in accordance with the distance of the object. The auto zoom function used for the single-lens reflex camera will be explained below.

FIG. 1 is a block diagram showing a conventional image pickup apparatus. In this diagram, 1 designates a lens barrel including a zoom lens 21 and a focus lens 22. Although the lens barrel 1 is composed of more lenses, such lenses are not shown. A motor driver 10 drives a zoom motor 11 for moving the zoom lens 21 in accordance with a zoom command from a zoom lens controller 9. A motor driver 6 drives a motor 7 for moving the focus lens 22 in accordance with a focus command from a focus lens controller 5. A zoom lens position detector 12 detects the position of the zoom lens 21 and outputs a signal corresponding to the lens position. A focus lens position detector 8 detects the position of the focus lens 22 and outputs a signal corresponding to the lens position. The image of the object is formed on a light-receiving surface 2 through the zoom lens 21 and the focus lens 22. In this conventional apparatus, a film is placed on the light-receiving surface 2.

An infrared ranging unit 23 emits an infrared ray toward the object and by receiving the infrared ray reflected by the object, measures the distance from the camera to the object. The distance information obtained by the infrared ranging unit 23 is sent to the focus lens controller 5. The focus lens controller 5 controls the motor driver 6 in accordance with the distance information to thereby drive the focus lens 22. The distance information obtained by the infrared ranging unit 23 is also sent to the zoom lens controller 9. The zoom lens controller 9 controls the motor driver 10 and drives the zoom lens 21 in such a manner as to secure a predetermined size of the object on the light-receiving surface 2 on the basis of the distance information obtained from the infrared ranging unit 23 and the focal length information of the lens obtained in advance. The foregoing operations make it possible to produce an image of the object of constant size on the light-receiving surface 2.

The auto zoom described above is a function originally developed for taking a static image from a still or single-lens reflex camera, and does not take the pick-up of a dynamic image into consideration. In the case where the object moves and reaches an end of the screen displaced from the center thereof, for example, the infrared ranging unit 23 undesirably measures the distance to the background instead of to the object, causing an incorrect auto zoom operation. In the case where the zoom lens is on the tele-side, on the other hand, a slight movement of the camera causes the object in the screen to displace considerably. It is then not an easy matter to track the object, thereby making it very difficult to assure sufficient functions of the auto zoom.

A hand error correction mechanism used with conventional portable video cameras or the like is disclosed, for example, in Japanese Patent Application Laid-Open No. 61-255173 (1986). FIG. 2 is a diagram showing the configuration of a conventional image pick-up apparatus. In FIG. 2, numeral 51 designates a lens barrel (optical system), 52 a gimbal mechanism for supporting the lens barrel 51, numeral 53 an actuator for driving the lens barrel 51, numeral 54 an angler sensor for detecting the relative angles between the lens barrel 51 and a housing (not shown), numeral 55 an angular velocity sensor for detecting the angular velocity generated in the lens barrel 51, numeral 56 a variable amplifier for applying a predetermined gain on the output of the angle sensor 54, numeral 57 a variable amplifier for applying a predetermined gain on the output of the angle sensor 55, numeral 59 an adder for adding the outputs of the variable amplifiers 56, 57, numeral 60 an actuator driver circuit for driving the actuator 53 from the output of the adder 59, numeral 61 an image pick-up device for taking the image of the object through the lens barrel 51, and numeral 62 a signal processor for processing the video signal produced from the image pick-up device 61.

The lens barrel 51 and the image pick-up device 61 are supported rotatably on two orthogonal shafts by the use of the gimbal mechanism 52. The actuators mounted on the two rotational shafts control the lens barrel 51 to remain stationary with respect to the absolute coordinate system. The angular velocity generated in the lens barrel 51 by external disturbances such as hand error or vibrations is detected by the sensor 55, and in accordance with a value from the sensor 55, the actuator 53 is driven. This is called the angular velocity loop. Basically, this control system performs a vibration-proofing function.

In order to constitute a practical image pick-up apparatus, the center axis of the lens barrel 51 is desirably coincident with that of the housing. The relative angle between the center axis of the lens barrel 51 and that of the housing is detected by an angle sensor 54 such as a Hall device, and the driving of an actuator is controlled in accordance with a control value associated with the detected value. This control system is called the angular loop which allows an operation in a frequency band lower than the angular velocity loop. This control loop is used to operate the apparatus in such a manner that the lens barrel 51 coincides with the center axis of the housing.

If the hand error is to be corrected in this control system, it is necessary to greatly increase the gain of the angular velocity loop relative to that of the angular loop. As a result, a problem exists where the relative angle between the lens barrel and the housing is very small, the output of the actuator is so small that taking the loss component of the rotational shaft into consideration, it is impossible to restore the lens barrel completely to the center axis. Especially when the mechanical system is small and light weight, this problem may become serious as the loss component due to the friction of the rotational shaft or the like increases relatively.

Also, the recent desire for reduced size and weight video cameras and the resulting trend toward smaller hardware and an improved versatility for processing increasingly makes it a practice to use a microcomputer to perform digital control processing. When a control system is constituted by a digital circuit, the number of effective bits is limited, and therefore a small value below one bit often fails to be produced. In such a case, the problem is that restoration of the lens barrel to the origin is not satisfactory.

A method for obviating such a problem is to add an integrating element to the angular loop of the control system. The disadvantage of this method, however, is a large overshoot generated in the output. This causes the lens barrel passing the origin in returning thereto, thereby considerably deteriorating the operability of the image pick-up apparatus. This operation poses an especially serious defect in transferring to static imaging.

In order to compensate for the motion to improve the encoding efficiency and to correct the drift of the screen due to the vibration or swing of the camera, a method has conventionally been used to detect the amount of parallel movement of the screen, i.e., the motion vector.

Since the actual image motion is a mixture of parallel movement of the whole image and the movement of the object in the image, however, image-dependent problems have occurred. For example, the vector is detected erroneously depending on the motion of the object or the detection accuracy is reduced according to the image pattern.

In detection of a motion vector, in particular, the correlationship of image information between chronologically successive two screens is calculated, and the amount of deviation highest in correlation is assumed to be a vector among correlation values obtained. In the motion vector detection without any image change or the same image pattern repeated periodically, therefore, the possibility of erroneous detection is very high.

In the case where a moving object enters the screen while the drift due to the hand error is intended to be corrected, only the motion vector detected from the background portion should be used but not the motion vector detected from the moving object. As a result, it is required to avoid utilizing the detected motion vector directly and to make selection appropriately according to the prevailing circumstances.

In view of this, according to the prior art, as disclosed in Japanese Patent Application Laid-Open No. 61-269475 (1986), an image is divided, and the candidate vector is calculated for each divided screen. For the divided screen lacking a change in image pattern, for example, the candidate vector therefor is determined to be ineffective and is removed from the final calculation of the motion vector.

FIG. 3 is a block diagram showing the configuration of a conventional motion vector detector. In this conventional apparatus, five fixed motion detection areas (HL, HR, LL, LR, CT) are included as an example for explanation. In FIG. 3, numeral 100 designates a video signal input terminal, 101 a typical point memory for storing the value of the typical points of the preceding screens, 102 an absolute value calculator for calculating the absolute value of the difference between the picture elements around the typical points of the preceding and present screens, 103 an HL area gate circuit for passing the calculation result of the absolute value only during the detection timing of the HL area, 104 an HL area cumulative adder circuit for detecting the motion of the HL area, and 105 an HL area reliability analyzer for deciding the reliability of the detection result from the manner in which the HL area cumulative addition has been made.

Numerals 106 to 117 designate gate circuits, cumulative adders and reliability analyzers for the HR, LL, LR and CT areas respectively. Numeral 118 designates a motion vector determiner for determining the final motion from the whole screen from the motion vector value and the reliability of each area.

In the conventional motion vector detector shown in FIG. 3, the input terminal 100 is supplied with a video signal continuous for a period of at least two fields. As shown by numerals 141, 142, 143, 144, 145 in FIG. 4, five motion vector detection areas (HL, HR, LL, LR and CT) are determined in the screen. The motion vector is detected by the correlation between successive screens for each divided screen.

In determining the correlation, the absolute value of the difference between the typical point Rij of the preceding screen and the signal Sij (x, y) of the present screen related to the horizontal position x and the vertical position y is determined, and Dxy is calculated by adding a predetermined number of blocks for x, y in the same relative positions for each typical point.

$$Dxy = \Sigma |Rij - Sij(x, y)|$$

Generally, the displacement (x, y) giving a minimum value of Dxy is detected and used as a motion vector. Also, the minimum value, the maximum value and the average value of Dxy are determined, and together with the value of the motion vector, are applied to the motion vector reliability analyzers 105, 108, 111, 114, 117. Dxy indicates a typical pattern according to the characteristics of the particular screen. For facilitating understanding, the relation between the displacement (x, y) and the cumulative sum Dxy as viewed one-dimensionally is shown in FIGS. 5(a) to 5(d).

FIG. 5(a) shows a case where maximum value>average value>>minimum value. This indicates that even when the image pattern is an ideal one varying as a whole, the reliability of the motion vector value obtained is very high.

FIG. 5(b) represents a case in which maximum value≈average value≈minimum value≈0. In this case, the image pattern is not varying as in the case where the image of the blue sky or the plain wall is taken. The reliability of the motion vector value obtained is so low that it should be assumed to be ineffective.

In the case of FIG. 5(c), the relation that maximum value>>average value ≈minimum value is indicated. This is the case in which, as when the image is taken of a blind, for example, the change in brightness is repeated regularly. The reliability of the motion vector value obtained is also low in this case.

FIG. 5(d) is a case in which maximum value≈average value≈minimum value>>0. In this case, as when the camera was swung for taking an image, for example, the image is subjected to an excessive change. The motion vector value obtained in this case is also low in reliability.

In accordance with these characteristics, the reliability analyzers 105, 108, 111, 114, 117 determine the reliability of the motion vector on the basis of the maximum value, the average value and the minimum value for each divided screen. The motion vector determiner 118 determines the average value of the motion vector in an area decided to be high in reliability as a motion vector for the whole of the screen.

In the above-described apparatus, reliability is analyzed from the maximum value, the average value and the minimum value of a correlation, and the average value of the motion vector high in reliability is determined as a motion vector for the whole screen. Various other algorithms, however, are conceivable. For example, reliability may be determined from the second smallest correlationship or the chronological change thereof. Even when there are several vector values determined high in reliability, the direction of each vector is investigated to decide whether the same or different objects are involved. As an alternative, in the case where analysis is different, it is decided whether the motion vector for the whole screen should be made 0, an average value should be taken or judgement should be made to decide which is the main object to assume the value of the area of the main object.

In this configuration, however, the area decided low in reliability is ignored. In the case where reliability is low for all the areas, for example, the problem is that the detection value of the motion vector for the whole screen is determined zero. Another problem is that in the case where there are only a few areas of high reliability, the accuracy is very low for the final motion vector detection value which may be determined from an average value.

In recent years, the ownership of a video camera has spread rapidly with the reduction in size and the automation of operation. There are increased chances for inexperienced beginners to operate a video camera. When beginners lacking a sufficiently high image-taking techniques attempt to operate the camera, it often happens that a hand error causes an image disturbance, making the picked-up image very offensive to the eyes. This poses a serious problem with an increased magnification of the zoom lens. A countermeasure suggested so far is an image pick-up apparatus having the function of hand error correction. An example is described below.

FIG. 6 is a block diagram showing a conventional image swing correction system. In FIG. 6, numeral 301 designates an video signal input terminal, 302 an A/D converter for converting the video signal inputted at the input terminal 301 into a digital signal, 303 a field memory for storing a field of the video signal converted into a digital signal by the A/D converter 302, numeral 304 a motion vector detector for detecting the motion vector for each field of the whole image from a digitally-converted video signal produced from the A/D converter 302, numeral 305 an address generator for generating a read address for the field memory 303 by integrating the motion vector detected by the motion vector detector 304, numeral 306 a memory controller for controlling the read operation from the field memory 303 in accordance with the output of the address generator 305, numeral 307 an interpolation /enlargement circuit for interpolating and enlarging the video signal read from the memory 303, and numeral 308 a D/A converter for producing as an output by converting the output signal of the interpolation/enlargement circuit 307 into an analog signal.

The operation is explained. The video signal applied to the input terminal 301 is converted into a digital signal by the A/D converter 302. The output of the A/D converter 302 is sent out to the field memory 303 and the motion vector detector 304 respectively. The motion vector detector 304 detects the motion vector of the image for each field by the well-known typical-point matching method, and applies the output to the address generator 305. The address generator 305 determines a read address for the field memory 303 from the image motion vector for each field produced from the motion vector detector 304 and applies the address to the memory controller 306. A field of video signal produced from the A/D converter 302 is written in the field memory 303. The memory controller 306 controls the write/read operation of the field memory 303. The output of the A/D converter 302 is written into the field memory 303 for the whole screen of a field, whereas the same output is read out for an area smaller than the screen written. The read position is changed in accordance with the address produced from the motion vector detector 304. As a result, the image swing is reduced.

This principle is explained with reference to FIG. 7. In FIG. 7, numeral 311 designates a screen written into the field memory 303, numerals 312a, 312b screens read from the field memory 303, and numerals 313a, 313b objects in the screens. Assume that the object 313a in the write screen 311 in a given field moves to the position 313b in the next field due to image swing, and the motion vector is given as $\Delta v$. By moving the read screen to the position 312b by $\Delta v$ from the position 312a, the object in the read screen can be fixed at a predetermined position. This operation is repeated for every field, thereby eliminating continuous drifts contained in the picked-up image. The read address of the field memory 303 produced from the address generator 305, therefore, should be the sum of the initial value of the address and the integrated value $\Sigma \Delta v$ of the motion vector from the start of the image swing correcting operation.

The video signal of which the image swing has been corrected in the aforementioned manner is interpolated and enlarged at the interpolation/enlargement circuit 307 to the size of the input screen, and is produced as an output by being converted into an analog signal at the D/A converter 308.

The present mainstream of the image swing correction system used in home appliances is of a type in which the correction system is incorporated in a camcorder for correcting the image swing at the time of taking an image. An example is shown in FIG. 8. In FIG. 8, numeral 321 designates a lens section for forming an optical image of an object, 322 a photoelectric unit for converting the optical image formed by the lens section 321 into an electrical signal, 323 an image swing correction unit having the same structure as shown in FIG. 6 for detecting and correcting the drift of the whole image constituted by the video signal produced from the photoelectric unit 322, and numeral 324 a VCR for recording and reproducing the video signal with the image swing corrected as produced from the image swing correction unit 323.

The image swing correction system shown in FIG. 6, which operates by cutting out a part of the image outputted from the camera section and restoring it to the original screen size by interpolation, however, is essentially accompanied by image quality deterioration. It is desirable to use the image swing correction function only against a sharp image swing. The image swing should not be corrected at the time of picking up an image as shown in FIG. 8, but the portion requiring the correction of an image swing should be advantageously selected while watching the reproduced screen after picking up the image.

The problem of image swing on the monitor screen includes playback jitter on the VCR due to the time-base error of the video signal as well as those caused by vibrations of the image pick-up apparatus due to hand error. In the case where the VCR used for reproducing an image conforms to the home-use VCR and U-matic standards such as Betamax, VHS or 8-mm standards, the video signal reproduced is not corrected on the time base of the luminance signal except for certain models, and often contain time-base error against the normal video signal standards. The image picked up by the video camera, for its characteristics, often requires compilation. When the image is dubbed leaving the time-base error uncorrected, however, the time-base error will be accumulated thereby posing the problem of ugly drift generated in the reproduced image due to the time-base error.

SUMMARY OF THE INVENTION

An object of the invention is to provide an image pick-up apparatus intended to pick up dynamic images, in which the object is not necessarily placed at the center of the screen and an accurate function is assured even when the object moves to either side.

Another object of the invention is to provide an image pick-up apparatus in which a high vibration-proofing performance and a high-precision origin restoration are compatible with each other even with a low-resolution controller.

Still another object of the invention is to provide a motion vector detection apparatus capable of detecting a motion vector with high precision without any sense of incompatibility and an image swing correction apparatus using such a motion vector detection apparatus even for an image pattern having only a small area where a reliable motion vector can be detected.

A further object of the invention is to provide an image swing correction apparatus capable of correcting the swing of the whole image as well as time-base error.

An image pick-up apparatus according to a first aspect of the invention has means for performing the optical zoom, electronic zoom means for enlarging a digital video signal, means for recognizing an object (a human face, for example) from the video signal, and zoom control means for controlling the optical zoom means and the electronic zoom means from the information on the position and size of the object (a human face, for example). This image pick-up apparatus, in which the zoom is adjusted to secure a predetermined size of the object, is capable of producing a stable image of the object even while moving.

In the image pick-up apparatus according to the first aspect of the invention, a moving object can be tracked easily if the apparatus further has means for displaying an image before being enlarged by the electronic zoom means.

In the image pick-up apparatus according to the first aspect of the invention, a stable image of the object can be produced even when the object is moving and at the same time the enlargement of an image only with the optical zoom produces a high-quality image, in the case where the apparatus has means for moving the optical axis in place of the electronic zoom means so that the optical zoom means and the optical axis moving means are controlled based on the information on the position and size of the object (a human face, for example).

In the image pick-up apparatus according to the first aspect of the invention, an always-focused image is produced of the object, in the case where the apparatus further has means for changing the detection area for detecting the focal point by the use of the information on the position and size of the object.

An image pick-up apparatus according to a second aspect of the invention has a lens barrel for taking an image of an object, means for converting an optical image from the lens barrel into an electrical signal, means for holding the lens barrel and the photoelectric converter integrally, means for supporting the holding means rotatably in the panning and/or pitching direction, an actuator for rotationally driving the holding means, means for restoring the holding means to a reference position by a control value proportional to the relative angle to an apparatus housing, and means for detecting the static condition of the housing, the control gain to the restoration means being increased when it is decided that the housing is static. In the image pick-up apparatus according to the second aspect of the invention, upon detection of a static image-taking condition, the gain of the angular loop is increased in the lens barrel control system. As a result, that component of the drive output applied to the actuator which is proportional to the output value of the angular sensor is increased.

In the image pick-up apparatus according to the second aspect of the invention, assume that a static state of the housing is decided from the fact that the angular velocity of the housing is low for a predetermined length of time and a normal state decided when the angular velocity of the housing has reached a predetermined value. The static condition of the image pick-up apparatus can thus be positively detected, so that the lens barrel is restored to the reference position when the angular velocity of the housing is below a predetermined time.

In the image pick-up apparatus according to the second aspect of the invention, assume that the control gain of the relative speed is increased in proportion to the time of static state. Upon detection of a static condition, that component of the drive voltage for driving the actuator which is proportional to the relative angle between the lens barrel and the housing increases in proportion to the time of static state, thereby reducing the feeling of incompatibility which may be sensed at the time of mode switching.

In the image pick-up apparatus according to the second aspect of the invention, assume that the configuration is such that a static condition that may be detected is displayed to the operator through a view finder or the like. The feeling of incompatibility which may be sensed by the operator at the time of mode switching is reduced.

In the image pick-up apparatus according to the second aspect of the invention, assume that a static condition is decided when a fixing device such as a tripod is attached to the housing. The static condition of the image pick-up apparatus can positively be detected, and the lens barrel is restored when a fixing device such as tripod is attached to the housing.

In the image pick-up apparatus according to the second aspect of the invention, it is assumed that the configuration is such as to further have another restoration means for fixing the holding means mechanically, which restoration means is operated when it is decided that the housing is static and the holding means is restored to the reference position. Upon detection of a static condition, the lens barrel is mechanically restored to the reference position to conserve the power consumption.

A motor vector detection apparatus according to a third aspect of the invention has means for forming a plurality of detection areas in the screen and detecting the correlation value for a predetermined deviation between screens with respect to each detection area, means for determining a motion vector for each detection area from the correlation value, means for permitting a predetermined number of the detection areas to be movable, and means for determining the motion vector for the whole screen by the use of the motion vector for each area. In the motion vector detection apparatus according to the third aspect of the invention, a detection area can be moved. The user can relocate a detection area, for example, taking the position of the object and the image pattern into consideration.

In the motion vector detection apparatus according to the third aspect of the invention, assume that the reliability of the motion vector for each detection area is analyzed, and on the basis of the result of analysis, the motion vector for the whole screen is determined by the use of the motion vector for each area while at the same time moving a movable detection area. Then a detection area can be set automatically without any designation from the user.

In the motion vector detection apparatus according to the third aspect of the invention, assume that the correlation detection point for a movable detection area is arranged not to double over that for another detection area. Then the motion vector can be detected from a greater number of detection points.

In the motion vector detection apparatus according to the third aspect of the invention, assume that a movable detection area is considered a tracking area so that the motion vector is detected only from the tracking area and the tracking area is moved in accordance with the motion of the object in the tracking mode. Then the tracking area in tracking mode may be used as a movable area for swing correction at the same time.

An image swing correction apparatus consists of the motion vector detection according to the third aspect of the invention, storage means for storing the video signal of one field or more, and means for controlling the read position of the storage means on the basis of the motion vector detected by the motion vector detection apparatus.

An image swing correction apparatus according to a fourth aspect of the invention has means for detecting time-base error of the video signal, a memory capable of reading and writing the video signal, means for detecting image swing from the video signal, means for generating a write clock signal for controlling the write phase of the video signal of the memory in such a manner as to correct the time-base error of the video signal in accordance with the detection output of the time-base error detector and also a read clock for controlling the read phase of the memory in stable cycles, means for controlling the write operation of the memory in accordance with the timing of the write clock signal produced by the clock generator, and means for controlling the read phase of the memory in accordance with the timing of the read clock pulses produced from the clock generator and also the read address of the memory in accordance with the amount of swing detected by the image swing detector, thereby reducing the image swing.

In the image swing correction apparatus according to the fourth aspect of the invention, in accordance with the result of detection of a time-base error of the applied video signal, the phase of the write clock signal for the memory is adjusted and read out by clock pulses of predetermined intervals, thereby correcting the time base of the video signal. At the same time, in accordance with the result of swing detection for the whole screen made up of the video signal, the read position of the memory is moved, thereby correcting the swing of the whole screen. The image swing due to the time-base error and due to the hand errors are thus removed simultaneously.

In the image swing correction apparatus according to the fourth aspect of the invention, assume that an image for a field or a frame is stored with a plurality of predetermined picture elements making up the image as typical points, the correlationship between the typical points and the surrounding picture elements for one field or one frame are detected, and the write phase for storing the typical points and the phase for the correlation detecting operation are controlled in accordance with the write clock signal produced from the clock generator. Then the relative positions between the typical points and the picture elements for correlationship detection are prevented from becoming unstable by the time-base error of the video signal.

In the image swing correction apparatus according to the fourth aspect of the invention, assume that a first read clock signal generator for generating a clock signal having a frequency equivalent to a mean frequency of the write clock signal or a second read clock signal generator for generating a clock signal of a frequency of a predetermined crystal accuracy is selected, and a read sync signal is generated with reference to the second read clock signal. Then, in the case where external synchronization is impossible by the playback VCR, the read phase of the memory is controlled by the first read clock signal having an average of the write clock frequency, while in the case where the external synchronization is possible, the read phase of the memory is controlled by the high-accuracy second read clock signal while at the same time controlling the playback operation of the playback VCR by a read sync signal, thereby preventing the competition between the write and read operations of the memory.

In the image swing correction apparatus according to the fourth aspect of the invention, when the apparatus is built in the VCR, assume that the clock signal generator controls the playback operation of the VCR with reference to the read clock signal produced from the clock signal generator. Then the phase of playback operation and that of the read operation of the memory of the VCR are synchronized with each other.

The above and further objects and features of the invention will more fully be apparent from the following detailed description with accompanying drawings.

BRIEF DESCRIPTION OF THE DRAWINGS

FIGS. 5(*a*), (*b*), (*c*) and (*d*) are diagrams showing four types of typical patterns of the correlationship value (cumulative sum) with respect to a displacement.

DESCRIPTION OF THE PREFERRED EMBODIMENTS

The present invention will be explained with reference to the accompanying drawings showing embodiments.

(First Embodiment)

Figure 9:
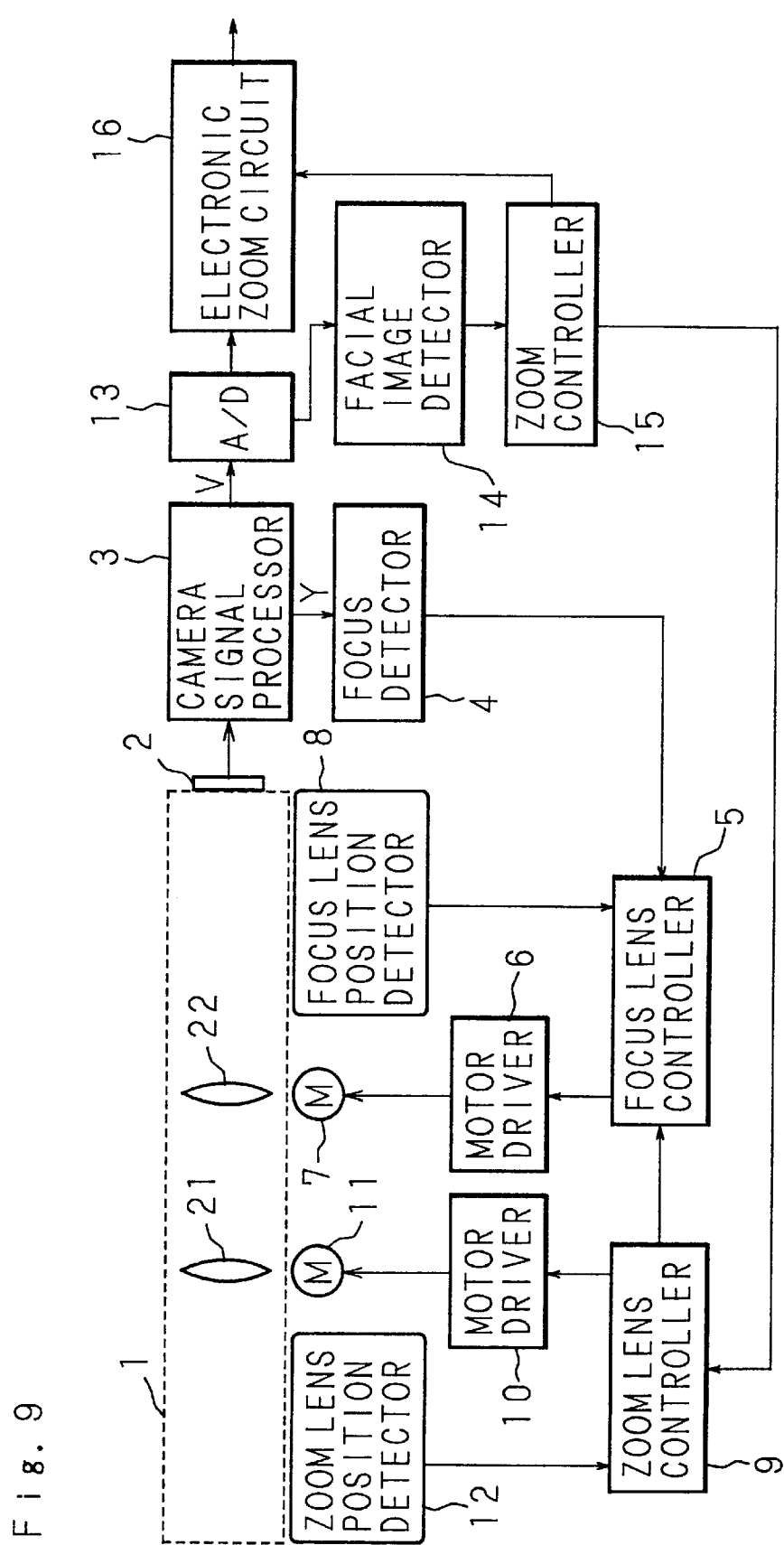
FIG. 9 is a block diagram showing an image pick-up apparatus according to a first embodiment of the invention.

FIG. 9 is a block diagram showing an image pick-up apparatus according to a first embodiment of the invention. This embodiment is an example in which the auto zoom function is applied to a video movie.

Figure 1:
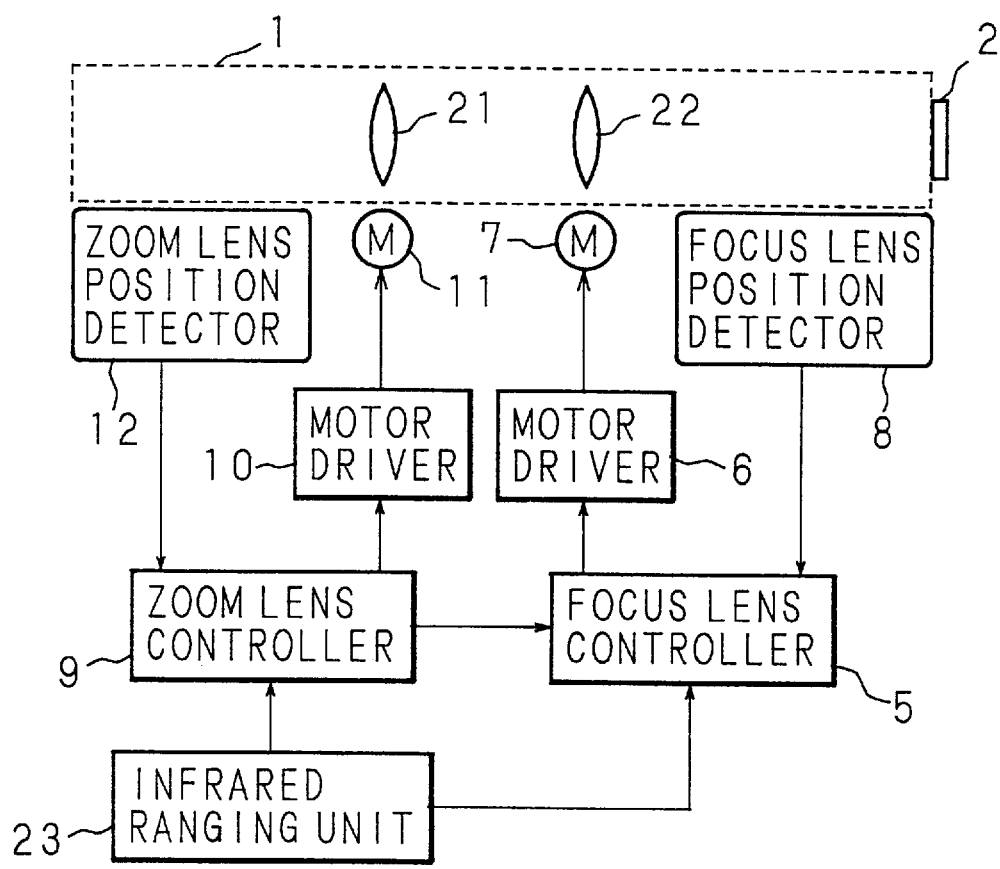
FIG. 1 is a block diagram showing a conventional image pick-up apparatus.
Figure 2:
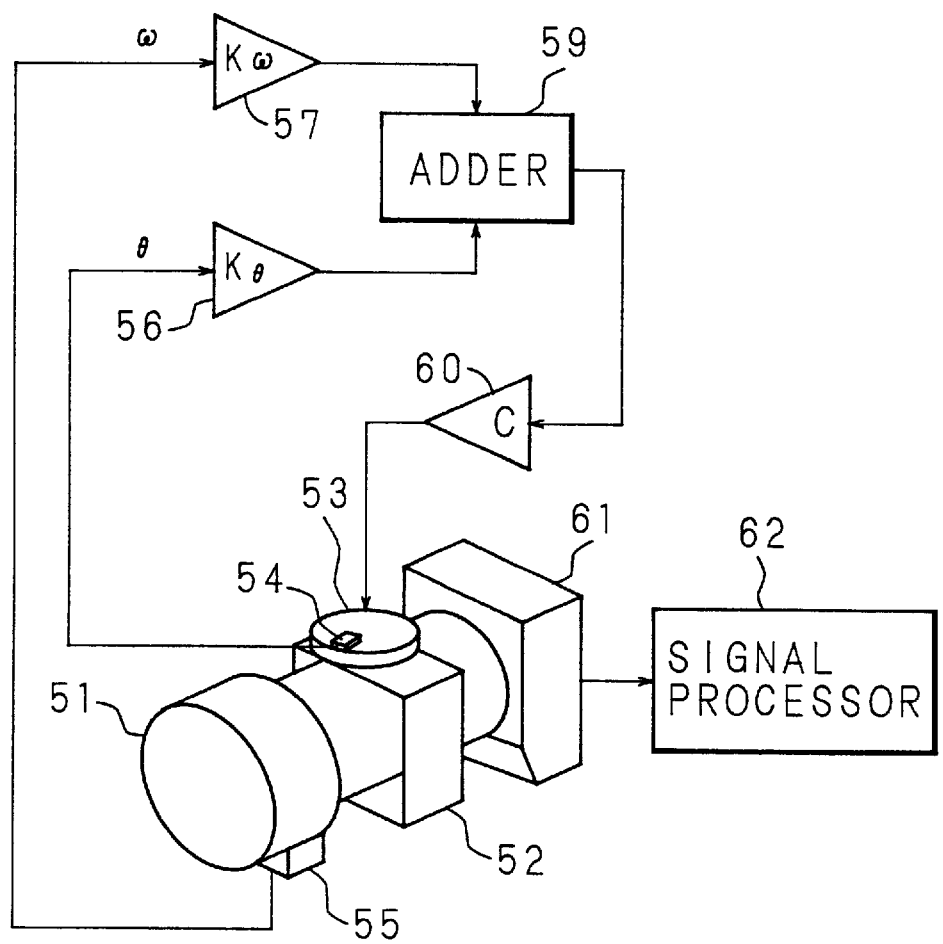
FIG. 2 is a diagram showing the configuration of a conventional image pick-up apparatus.

In FIG. 9, numerals 1, 21, 22, 5 to 12 designate component parts identical to those shown in FIG. 1 respectively and will not be described. A light-receiving surface 2 is a CCD element for converting an optical signal into an electrical signal according to the embodiment under consideration. A camera signal processor 3 produces a video signal V and a luminance signal Y from the electrical signal obtained from the light-receiving surface (CCD) 2. The luminance signal Y is applied to a focus detector 4. The focus detector 4 detects a high-frequency component from the luminance signal Y. The high-frequency component of the luminance signal Y, which corresponds to the contrast of the screen and assumes a maximum value when the contrast is maximum, i.e., when focus is hit, decreases with the distance from the focal point. The focus lens controller 5 drives a focus lens 22 in such a manner as to achieve the maximum value of evaluation of the focused state of the focus lens 22.

Figure 10:
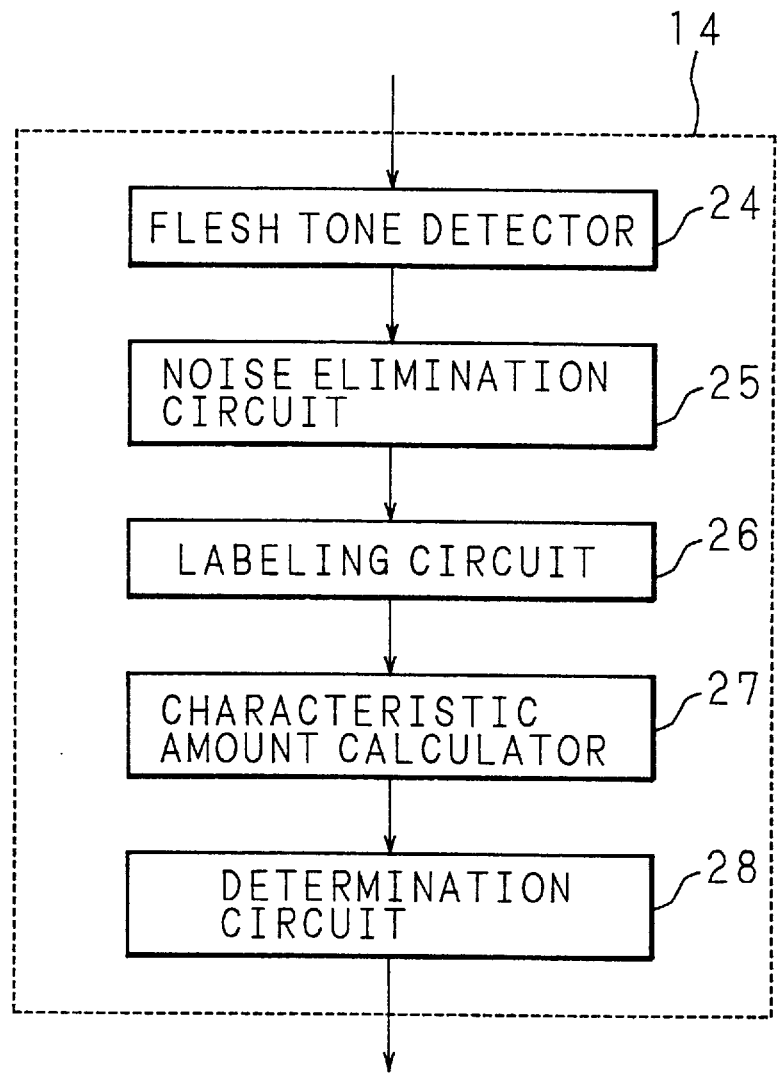
FIG. 10 is a block diagram showing the configuration of a facial image detector.

The video signal V produced from the camera signal processor 3 contains a luminance signal Y and color difference signals R-Y, B-Y, and is converted into a digital signal by an A/D converter 13. A facial image detector 14 extracts a human face portion of the digital video signal received from the A/D converter 13 and measures the size and position thereof. The specific operation of the facial image detector 14 will be explained with reference to FIG. 10.

Figure 11:
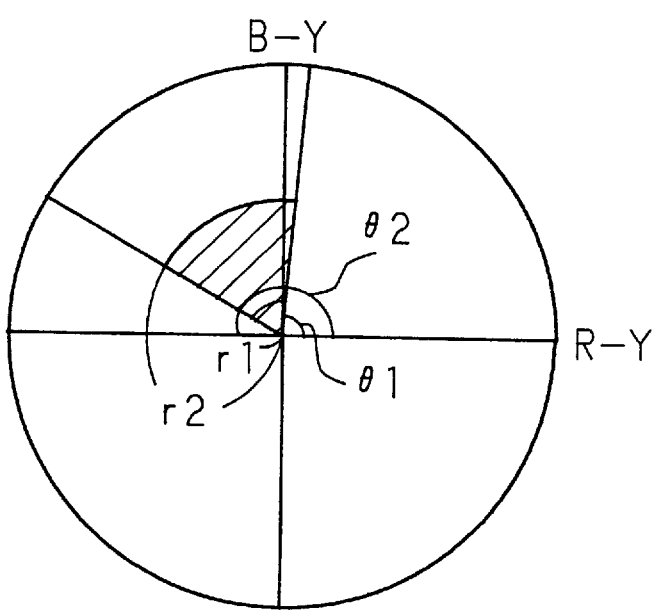
FIG. 11 is a diagram showing the range of color detected as a skin color.

The input image is applied to a flesh tone detector 24. The flesh tone detector 24 taking an x axis along R-Y and a Y-axis along B-Y direction detects any tone from θ1 to θ2 in angle and r1 to r2 in size as a flesh color. FIG. 11 shows the range of the flesh tone. Although the range of the flesh tone to be detected is shown in fan shape, it may alternatively be a rectangle or circle. A binary image having the value of "1" is generated for the portion where the flesh tone is detected, and a binary image having the value of "0" for other portions.

As the next step, noise is removed by a noise elimination circuit 25. The signal is subjected to expansion and contraction for eliminating noises from the binary data. Five cycles of contraction and five cycles of expansion, for example, eliminate small areas of five or less picture elements. Then, a labelling circuit 26 performs the labelling for attaching a number to each area extracted.

Then, a characteristic amount calculator 27 calculates the characteristic amount. First, the center of gravity Gi, the area Ai, the maximum width Wi, the maximum height Hi and the peripheral length Li of each area are determined. The aspect ratio Ri and the complexity Ci are then determined as characteristic amounts from the following equations:

$$Ri = Hi/Wi$$

$$Ci = Li^2/Ai$$

As the next step, whether a face area is involved or not is determined at a determination circuit 28 according to the three criteria shown below.

(1) $Ai > Amin$

An area of a predetermined size or more is extracted.

(2) $Rmin < Ri < Rmax$

An area with an aspect ratio near to unity of a circumscribing rectangle, i.e., an area near to a square is extracted.

(3) $Ci < Cmax$

An area near to a circle is extracted.

The area satisfying these three conditions is determined as a facial image area. According to these three conditions, an accurate recognition of a facial image with a simple circuit is possible. The determination circuit 28 produces the center of gravity Gi and the area Ai of the area extracted as a facial image.

The facial image detector 14 is not limited to the method described above but may be realized in any method to the extent that a facial image area is specified and the position and size thereof determinable.

A zoom controller 15 controls a zoom lens controller 9 and an electronic zoom circuit 16 on the basis of the information on the size and position of the face portion of the image.

Figure 12A:
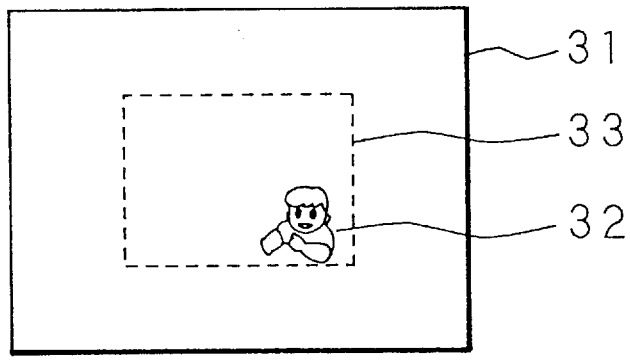
FIGS. 12 (*a*), (*b*) and (*c*) are diagrams showing the manner in which the image pick-up apparatus according to the first embodiment operates.
Figure 12B:
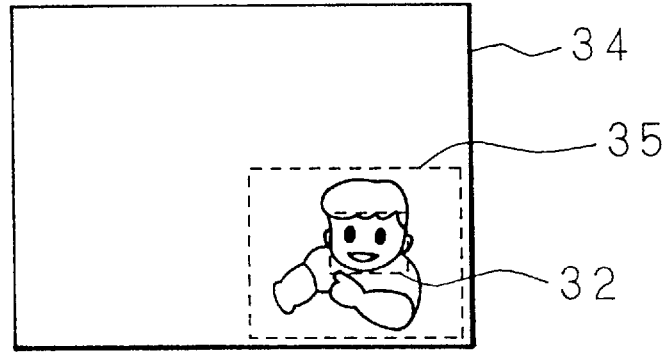
Figure 12C:
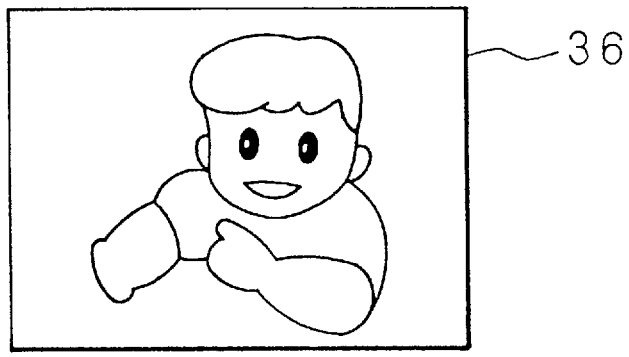

The operation of the zoom controller 15 will be explained with reference to FIGS. 12 (*a*), (*b*) and (*c*). First, assume that an image as designated by numeral 32 has been obtained. The facial image detector 14 recognizes the portions designated by 32 from the image 31 and determines the size and position thereof. The zoom controller 15 that has obtained the information on the size and position of the face issues an instruction to the zoom lens controller 9 to move the zoom lens 21 to the tele-side in such a way that the face area is not displaced out of the frame and approaches the size of the bust shot as far as possible. The information on the size and position of the face is obtained always from the facial image detector 14 and is controlled to approach the information on a preset face size and position under the bust shot. In this way, the zoom lens 21 is moved thereby to produce an image 34 with the portion 33 in the image 31 zoomed. In the screen 34, the area 35 is enlarged by the electronic zoom circuit 16 in order to produce a bust shot image on the basis of the information on the face area 32, thereby producing a bust shot image 36. To summarize, the image is enlarged from 33 to 34 by the optical zoom and from 35 to 36 by the electronic zoom on the basis of the information on the face area 32 at 31, thereby producing a bust shot image.

Also, the zoom controller 15 controls the magnification of the optical zoom and the electronic zoom. First, the motion of the face area is detected. In the process, the difference between the positional information of the face area obtained from the facial image detector 14 and the value thereof in the preceding screen is taken. In the case where the difference is large, large motion is decided, and vice versa. When the motion of the object is large, the magnification of the optical zoom is decreased and that of the electronic zoom increased. As a result, the movable range of the cut-out frame of the image of the electronic zoom is further enlarged. In other words, the correction range is widened and the tracking of a moving object is made possible. In the case where the object is situated at the center or its vicinity with a small motion, on the other hand, the magnification of the optical zoom is increased and that of the electronic zoom decreased. This reduces the image quality deterioration of the electronic zoom, thereby improving the image quality.

This method, using the face size as a condition for determining the zoom magnification, makes the face size in the screen always constant, substantially eliminating the chance of the size being increased or decreased as it occurs in the prior art. Even in the case where the object is not situated at the center of the screen, as shown by 35 in FIG. 12 (*b*), the cut-out position of the image of the electronic zoom is set at a position having a face, and therefore a bust shot, as shown by 36 in FIG. 12 (*c*), is obtained. When the object is moving, the cut-out position of the image of the electronic zoom is moved in accordance with the motion of the object, thereby making it possible to produce an always stable bust shot. According to these facts, this method also corrects the hand error.

According to this embodiment, a bust shot is assumed as a final composition. The invention, however, is not limited to it, but may be applied to any human composition including the shot of the whole body or only the face arranged at the lower left corner. Also, these several compositions may be set in advance to allow the user to select and use any of them as desired.

As explained above, according to the first embodiment, a stable image is obtained even when the object is moving, and the image can be taken with a predetermined composition simply by aiming the camera roughly toward the object.

(Second Embodiment)

Figure 13:
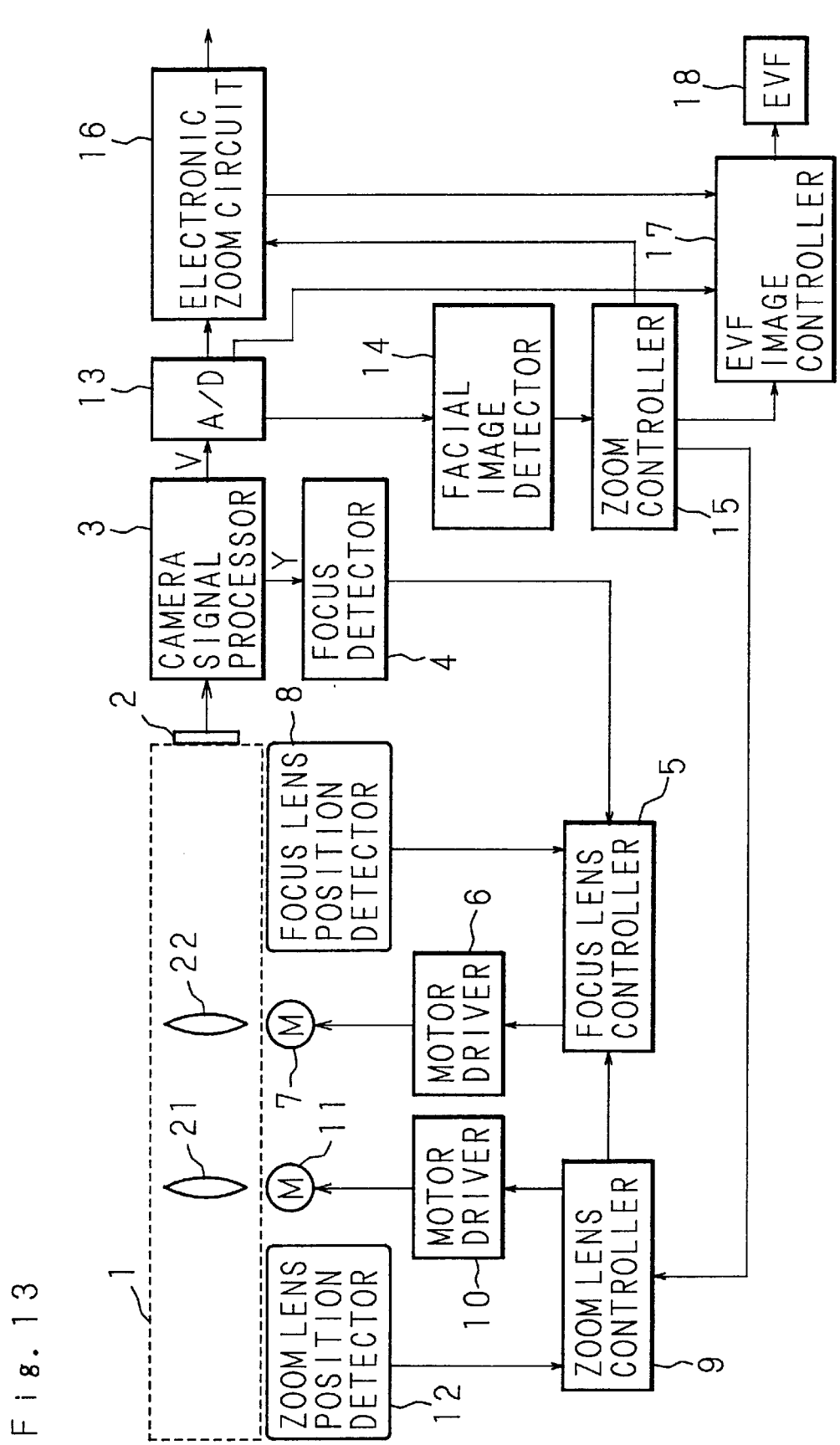
FIG. 13 is a block diagram showing an image pick-up apparatus according to a second embodiment of the invention.

An explanation will be provided of an image pick-up apparatus according to the first embodiment reconstructed with the screen of an electronic view finder (EVF) switchable. FIG. 13 is a block diagram showing an image pick-up apparatus according to a second embodiment of the invention. As compared with FIG. 9, the apparatus shown in FIG. 13 is the same except that an EVF image controller 17 and an EVF 18 are added.

The operation of the second embodiment will be described. The EVF image controller 17 obtains the image data before applying electronic zoom from the output of the A/D converter 13, the range of electronic zoom from the zoom controller 15, and the image data after applying electronic zoom from the electronic zoom circuit 16. With reference to FIGS. 12 (*b*) and (*c*), the image before electronic zoom corresponds to 34, the range of the electronic zoom to 35, and the image after electronic zoom to 36. The EVF 18 is supplied with the image 36 after electronic zoom according to the first embodiment. The second embodiment, on the other hand, is adapted to produce an image before electronic zoom with the range of electronic zoom, i.e., an image with a frame 35 on the image of 34. One of the two images, one before applying electronic zoom and the other after applying electronic zoom, can thus be selected as an output of the EVF 18. As a result, even an object in strong motion can be imaged and the motion confirmed stably.

(Third Embodiment)

Another embodiment for recognizing other than the facial image in the image pick-up apparatus according to the first embodiment will be explained as a third embodiment. An image pick-up apparatus according to the third embodiment of the invention is shown in the block diagram of FIG. 14.

Figure 14:
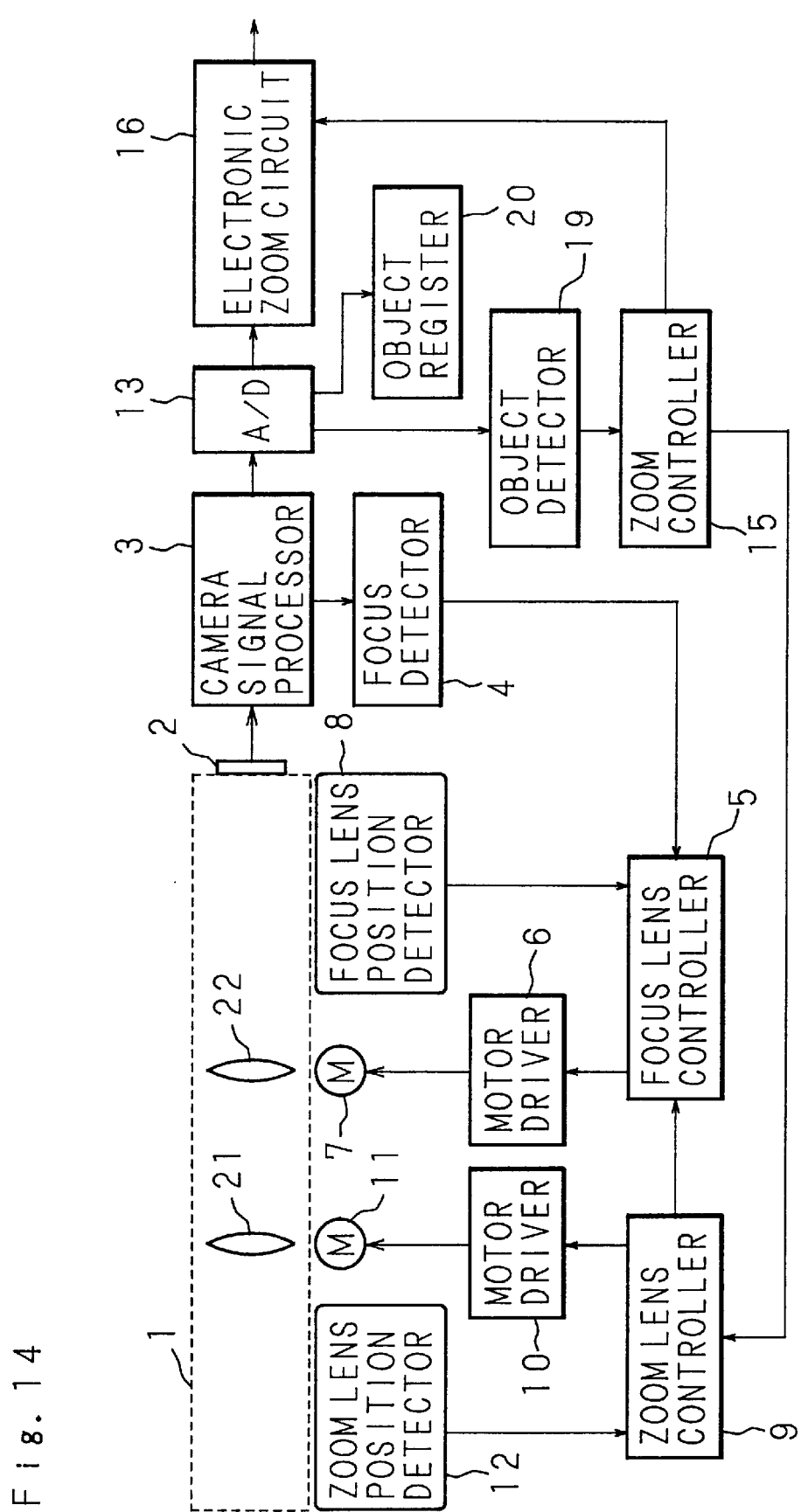
FIG. 14 is a block diagram showing an image pick-up apparatus according to a third embodiment of the invention.

As compared with FIG. 9, the apparatus of FIG. 14 remains the same as that of FIG. 9 except that the apparatus shown in FIG. 14 includes an object detector 19 in place of the facial image detector 14, and an object register 20 newly added.

The operation of the third embodiment will be explained. Although the object of recognition is limited to the human face according to the first embodiment, no such limitation is applied in the third embodiment. First, the camera is aimed at an object on which it is desired to work auto zoom and the desired composition is taken thereof. The features (shape, color, etc.) and the composition of the particular object is registered with the object detector 19.

Figure 15:
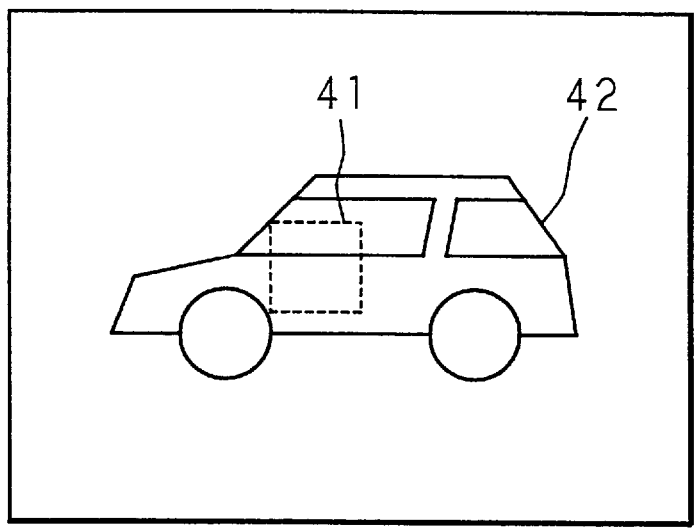
FIG. 15 is a block diagram showing the manner in which an object is recognized according to the third embodiment.
Figure 16:
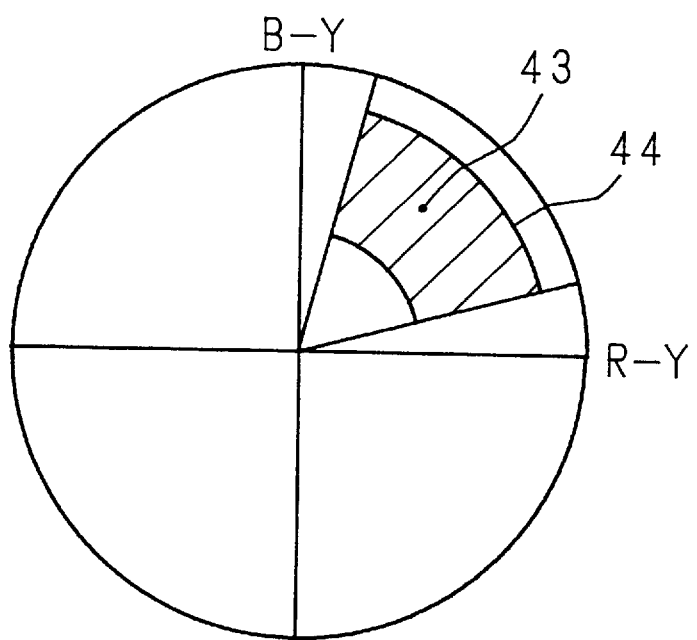
FIG. 16 is a diagram showing the range of color detected.

The operation of registering an object will be explained with reference to FIGS. 15 and 16. FIG. 15 is a diagram showing the manner in which an object is recognized according to the third embodiment of the invention. First, the composition of the object is determined. A registration point 41 is moved to the place of the object 42 at which the performance of auto zoom is wanted. Under this condition, a registration switch is depressed. The image is stored in memory and the average value of the color difference signal at the registration point 41 is calculated by an object register 20. Assume for example that the average value of the color difference signal determined is a point 43 in FIG. 16. A region 44 is set as a detection color range. As regards the color difference signal for the registration point, the angle of±30° to the average value 43 of the color difference signal and the width of±20° are taken. The range of the color included in the detection color range 44 is extracted from the image of the object registered in the memory. The range containing the registration point is recognized as an object in the extracted range, and the shape and position thereof are recorded in the memory. Further, the area, aspect ratio and the complexity providing the characteristic amounts of the recognized object are calculated and stored.

Once the object is registered, what is performed according to the first embodiment is not performed for the human face but for the registered object. As a result, the auto zoom is effected for all compositions of all types of objects.

For registration of the object, the characteristic amounts may include the texture, motion information or other parameters or any combinations thereof. With regard to the color detection, on the other hand, the object may be registered as a combination of a plurality of color components having a peak, instead of an average value.

According to the third embodiment, as in the first embodiment, a stable image can be produced for any object even when the object moves.

(Fourth Embodiment)

Figure 17:
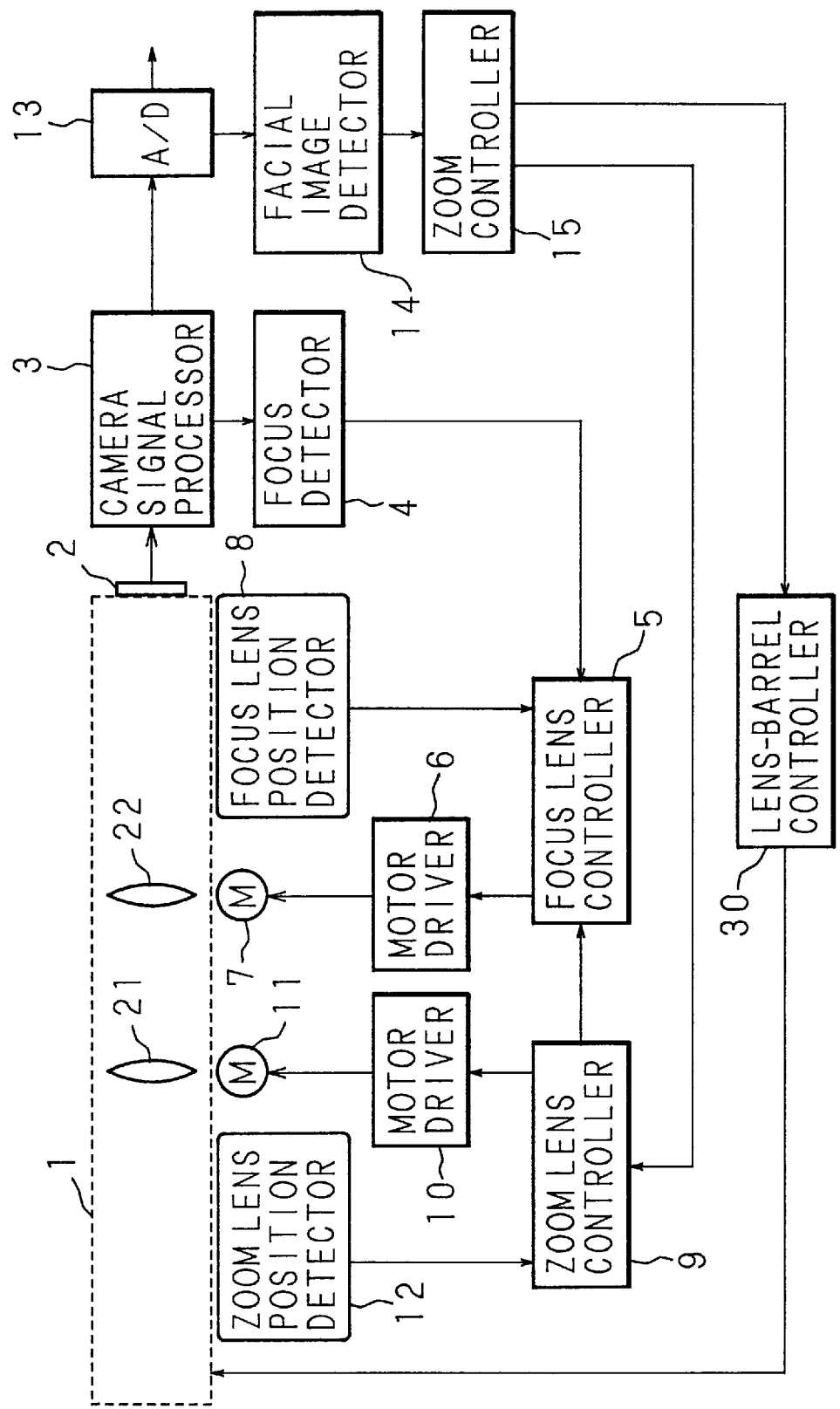
FIG. 17 is a block diagram showing an image pick-up apparatus according to a fourth embodiment of the invention.

An explanation will be provided for an embodiment in which the object is tracked by moving a lens barrel in an image pick-up apparatus according to the first embodiment. FIG. 17 is a block diagram showing an image pick-up apparatus according to the fourth embodiment of the invention. As compared with the embodiment of FIG. 9, the embodiment shown in FIG. 17 lacks the electronic zoom circuit 16 and has added thereto a lens barrel controller 30. Also, the lens barrel 1 is controlled by the lens barrel controller 30 to change the direction thereof.

The operation of the fourth embodiment is explained below. According to the first embodiment, the electronic zoom is performed by the electronic zoom circuit 16 after the optic cal zoom by the zoom lens 21. With reference to FIGS. 12 (a), (b) and (c), the enlargement from image 31 to image 34 is performed by optical zoom, and that from image 34 to image 36 by electronic zoom. According to the fourth embodiment the electronic zoom is not effected. The position and size of the facial image are measured by the facial image detector 14 from the digital image data obtained from the A/D converter 13 as in the first embodiment. Assume that an image as shown by 31 in FIG. 12 (a) was obtained by the facial image detector 14. The position of the human face area 32 is applied to the lens barrel controller 30. The lens barrel controller 30 controls the direction of the lens barrel 1 in such a manner that the human face area 32 is located at the center of the screen. Further, in accordance with the information on the size of the human face at the zoom controller 15, the zoom lens controller 9 moves the zoom lens 21 in such a manner that the image of the object is a bust shot. These operations produce the image 36 from the image 31 in FIGS. 12 (a), (b) and (c). By the use of this method, the effect similar to that of the first embodiment is obtained. Also, according to the fourth embodiment, the electronic zoom is not used and therefore the image quality is not deteriorated. Although the image of the object is moved to the exact center of the image by moving the lens barrel according to the fourth embodiment, the same effect is obtained by a lens with a movable optical axis.

An image pick-up apparatus according to the fourth embodiment, like the image pick-up apparatus according to the first embodiment produces a stable image without any deterioration, even when the object moves.

(Fifth Embodiment)

Figure 18:
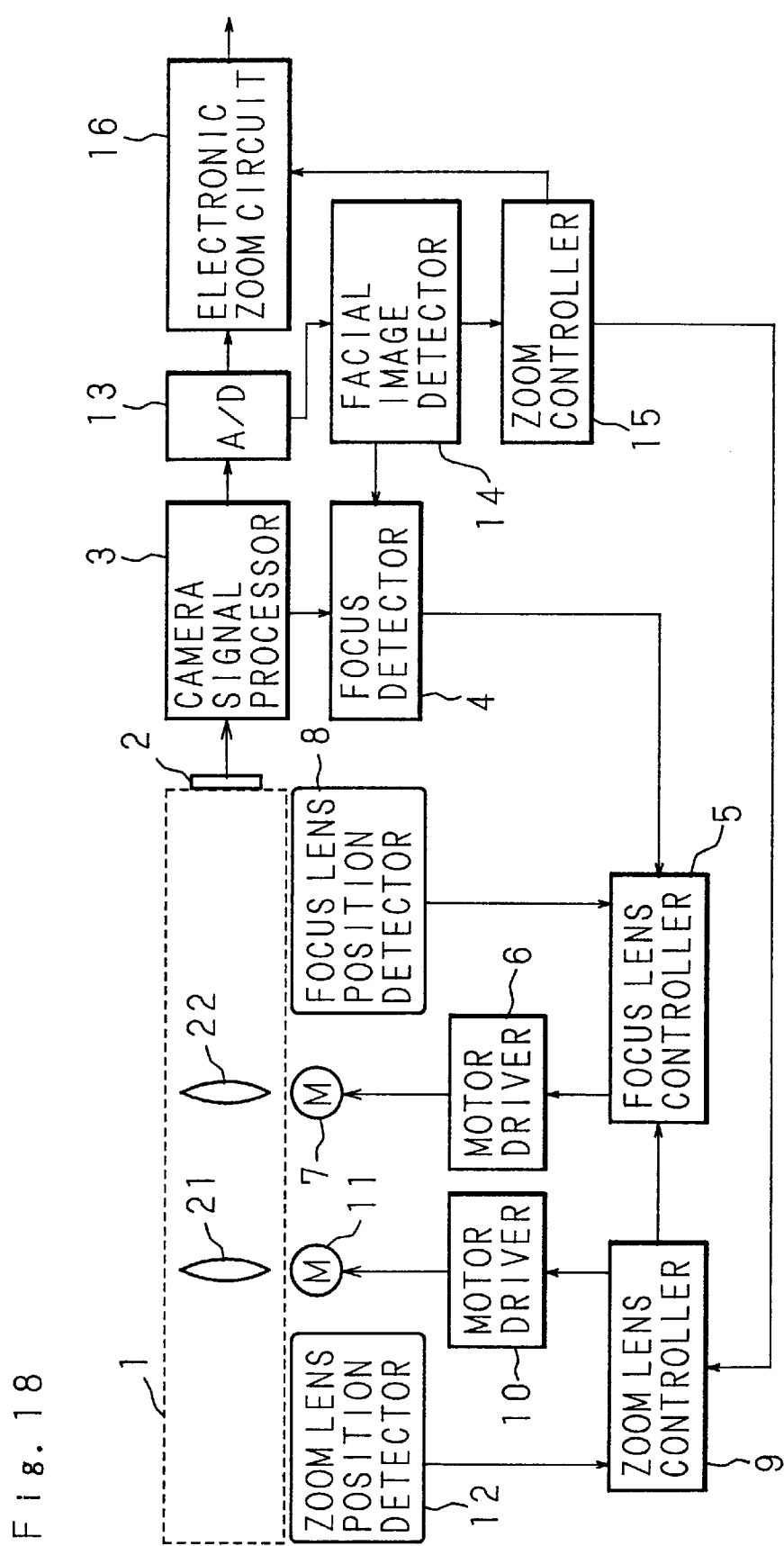
FIG. 18 is a block diagram showing an image pick-up apparatus according to a fifth embodiment of the invention.

Now, explanation will be made about an embodiment considering the auto focus in an image pick-up apparatus according to the first embodiment. FIG. 18 is a block diagram showing an image pick-up apparatus according to a fifth embodiment of the invention. The embodiment shown in FIG. 18 has the same component parts as the embodiment shown in FIG. 9, except that in the embodiment of FIG. 18, the information of the same size as the human face produced from the facial image detector 14 is applied to a focus detector 4.

The focus detection for focusing operation is conventionally uses date of the whole or part of the screen. The result is often the object is not actually watched but the background is often focused. If this fact happens at the time of auto zoom, the object zoomed may not be focused. In the focus detector 4 according to the fifth embodiment, the focus for the face is detected on the basis of the information on the position and size of the face from the facial image detector 14. Explanation will be made with reference. The portion of 32 detected as a face is focused to move the focus lens 22. As a result, an image always focused on the face portion is produced.

In the image pick-up apparatus according to the fifth embodiment, as in the first embodiment, a stable image is produced, even of a moving object. An always focused image is thus produced.

(Sixth Embodiment)

Figure 19:
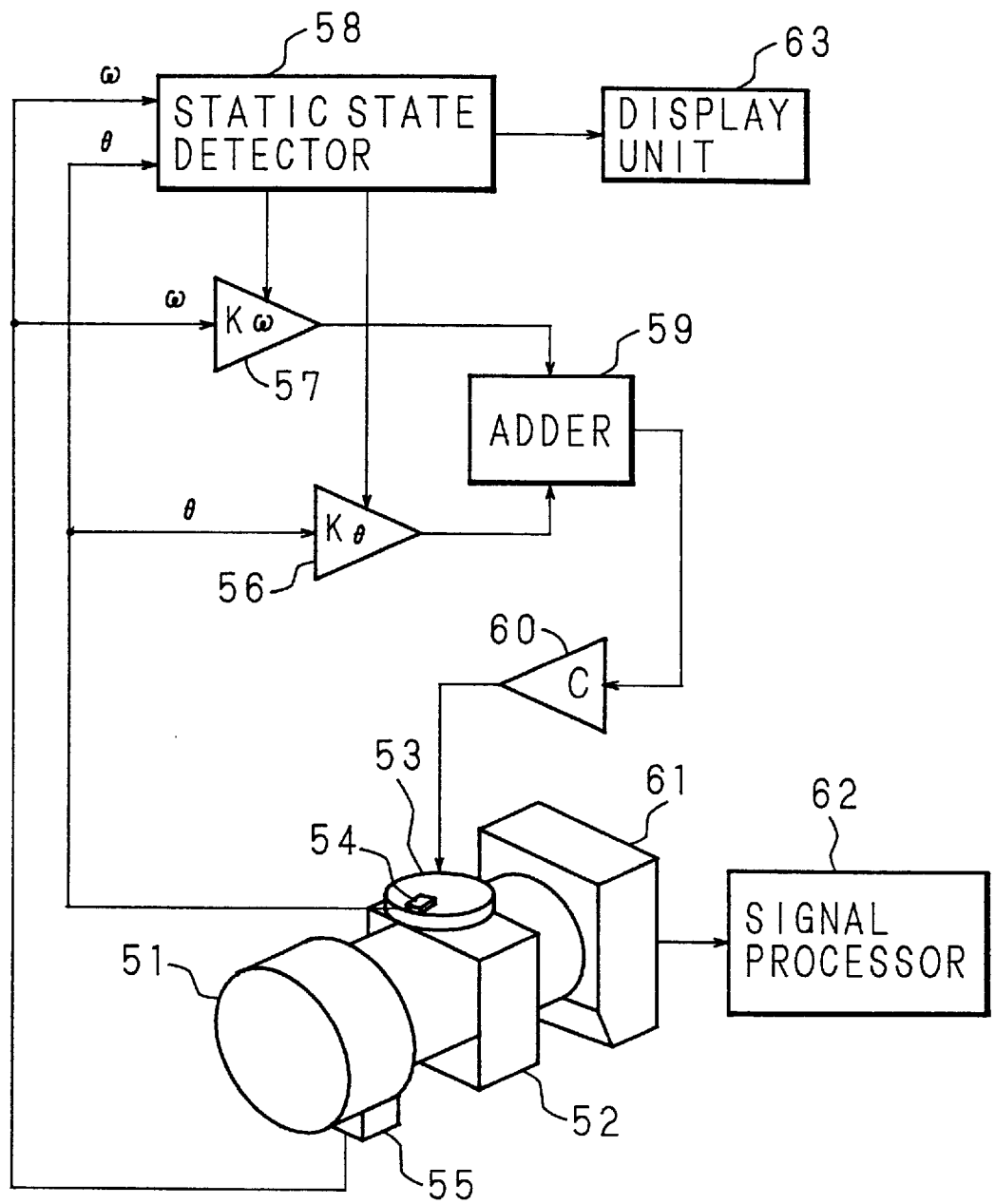
FIG. 19 is a diagram showing the configuration of an image pick-up apparatus according to a sixth embodiment of the invention.

FIG. 19 is a diagram showing a composition of an image pick-up apparatus according to a sixth embodiment of the invention. In FIG. 19, numeral 51 designates a lens barrel (optical system), 52 a gimbal mechanism for supporting the lens barrel 51, numeral 53 an actuator for driving the lens barrel 51, numeral 54 an angle sensor for detecting the relative angle to a housing not shown, numeral 55 an angular velocity sensor for detecting the angular velocity generated in the lens barrel 51, numeral 56 a variable amplifier for multiplying the output of the angle sensor 54 with a variable gain, numeral 57 a variable amplifier for multiplying the output of the angle velocity sensor 55 with a variable gain, 58 a static state detector for deciding on a static state of the lens barrel 51 from the outputs of the angle sensor 54 and the angular velocity sensor 55, numeral 59 an adder for adding the outputs of the variable amplifiers 56, 57, numeral 60 an actuator drive circuit for driving the actuator 53 from the output of the adder 59, numeral 61 an image pick-up unit for picking up the image of an object through the lens barrel 51, numeral 62 a signal processor for processing the video signal produced from the image pick-up unit 61, and numeral 63 a display unit for displaying the image condition.

Although FIG. 19 shows only an actuator, a sensor and a controller for rotating the lens barrel 51 in the horizontal (yawing) direction, a similar configuration is realizable also in the vertical (pitching) direction.

The lens barrel 51 includes a multiplicity of lenses not shown, a CCD and an image pick-up unit 61 such as an image pick-up tube. The lens barrel 51 is for forming an image of the object on the image pick-up unit 61, which converts the particular image into an electrical signal. The lens barrel 51 forms an image of the object on the image pick-up unit 61, from which a video signal is produced. This video signal is processed in a signal processor 62 and produced as an output by being converted into a video signal of NTSC system.

Figure 20:
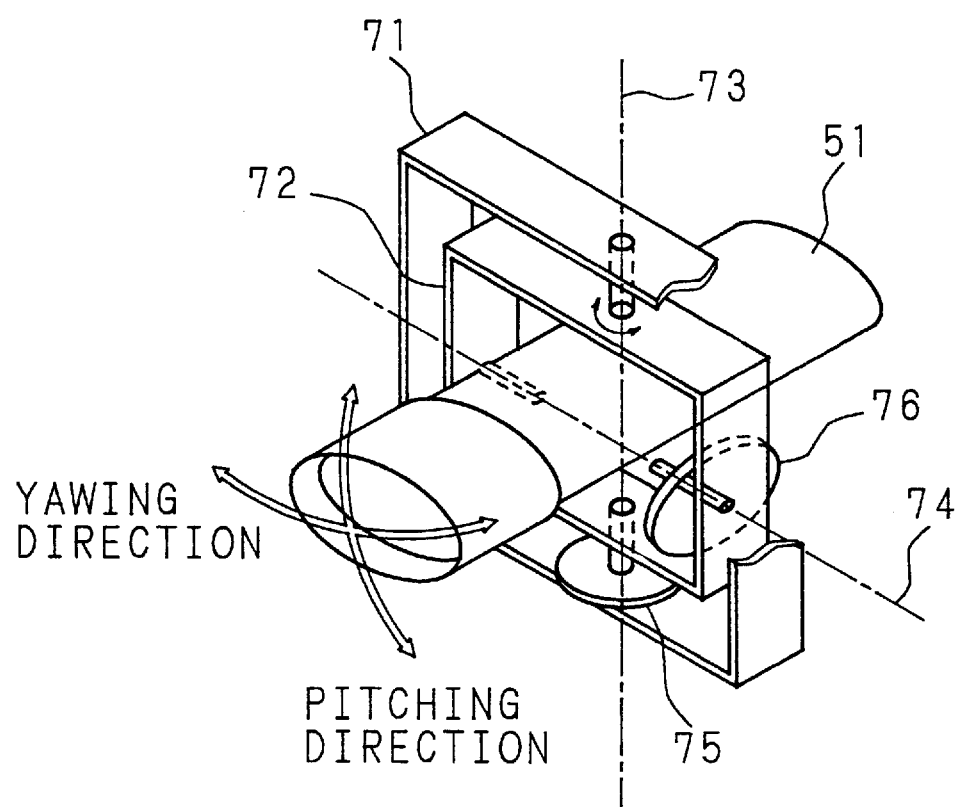
FIG. 20 is a diagram for explaining the mechanical system shown in FIG. 19.

The lens barrel 51 is rotatably supported on a gimbal mechanism 52. A specific example of the construction of the gimbal mechanism 52 is shown in FIG. 20. In FIG. 20, numeral 71 designates a first support member, 72 a second support member, 73 a first rotary shaft, 74 a second rotary shaft at right angles to the first rotary shaft 73, numeral 75 a first actuator, and 76 a second actuator.

The lens barrel 51 is rotatably supported with the second rotary shaft 74 as a center axis in the second support member 72. The rotation of the lens barrel 51 is adapted to be controlled in the pitching direction by driving the second actuator 76. Also, the second support member 72 is supported rotatably with the first rotary shaft 73 as a center axis in the first support member 71 in such a manner that the rotation of the lens barrel 51 in the yaw direction may be controlled by driving the first actuator 75. The first support member 71 is fixed in the housing (not shown) of the image pick-up apparatus.

With this configuration, the lens barrel 51 can be rotated in the yawing and pitching directions with reference to the first support member 71 by driving the first and second actuators 75, 76 by the output of a controller respectively. Although the yawing direction is shown along the first rotary shaft and the pitching direction along the second rotary shaft, the pitching direction may alternatively be along the first rotary shaft and the yawing direction along the second rotary shaft with equal effect.

Now, the operation of correcting the hand error in an image pick-up apparatus configured as described above will be explained for the yawing direction. The following explanation applies equally to the apparatus configuration in pitching direction though not shown in FIG. 19.

The user takes an image by holding the housing or the grip mounted on the housing of the apparatus. Therefore, a vibration not intended by the user including a hand error may occur in the housing. This vibration is transmitted to the lens barrel 51, and the angular velocity thereof is detected by the angular velocity sensor 55 and is converted into a corresponding electrical signal $\omega$. This signal $\omega$ is amplified by the variable amplifier 57 (with an angular velocity loop gain of K$\omega$) and is applied to the adder 59.

The relative angle between the lens barrel 51 and the housing, on the other hand, is detected by the angle sensor 54 and is converted into a corresponding electrical signal $\theta$. This signal $\theta$ is amplified (with the angular loop gain of K$\theta$) by the variable amplifier 56 and is applied to the adder 59.

The adder 59 calculates a control output value by adding the outputs of the variable amplifiers 56, 57 and applies the sum to the actuator drive circuit 60. The actuator drive circuit 60 drives the actuator 53 by this control output value.

Figure 21:
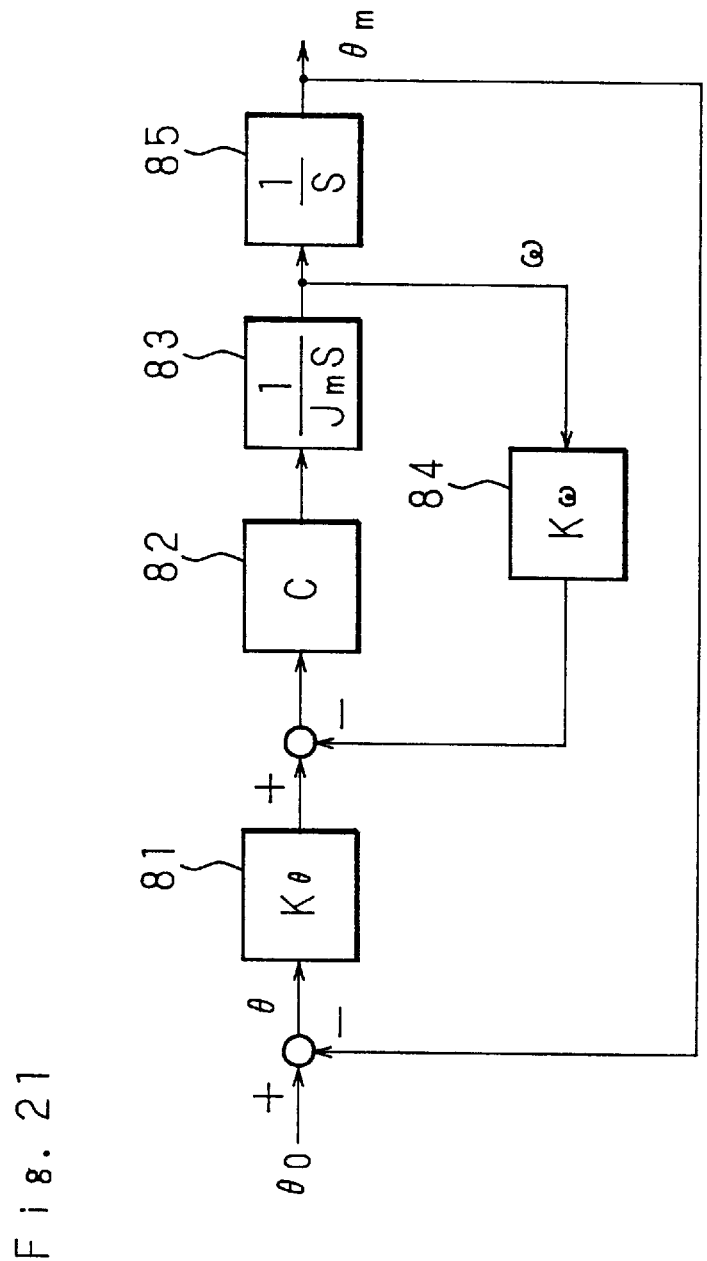
FIG. 21 is a block diagram showing a control system of FIG. 19.

FIG. 21 is a block diagram showing a control system in FIG. 19. In FIG. 21, numeral 81 designates an angular loop gain K$\theta$, numeral 82 an actuator drive gain, 83 a mechanical system representing the lens barrel 51 and the gimbal mechanism 52, numeral 84 an angular velocity loop gain K$\theta$ and numeral 85 a differentiation element.

In normal mode (with normal hand error correction condition), the variable amplifier 56 has a predetermined constant K$\theta$ 0 as a multiplication factor K$\theta$ multiplied by the output value $\theta$ of the angle sensor 54.

The static condition detector 58 calculates the angular velocity $\omega$ 0 of the housing in the inertial coordinate system from the angular velocity $\omega$ and the relative angle $\omega$ $$\omega\ 0 = d\theta/dt - \omega$$

In the case where the angular velocity of the housing is less than a predetermined value for a predetermined length of time, the image pick-up apparatus decides on a static state. More specifically, the static state detector 58 time-differentiates the output value $\theta$ of the angle sensor 54, and the result of this calculation is used to subtract the output value $\omega$ of the angular velocity sensor 55 thereby to produce a housing angular velocity $\omega$ 0.

The static state detector 58 constantly monitors the value $\omega$ 0 and measures the time during which the value $\omega$ 0 is equal to or less than a threshold $\omega$ s. More specifically, when the relation $\omega$ 0<$\omega$ s holds at least for a predetermined length of time, a static state is determined, and the normal mode coefficient K$\theta$ 0 of the angular loop is changed to the static mode coefficient K$\theta$ s (K$\theta$ s>K$\theta$ 0).

As described above, according to this embodiment, the control system has two modes, i.e., normal and static, so that the gain of the control system is changed in accordance with the state of the image pick-up apparatus. Description will be made below of the operation of the static state detector 58 with reference to the flowchart of FIG. 22.

Initially, the apparatus is set to normal mode (step S1) for operating the hand error correction function in priority. Under this condition, the counter is at count 0 (step S2). After the housing angular velocity $\omega$ 0 is calculated (step S3), the value $\omega$ 0 thus calculated is compared with a threshold (a small value assumed to indicate a static state) $\omega$ s set in advance (step S4). In the case where $\omega$ 0 is larger, the hand error correction should be continued, and therefore the process returns to step S1.

Figure 22:
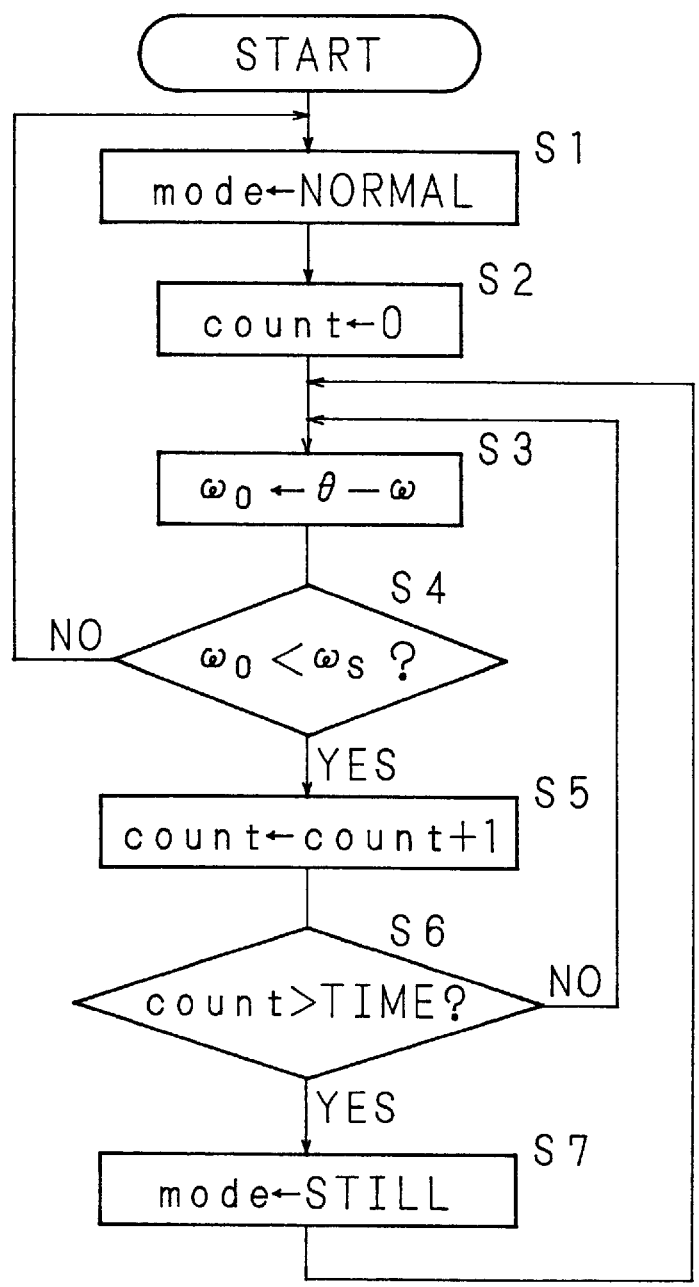
FIG. 22 is a flowchart for explaining the mode-switching algorithm according to the sixth embodiment.

In the case where $\omega$ 0 is smaller than $\omega$ s, however, the image pick-up apparatus may be in static state. The counter COUNT is incremented by+1(step S5) thereby to measure the duration. The count is compared with a predetermined threshold TIME (step S6). In the case where the count exceeds the threshold TIME, it is decided that the image pick-up apparatus remains in static state for a sufficiently long time, and the mode is changed to static (step S7). Though not shown in the flowchart of FIG. 22, the value of the angular loop gain Kθ is changed from Kθ 0 to Kθs at this time. As a result, the component proportional to the relative angle between the center axis of the lens barrel and that of the housing contained in the drive output of the actuator increases thereby to improve the origin restoration performance. The flowchart of FIG. 22 is simplified by omitting the overflow processing of variables.

Figure 23:
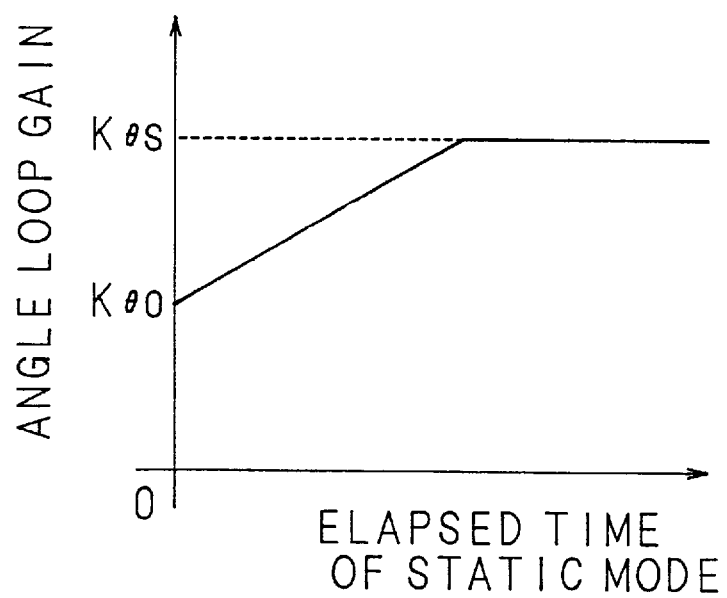
FIG. 23 is a graph showing an example of gain change of the angular loop according to the sixth embodiment of the invention.

When the static mode is started, if the gain of the angular loop is abruptly increased, the operation of the lens barrel changes suddenly against the will of the operator, thereby posing the operation problem. In order to obviate this problem, the last-set gain Kθ s and the initially-set gain Kθ 0 are interpolated to increase the gain gradually during the static mode, thus securing smooth operation. In FIG. 23, the abscissa represents the lapse of time in static mode, and the ordinate the gain of the angular loop. As shown, an abrupt change in the control system is prevented by changing the gain against the lapse of time in static mode.

Figure 24:
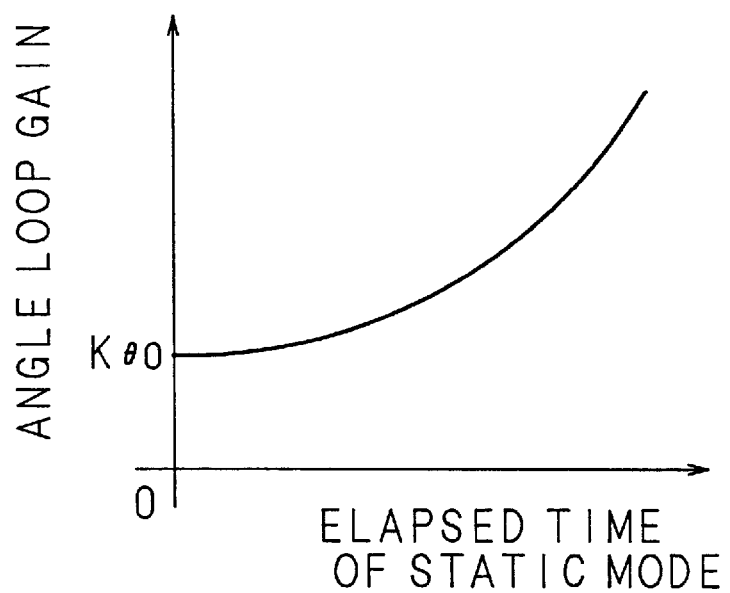
FIG. 24 is a graph showing another example of gain change of the angular loop according to the sixth embodiment.

Further, an interpolation with a function having a given shape instead of simple linear interpolation improves the operability. In FIG. 24, the abscissa represents the lapse of time in static mode, and the ordinate the gain of the angular loop. This figure illustrates a case in which the gain is set as a secondary function of time.

As shown in FIG. 19, the feeling of physical disorder of the operator is alleviated by configuring the apparatus in such a manner that the condition is displayed on the display unit 63 such as a view finder.

Even in static mode, the monitoring of the housing angular velocity can be continued at steps S3 and S4. In the case where the housing angular velocity ω 0 exceeds the threshold ω s, the mode is charged to the normal one immediately.

(Seventh Embodiment)

Figure 25:
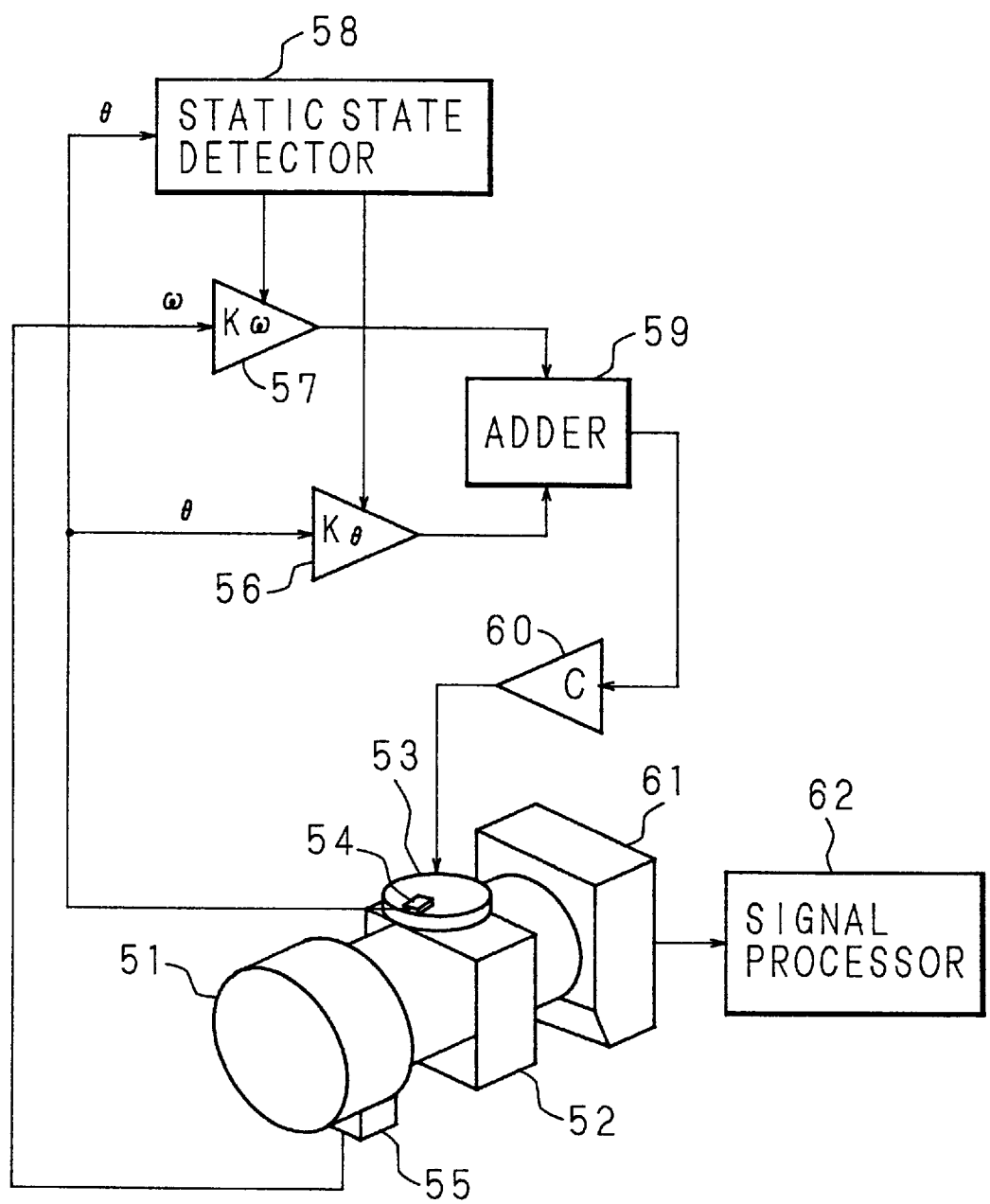
FIG. 25 is a diagram showing the configuration of an image pick-up apparatus according to a seventh embodiment of the invention.
Figure 26:
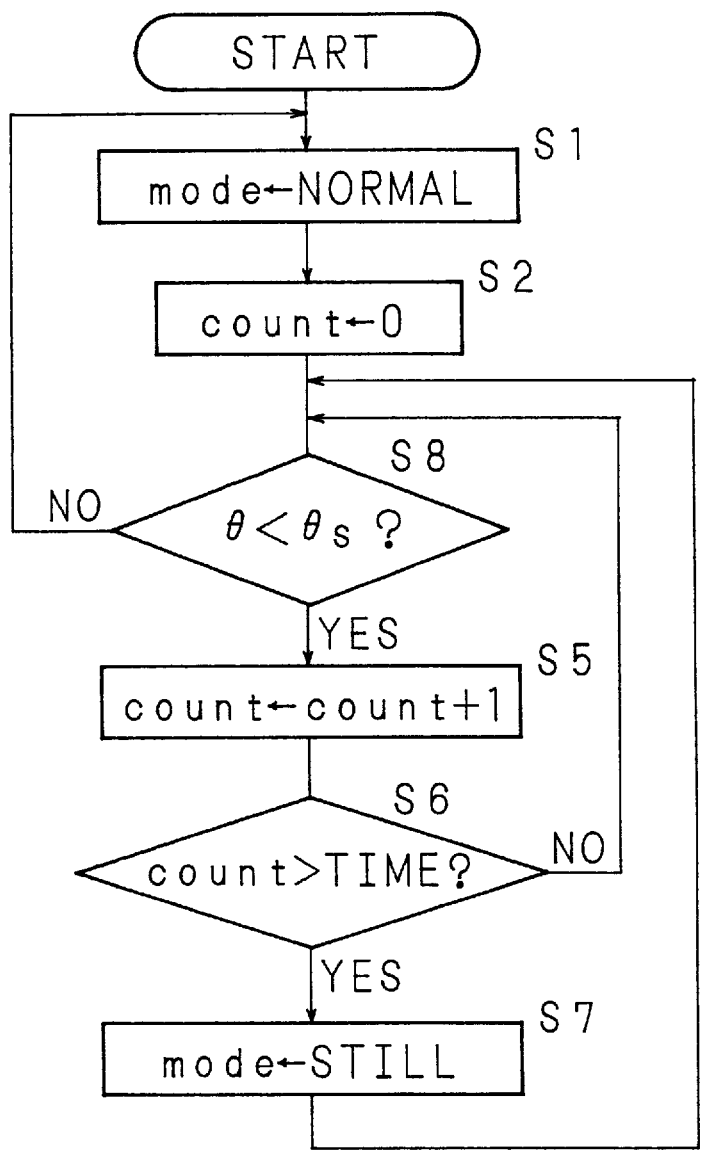
FIG. 26 is a flowchart for explaining the mode-switching algorithm according to the seventh embodiment.

FIG. 25 is a diagram showing a configuration of the image pick-up apparatus according to a seventh embodiment. This embodiment is the same as the sixth embodiment except for the operation of the static state detector 58. FIG. 26 is a flowchart for explaining the algorithm for changing the mode according to the seventh embodiment.

In FIG. 26, the operating mode is initialized (step S1) to initialize the timer (step S2). In the static state detector 58, the output ω of the angle sensor 54 for detecting the relative angle between the lens barrel 51 and the housing is compared with a predetermined small threshold θ s. In the case where the output of the angle sensor 54 is smaller than the threshold, the duration is measured (step S5). After the duration exceeds a predetermined time (step S6), it is decided that the image pick-up apparatus is in static state, and the operating mode is switched as in the sixth embodiment to change the gain of the control system (step S7).

(Eighth Embodiment)

Figure 27:
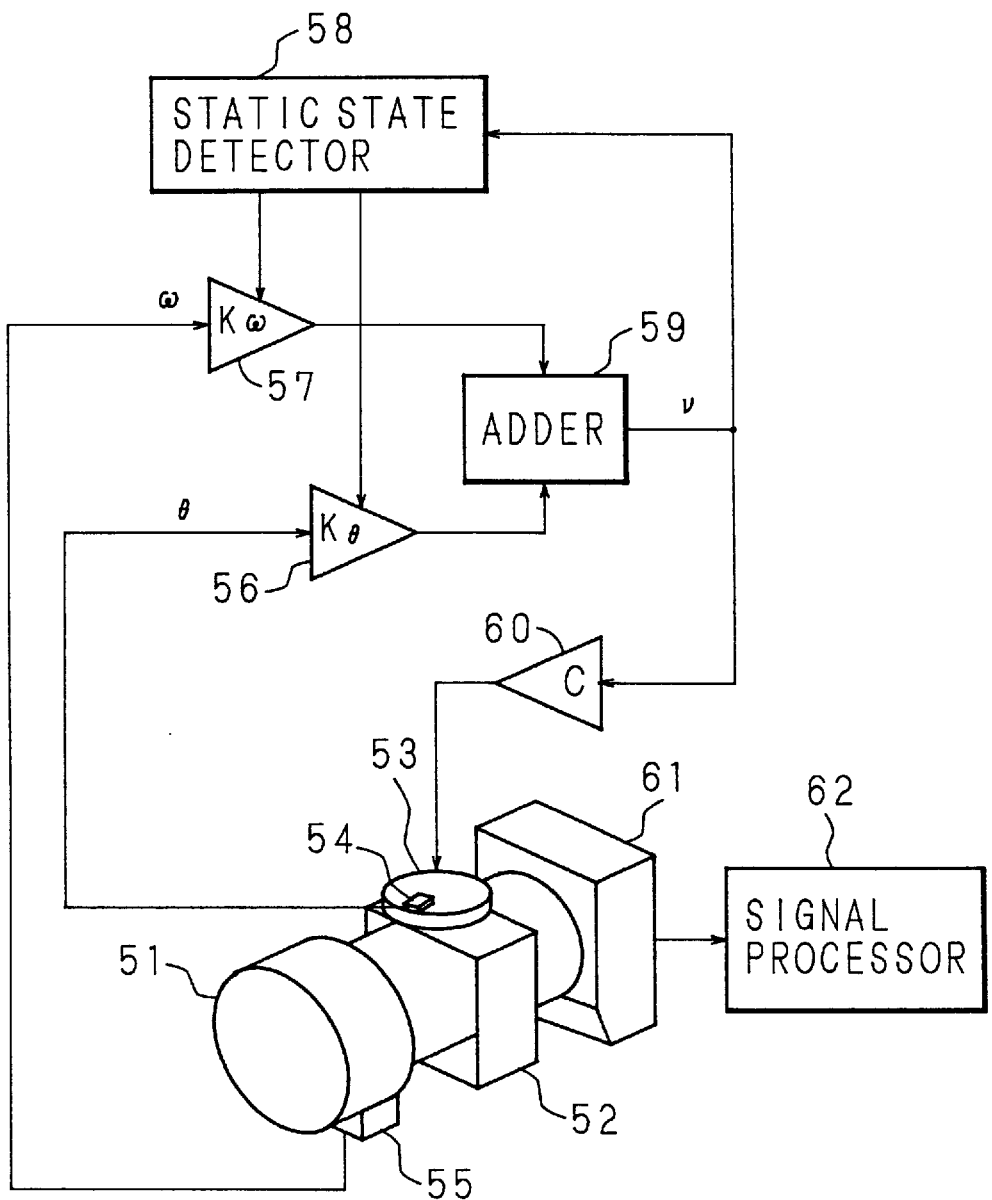
FIG. 27 is a diagram showing the configuration of an image pick-up apparatus according to an eighth embodiment.
Figure 28:
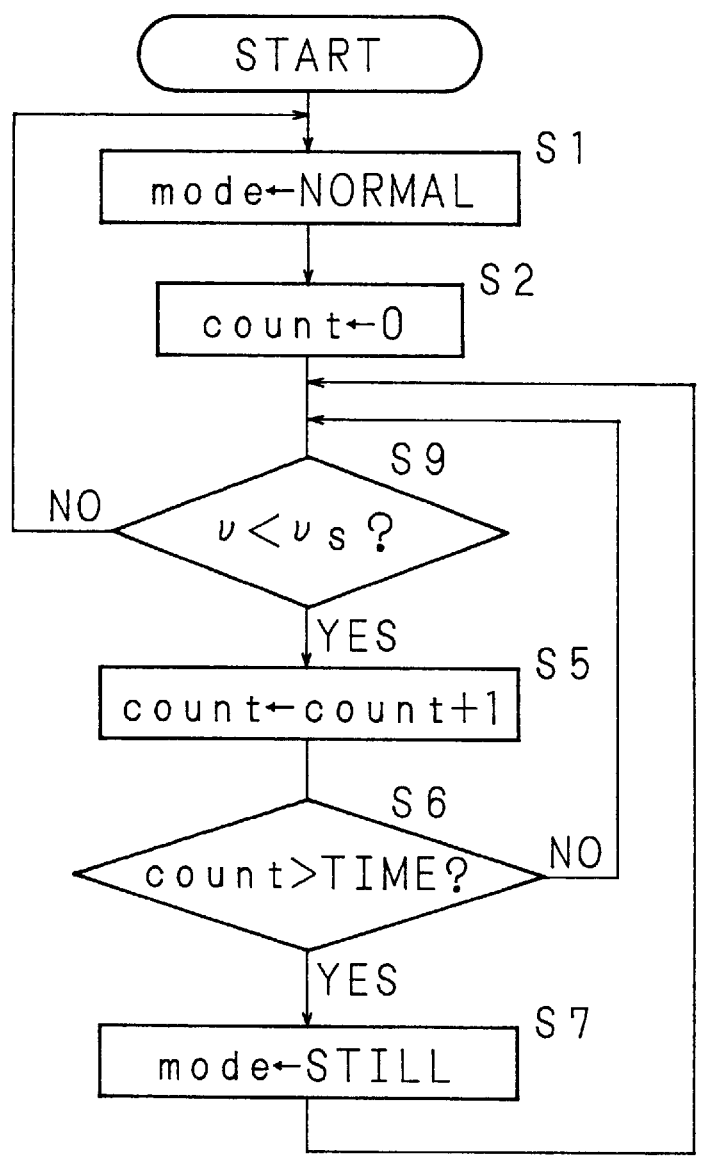
FIG. 28 is a flowchart for explaining the mode-switching algorithm according to the eighth embodiment.

FIG. 27 is a diagram showing the configuration of an image pick-up apparatus according to an eighth embodiment of the invention. This embodiment is identical with the sixth embodiment except for the operation of the static state detector 58. FIG. 28 is a flowchart for explaining the algorithm for changing the mode according to the eighth embodiment.

In FIG. 28, after initialization (steps S1, S2), the static state detector 58 compares the control value v of the actuator 53 for driving the lens barrel 51 with a predetermined threshold vs (step S9). When the control value v is smaller than the threshold vs, the duration thereof is measured as in the sixth embodiment (step S5). After the duration exceeds a predetermined length of time (step S6), a static state is assumed. Subsequent operations are similar to those in the sixth embodiment.

(Ninth Embodiment)

Figure 29:
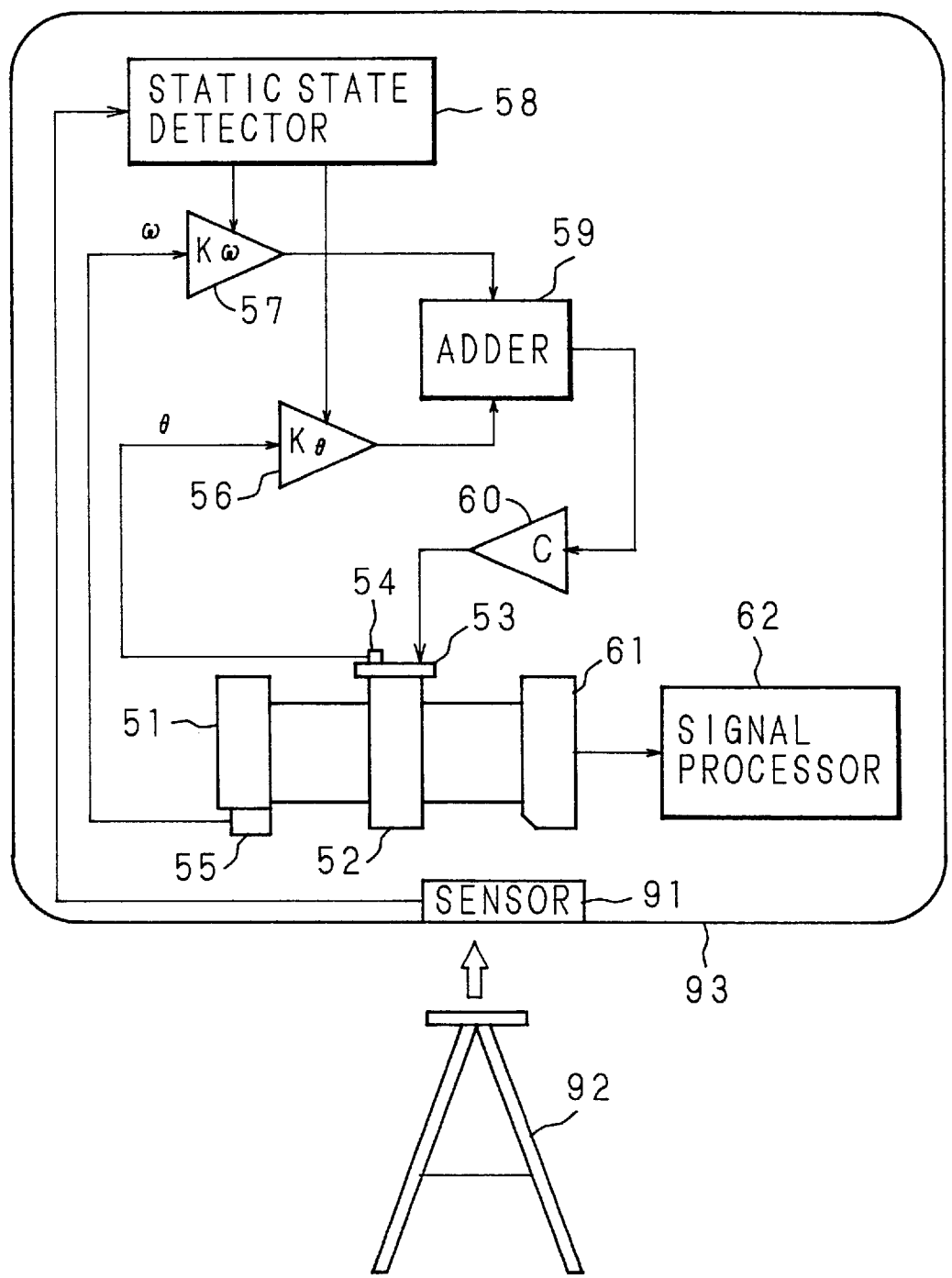
FIG. 29 is a diagram showing the configuration of an image pick-up apparatus according to a ninth embodiment of the invention.

FIG. 29 is a diagram showing the configuration of an image pick-up apparatus according to a ninth embodiment of the invention. This embodiment, in addition to the component parts of the sixth embodiment, comprises a sensor 91 such as a microswitch installed at the position of the tripod of the housing 93 of the image pick-up apparatus for detecting the attachment of the tripod 92. The static state detector 58 monitors the output of the sensor 91. In the case where the tripod 92 is mounted, a static imaging state is assumed. The subsequent operations are similar to those of the sixth embodiment.

(Tenth Embodiment)

Figure 30:
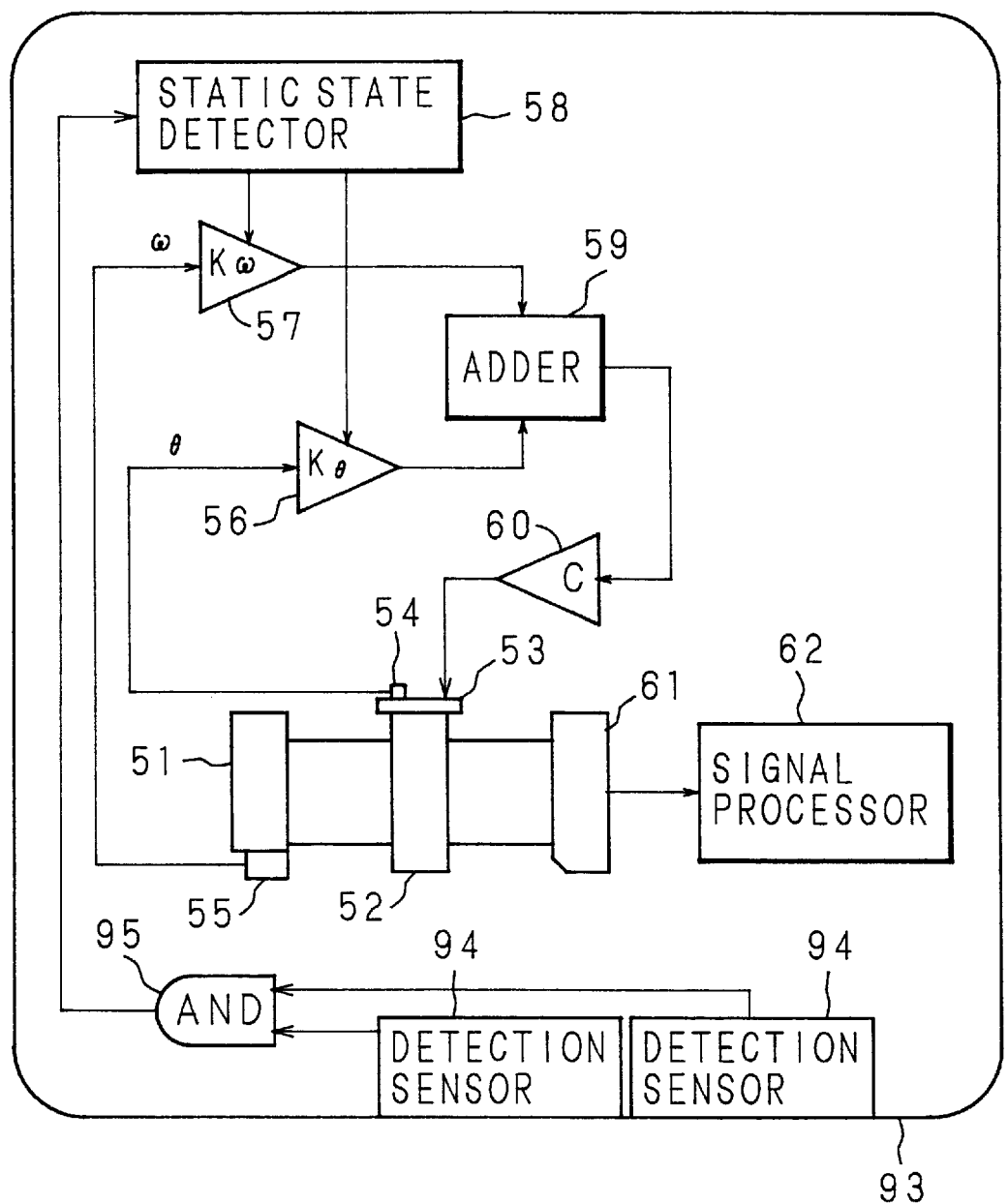
FIG. 30 is a diagram showing the configuration of an image pick-up apparatus according to a tenth embodiment of the invention.

FIG. 30 is a diagram showing the configuration of an image pick-up apparatus according to a tenth embodiment of the invention. In addition to the component parts of the sixth embodiment, the embodiment under consideration has a contact detection sensor 94 such as a microswitch at the bottom of the housing 93. When the detection sensor 94 detects a contact, the image pick-up apparatus is assumed to be placed on a rest or the like. The static state detector 58 then detects that the housing is static by the output of the detection sensor 94. In order to prevent the erroneous operation by the operator touching the sensors, however, a plurality of the detection sensors 94 (two in the embodiment under consideration) are provided, so that the logic product of the outputs of the detection sensor 94 is determined by an AND gate 95, and the result of logic multiplication is used for decision. The subsequent operations are similar to those in the sixth embodiment.

(11th Embodiment)

In the sixth to tenth embodiments, the gain of the angular loop was increased in order to restore the lens barrel 51 to the reference position. A similar effect is obtained by a mechanical fixing device.

Figure 31:
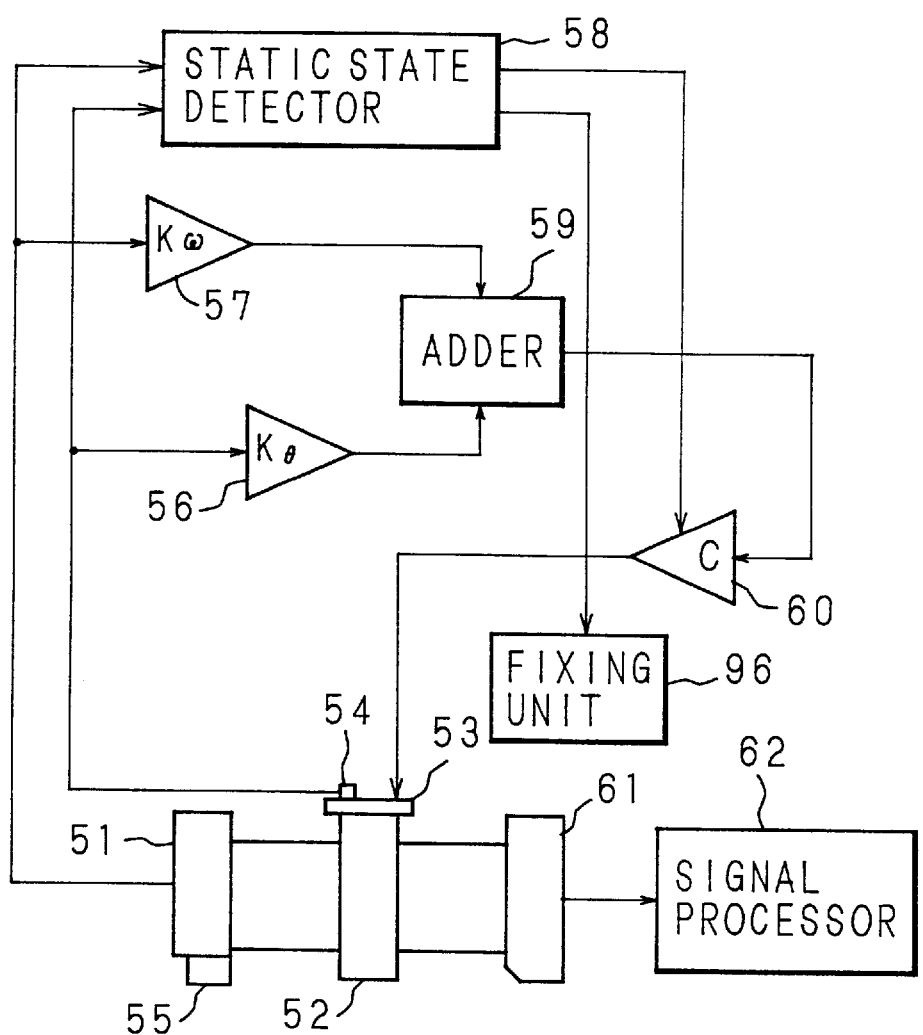
FIG. 31 is a diagram showing the configuration of an image pick-up apparatus according to an 11th embodiment of the invention.

FIG. 31 is a diagram showing the configuration of an image pick-up apparatus according to an 11th embodiment of the invention. In the case where the static state detector 58 detects that the image pick-up apparatus is in static state, the fixing unit 96 for the lens barrel 51 can fix the lens barrel 51 at a reference position. Further, as long as the lens barrel 51 is fixed at the reference position, power supply to the drive mechanism for the lens barrel 51 is stopped to conserve the power consumption.

The mechanism for restoring the lens barrel to the reference position in the sixth to 11th embodiments may of course be used for fixing the lens barrel at the time of power failure or in the case where the hand error correction function is not used.

As described above, according to the image pick-up apparatuses of the sixth to 11th embodiments, even in a control system with a comparatively low resolution, a sufficient level of hand error correction function is obtained. Also, the resolution of the control system can be set low as compared with the required hand error correction ability, and therefore the hardware scale can be reduced. Further, the control system used for hand error correction is shared, so that the increase in the scale of hardware is prevented on the

(12th Embodiment)

Figure 3:
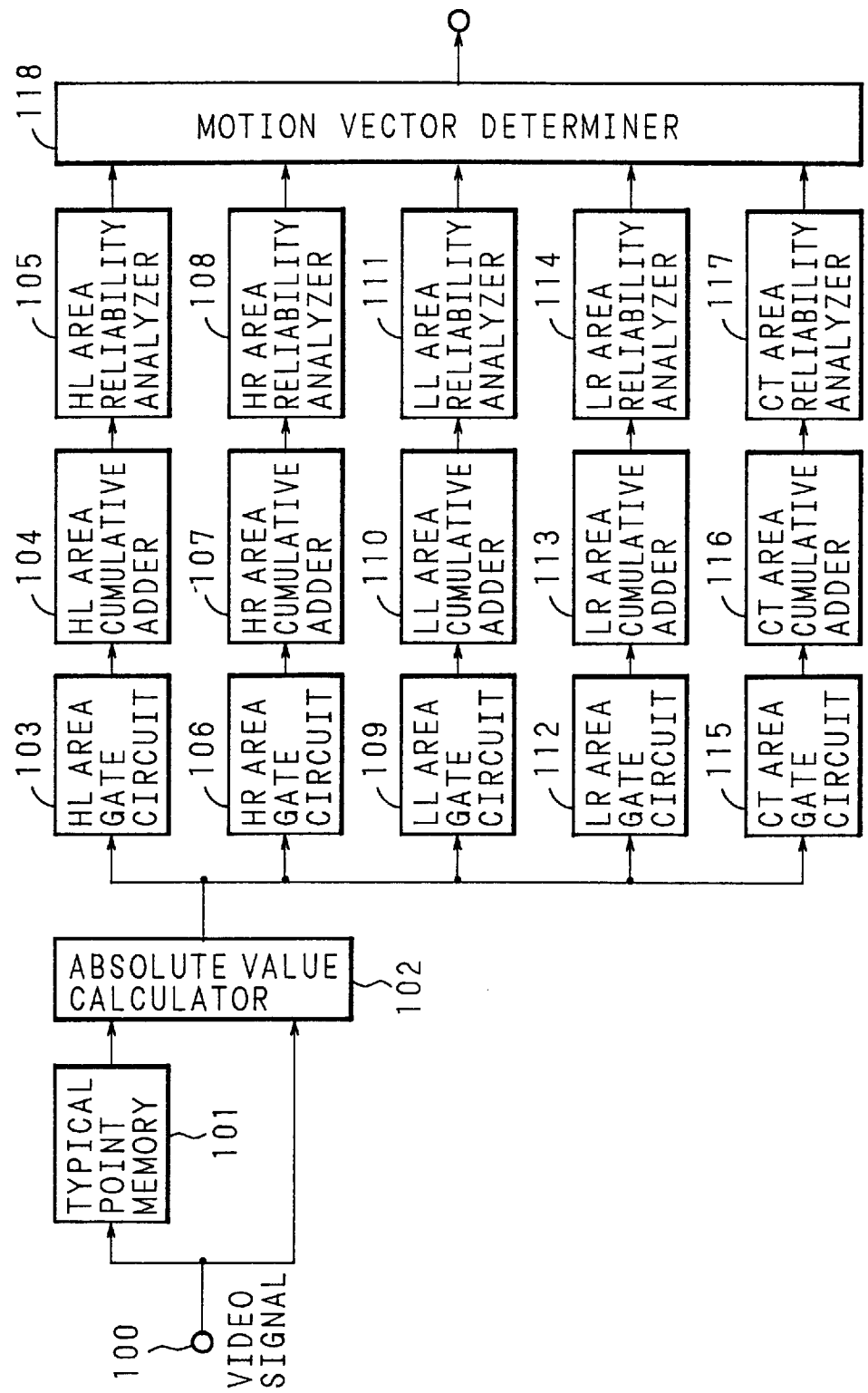
FIG. 3 is a block diagram showing a conventional motion vector detection system.
Figure 4:
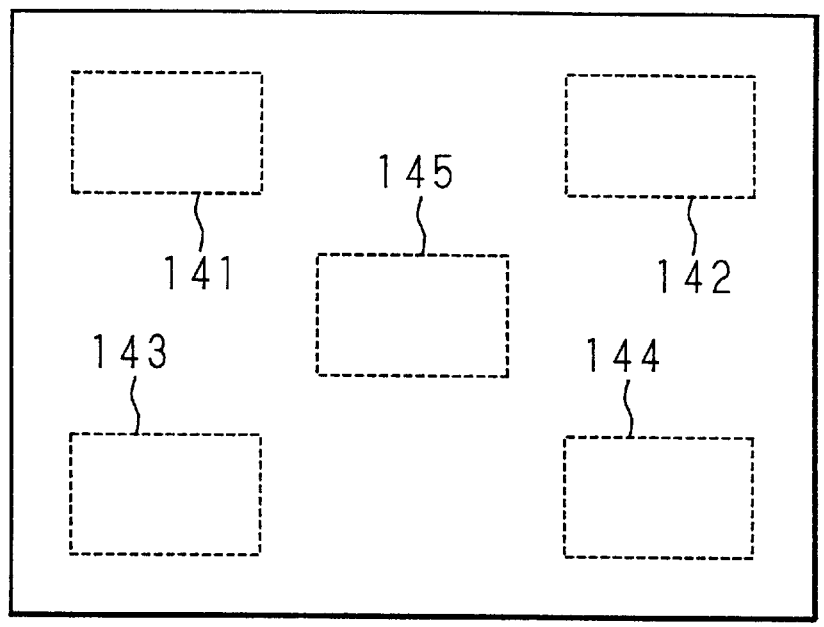
FIG. 4 is a diagram showing a detection area for a conventional motion vector detection system.
Figure 6:
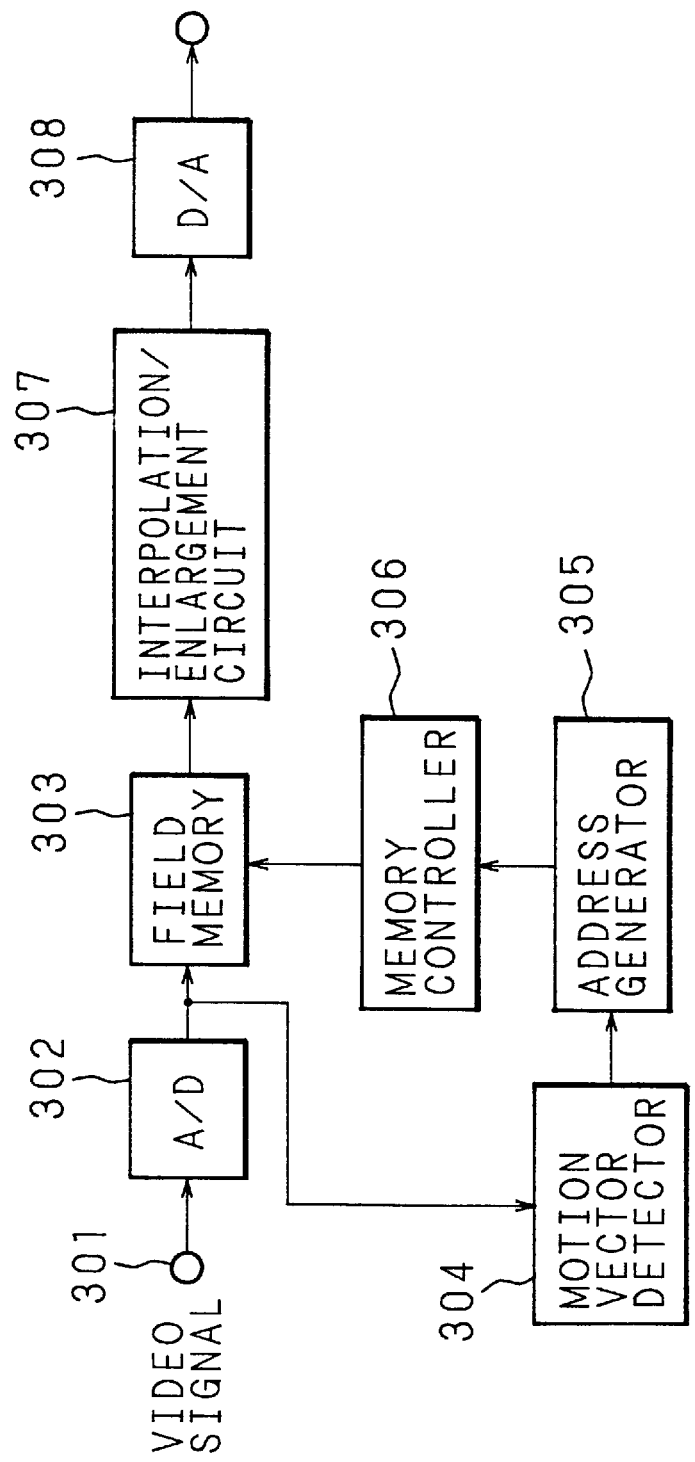
FIG. 6 is a block diagram showing a conventional image swing correction system.
Figure 32:
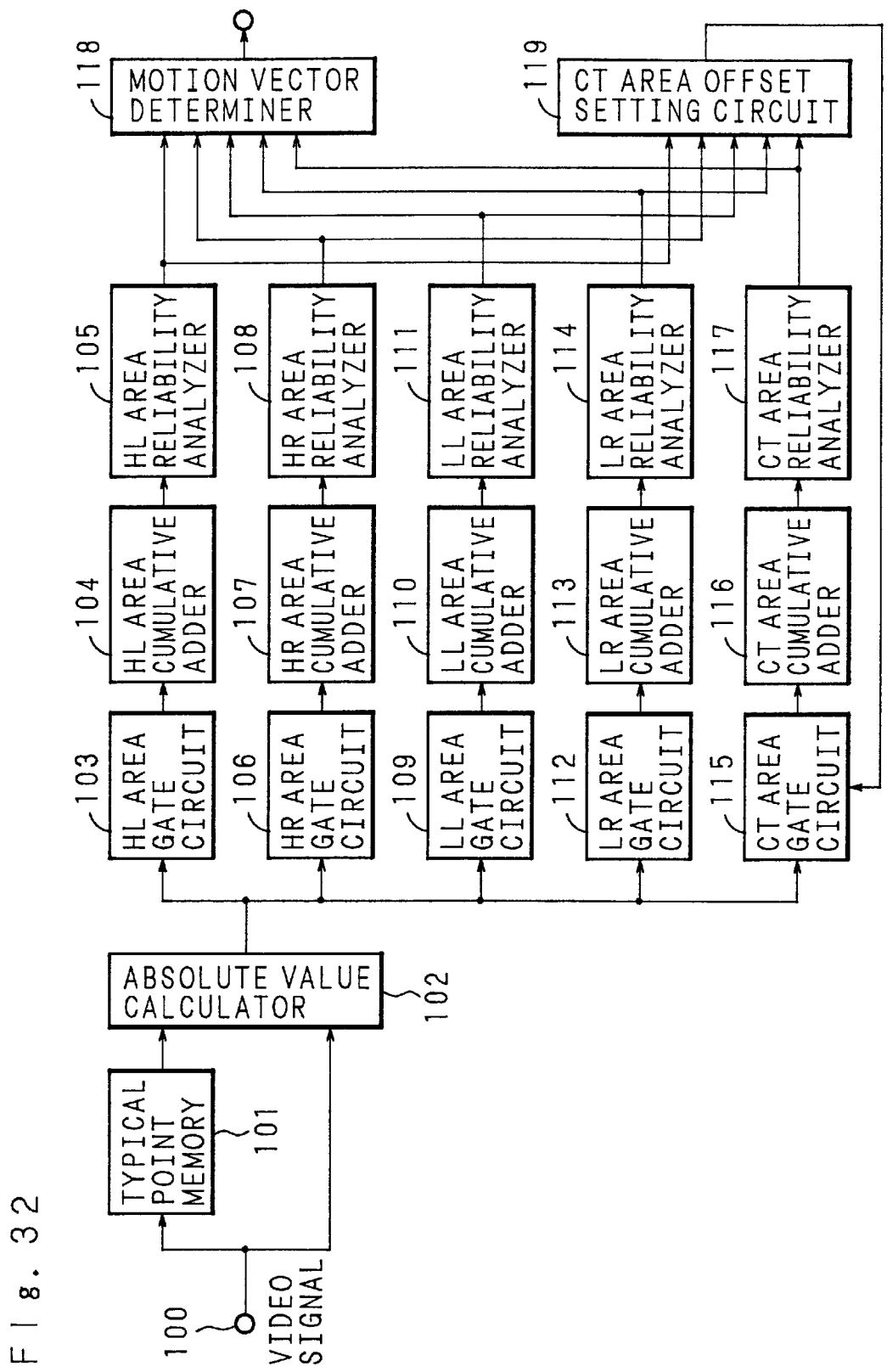
FIG. 32 is a block diagram showing a motion vector detection apparatus according to a 12th embodiment of the invention.

FIG. 32 is a circuit diagram shown in blocks of a motion vector detection apparatus according to a 12th embodiment of the invention. Description will be made about a case of configuration having four fixed motion detection areas (HL, HR, LL, LR) and a movable area (CT), in total, five detection areas. In FIG. 32, the same reference numerals as those in FIG. 3 denote the same component parts respectively. Numeral 119 designates a CT area offset setting circuit for giving an offset from the reference position to the CT area a which is a movable area.

Figure 33:
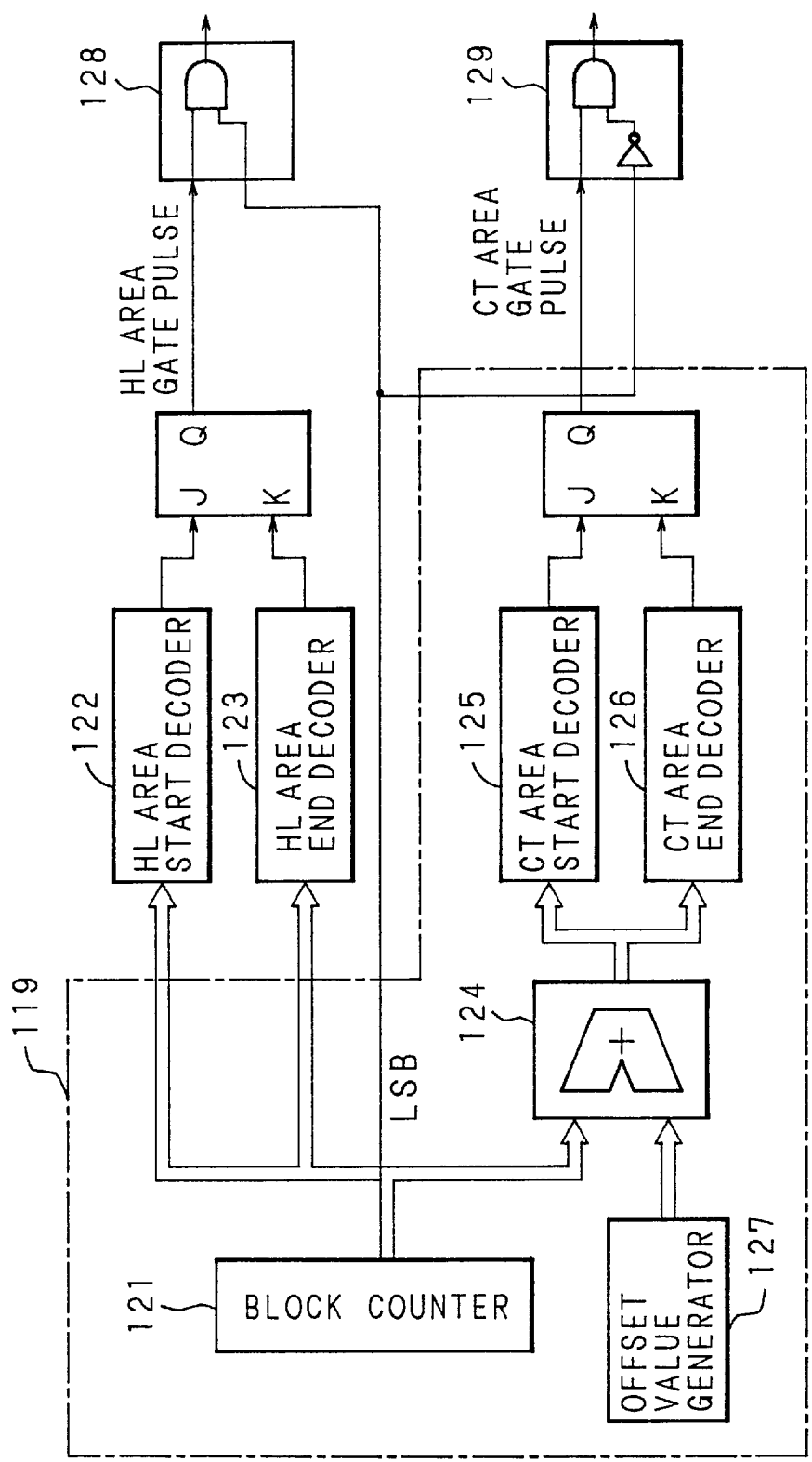
FIG. 33 is a block diagram showing an offset setting circuit according to the 12th embodiment.

FIG. 33 is a block circuit diagram of a CT area offset setting circuit according to an embodiment. Actually, this embodiment includes two block counters in horizontal and vertical directions. For convenience' sake, however, only one block counter 121 is shown. For other fixed areas, or HL area, for example, a block counter is decoded by an HL area start decoder 122 arid an HL area end decoder 123, and by setting and resetting them respectively, an area gate pulse is prepared. In the case of CT area, however, the block counter value and an offset value from an offset value generator 127 are added to each other at an adder circuit 124. The result of this calculation is decoded at the CT area start decoder 125 and the CT area end decoder 126, thereby preparing a movable area gate pulse.

Figure 34:
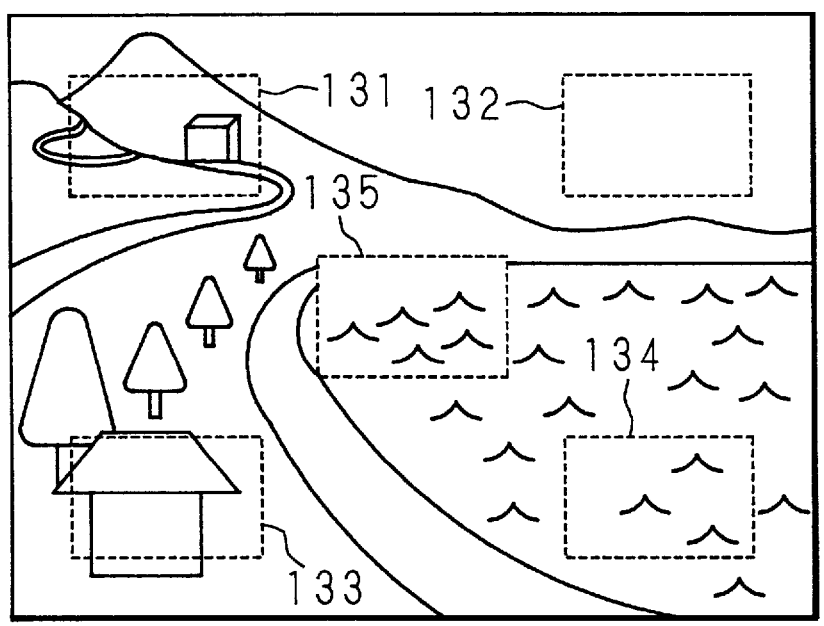
FIG. 34 is a diagram showing an example of an image screen according to the 12th embodiment.

Now, the operation will be explained. Assume that an image of a landscape is picked up from the automobile as shown in FIG. 34. The values of typical points on the front screen are stored in a typical point memory 101, and an absolute value calculator 102 calculates the absolute values as compared with the picture elements around the typical points of the present screen. The absolute values thus calculated are passed through gate circuits 103, 106, 109, 112, 115 and integrated at cumulative adders 104, 107, 110, 113, 116, thereby adding cumulatively by the timing of the motion detection areas respectively. The reliability of each cumulative sum is decided at reliability analyzers 105, 108, 111, 114, 117. Basically, when the reliability is high, the minimum position of the cumulative sum is used as a motion vector.

In FIG. 34, mountains represent most of the HL area 131 with a few number of buildings. In the case where mountains have no change in brightness level as in the shown case, FIG. 5(b) is involved as reliability is low. Depending on the number of buildings and the thickness of trees, however, FIG. 5(a) rather than FIG. 5(b) is applicable, leading to decision on a reliability. In the HR area 132, the sky covers the whole, and 5(b) is involved, so that decision is a low reliability. For the LL area 133, in which a natural image of buildings and trees is taken, FIG. 5(a) is applicable. The decision is that reliability is high. The LR area 134 and the CT area 135 are where the sea represents a most part. In the absence of waves, FIG. 5(b) is more applicable than others, while in the presence of waves, FIGS. 5(c), (d) are rather involved. In any way, it is decided that reliability is low.

As a result, the decision is that the HL and LL areas are high and the HR and LR areas are low in reliability. The final motion vector, therefore, is determined from the HL and LL areas. If there are 30 typical points for each area, for example, a motion vector is detected from 60 typical points.

Figure 36:
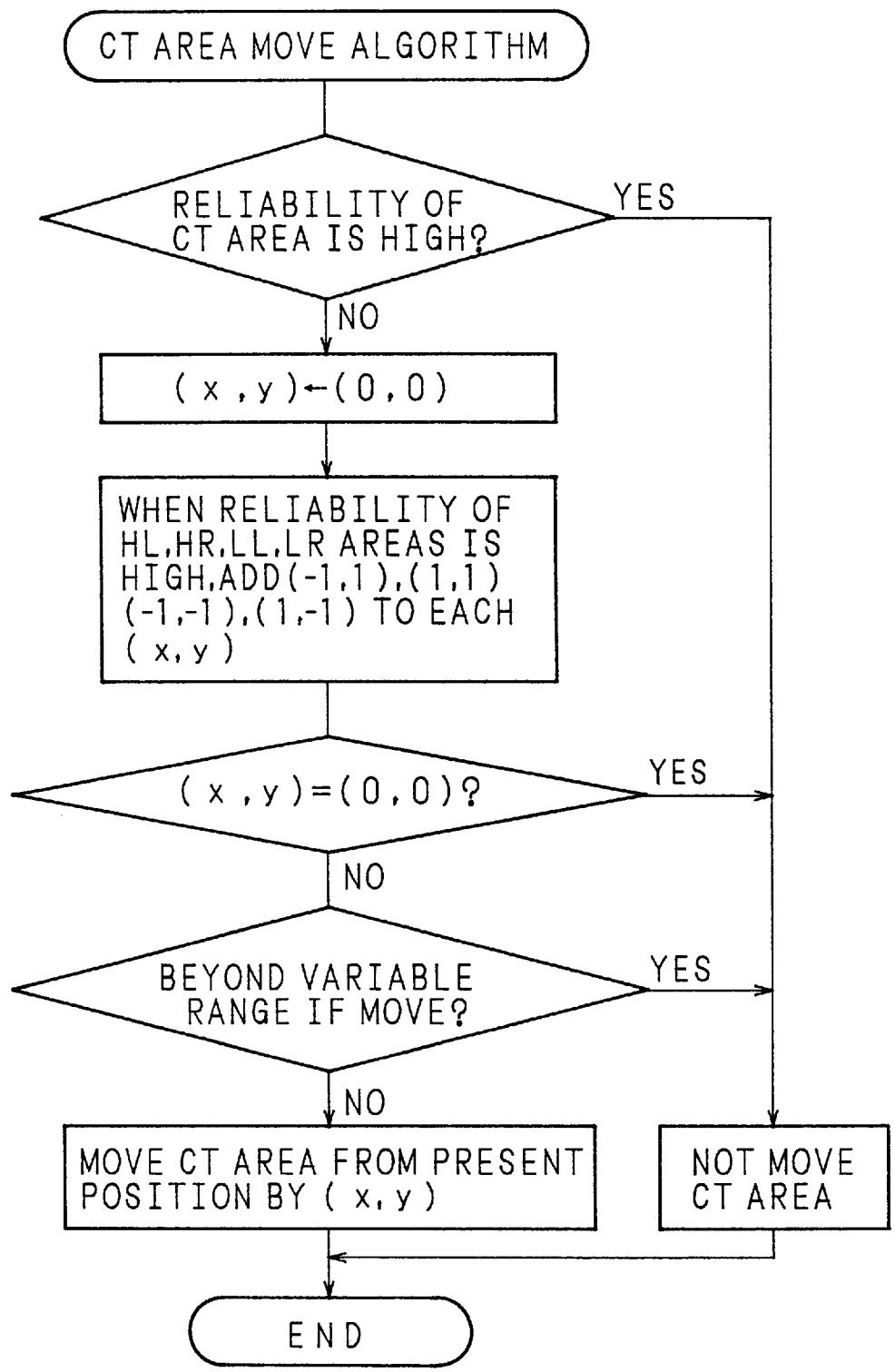
FIG. 36 is a diagram showing an example of the CT area movement algorithm according to the 13th embodiment.

Also, since the reliability analysis shows that the left-hand side of the screen is higher in reliability, the CT area might better be moved leftward to improve the reliability. In accordance with the algorithm shown in FIG. 36, for instance, the high reliability of the CT and LL areas results in (x, y)=(−2.0, 0), so that the CT area is moved two steps leftward in the next screen. In each of the succeeding screens, a similar algorithm is repeated and if the result of reliability analysis remains unchanged, the CT area is moved two steps leftward. This movement is stopped when reliability becomes sufficiently high.

Under this condition, analysis is that the reliability of the CT area is also high. Therefore, the final motion vector is determined by adding the CT area to the HL and LL areas. In the process, 90 typical points are used for final determination, resulting in an improved detection accuracy as compared with the initial 60 points.

As explained above, the detection area can be moved. When the user designates a detection area taking the image pattern, the position of the object, etc. into consideration, therefore, the swing or drift of the particular part is eliminated in operation or other measure taken as desired. Also, since the detection area is moved in accordance with the reliability analysis of the motion vector detected in each area, it is possible to set a detection area on an ideal pattern or an object automatically without user designation.

(13th Embodiment)

Figure 35A:
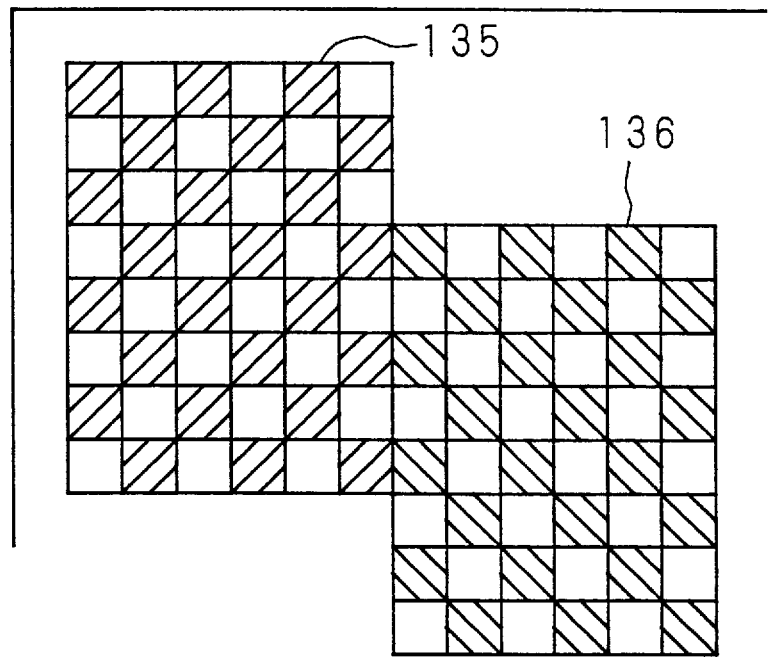
FIGS. 35(*a*), (*b*) are diagrams showing an example in which detection blocks for fixed and movable areas are not overlapped according to a 13th embodiment of the invention.
Figure 35B:
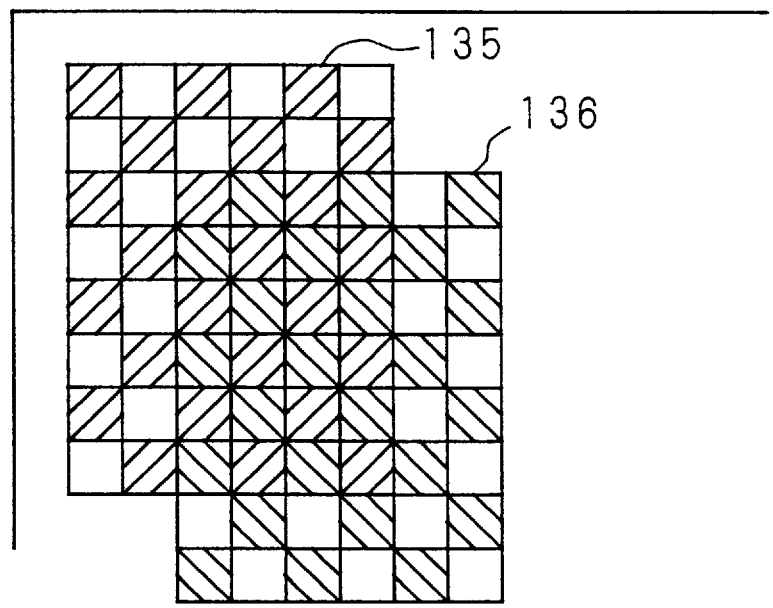

Now, explanation will be made about a 13th embodiment in which the overlap of detection points (typical points) is prevented at the time of moving a movable area. As shown in FIG. 33, a gate circuit 128 takes the logic product of the gate pulse of a fixed area and the least significant bit of a block counter, and a gate circuit 129 the logical product of the gate pulse of a movable area and the inversion of the least significant bit of a block counter. This operation is performed for both horizontal and vertical directions to arrange typical points in the manner shown in FIGS. 35(a), (b). In FIGS. 35(a), (b), a rightwardly hatched area 135 designates the detection block position of a fixed area, and the leftwardly hatched area 136 the detection block position of a movable area. In this case, even in the case where areas are adjacent to each other as shown in FIG. 35(a) or overlapped as shown in FIG. 35(b), typical points are not overlapped. As compared with the case in which typical points of the same number are overlapped, the final motion vector can be detected from more positions.

The same detection point is not used when a movable area is moved and overlapped on a fixed area. Therefore, detection is not overlapped at the same detection point but effected from more detection points, thereby improving the detection accuracy.

Now, explanation will be made about the operation in tracking mode according to the 12th or 13th embodiment. The tracking mode is defined as a mode in which a ranging area for auto focusing or a photometric area for auto iris is moved following the movement of an object. The motion vector detection in the image swing correction mode is performed, as described above, by determining and moving the position of a movable area on the basis of the result of reliability analysis for the whole area. In tracking mode, on the other hand, the position of a movable area, rather than the motion vector of the movable area, is determined and moved. As a result, the tracking area for tracking mode may be doubled as a movable area for image swing correction. The two functions are thus realized without increasing the circuit scale.

Although the 12th or 13th embodiment described above concerns a typical matching method, an all-point matching method for determining the correlations for all picture elements or other appropriate detection methods may alternatively be used. Also, in spite of the fact that the foregoing description involves four fixed areas and one movable area, any other number of movable or fixed areas is applicable. Unlike the above-described example of reliability analysis algorithm in which the change of image pattern is excessively small, periodic or excessively large, various other algorithms may be considered by utilizing the chronological or positional change thereof or determination of intrusion of a moving object, etc. Apart from the explained case in which a movable area is moved several steps each time, the number of steps moved at a time may be greater. Also, the algorithm of FIG. 36 involves a case in which the CT area is not moved when (x, y)=(0, 0), the CT area may alternatively be moved in oscillation.

(14th Embodiment)

Figure 37:
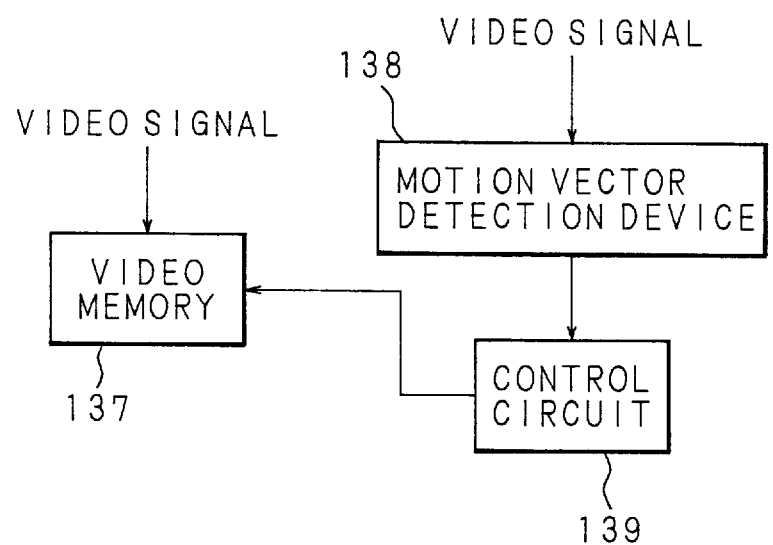
FIG. 37 is a block diagram showing an image swing correction apparatus according to a 14th embodiment of the invention.

Explanation will be made about an image swing correction apparatus using a motion vector detection apparatus configured as described above. FIG. 37 is a block diagram showing the configuration of an image swing correction apparatus according to a 14th embodiment. In FIG. 37, numeral 137 designates a video memory for storing a video signal of at least one field, numeral 138 a motion vector detection device according to the 12th or 13th embodiment described above, and numeral 139 a control circuit for controlling the read position in the video memory 137.

A video signal is applied to the video memory 137, which stores such a video signal of at least one field. The motion vector detection device 138 is also supplied with a video signal and, as described above, a motion vector is detected. The motion vector thus detected is applied to the control circuit 139. The control circuit 139, controls the read position of the video signal of the video memory 137 on the basis of the motion vector. As a result, an image swing correction apparatus is realized without any feeling of physical disorder against the object.

(15th Embodiment)

Figure 38:
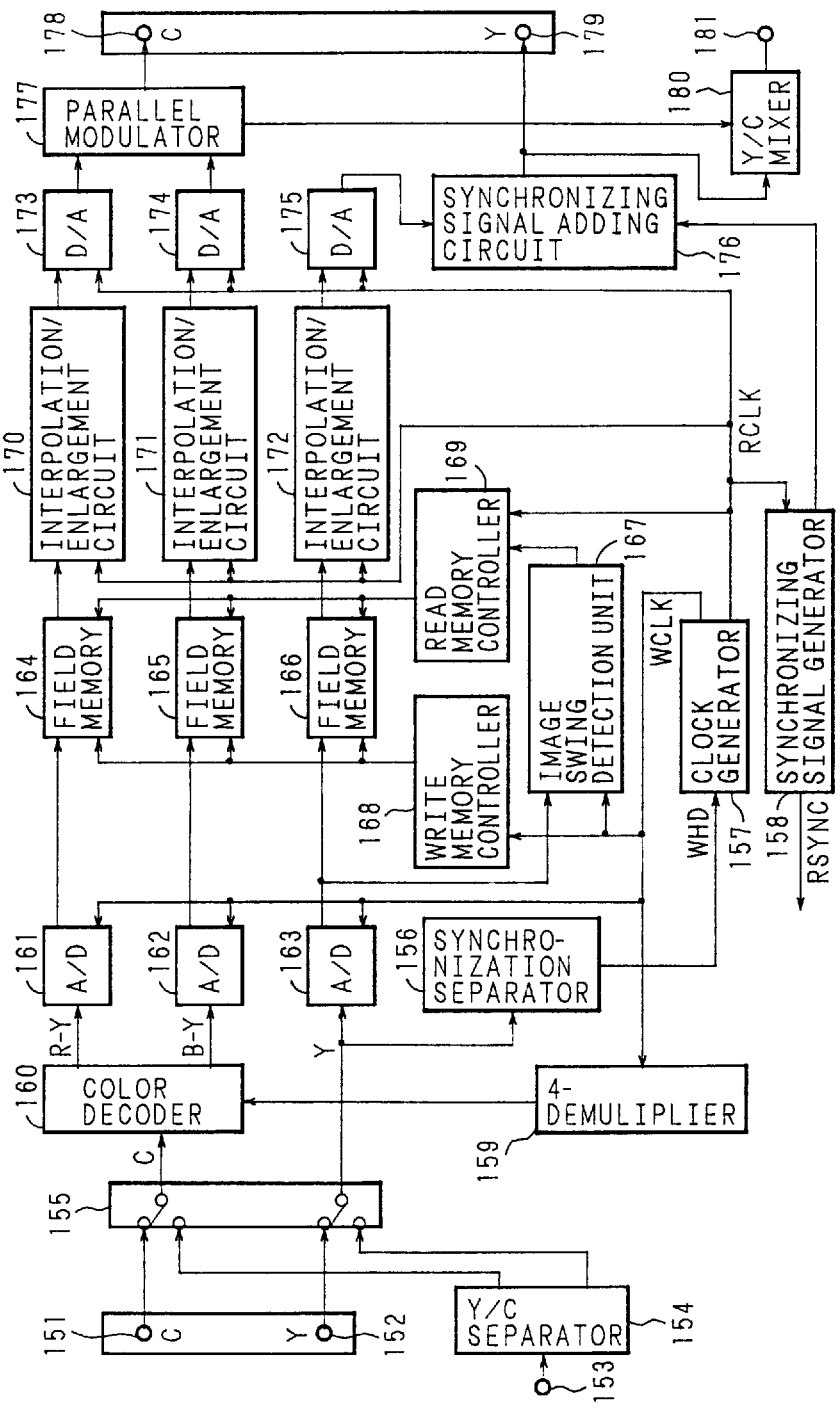
FIG. 38 is a block diagram showing an image swing correction system according to a 15th embodiment of the invention.

FIG. 38 is a block diagram showing the general configuration of an image swing correction apparatus according to a 15th embodiment of the invention. In FIG. 38, numerals 151, 152 designate input terminals for a Y/C separate video signal supplied with the chroma signal and the luminance signal respectively, numeral 153 an input terminal for the composite video signal, numeral 154 a Y/C separator for separating the composite signal applied to the input terminal 153 into a chroma signal and a luminance signal, numeral 155 an input change-over switch for selecting the video signal from the input terminals 151 and 152 or the video signal from the Y/C separator 154, and numeral 156 a synchronization separator for separating the synchronizing signal from the luminance signal supplied from the input change-over switch 155.

Numeral 157 designates a clock generator for generating a write clock WCLK and a read clock RCLK corresponding to the synchronizing signal produced from the synchronization separator 156, numeral 158 a synchronizing signal generator for generating a read synchronizing signal RSYNC on the basis of the read clock RCLK produced from the clock generator 157, numeral 159 a 4-demultiplier for dividing the write clock WCLK produced from the clock generator 157 into four parts, and numeral 160 a color decoder for converting the chroma signal produced from the input change-over switch 155 into two color difference signals R-Y and B-Y on the basis of the output signal of the 4-demultiplier 159.

Also, numerals 161, 162, 163 designate A/D converters for converting the R-Y and B-Y signals produced from the color decoder 160 and the luminance signal produced from the input change-over switch 155 into a digital signal at a timing of the write clock WCLK produced from the clock generator 157. Numerals 164, 165, 166 designate field memories for writing the R-Y signal, the B-Y signal and the luminance signal produced from the A/D converters 161, 162, 163 at a timing of the write clock WCLK produced from the clock generator 157 respectively, and after a field of time, reading them at a timing of the read clock RCLK.

Numeral 167 designates an image swing detection unit for detecting the motion vector for the whole image at each field from the digitally-converted luminance signal produced from the A/D converter 163. Numeral 168 designates a write memory controller for controlling the write operation of the field memories 164, 165, 166 from the write clock WCLK produced from the clock generator 157 and the synchronizing signal produced from the synchronization separator 156. Numeral 169 designates a read memory controller for controlling the read operation of the field memories 164, 165, 166 in accordance with the read clock RCLK produced from the clock generator 157 and the output of the image swing detection unit 167.

Numerals 170, 171, 172 designate interpolation enlargement circuit for enlarging the output signals of the field memories 164, 165, 166 into the original screen size, numerals 173, 174, 175 D/A converters for converting the outputs of the interpolation enlargement circuits 170, 171, 172 into analog signals respectively, and numeral 176 a synchronizing signal adding circuit for adding the synchronizing signal produced from the synchronizing signal generator 158 to the luminance signal produced from the D/A converter 175.

Further, numeral 177 designates a parallel modulator for converting the color difference signals produced from the D/A converters 173, 174 into a chroma signal of NTSC standard, numerals 178, 179 Y/C separate video signal output terminals for producing a chroma signal and a luminance signal respectively, numeral 180 a Y/C mixer for generating a composite video signal by mixing the chroma signal produced from the parallel modulator 177 with the luminance signal produced from the synchronizing signal adding circuit 176, and numeral 181 an output terminal for producing an output signal of the Y/C mixer 180 to external circuits.

Now, the operation of this embodiment will be explained. The video signal of which the swing is to be corrected is applied to the input terminals 151, 152 if it is a Y/C separate signal, and to the input terminal 153 if it is a composite video signal. Further, the video signal applied to the input terminal 153 is separated into the luminance signal and the color signal by the Y/C separator 154. The input change-over switch 155 selects the luminance signal or the color signal produced from the input terminals 151, 152 or those from the Y/C separator 154. The synchronization separator 156 extracts the synchronizing signal from the luminance signal selected by the input change-over switch 155 and produces the extracted signal as a write horizontal synchronizing signal WHD.

The clock generator 157 generates a write clock WCLK and a read clock RCLK in accordance with the write horizontal synchronizing signal WHD produced from the synchronization separator 156. The write clock WCLK is a clock modulated by the time-base error detected from the write horizontal synchronizing signal WHD, and provides a reference clock for the A/D converters 161, 162, 163, the image swing detection unit 167 and the write memory controller 168. The read clock RCLK, on the other hand, serves as a reference clock for the synchronizing signal generator 158, the read memory controller 169, the interpolation/enlargement circuits 170, 171, 172 and the D/A converters 173, 174, 175. Also, the average frequency of the write clock WCLK and the read clock RCLK is assumed to be four times as high as the color subcarrier frequency fsc.

Figure 39:
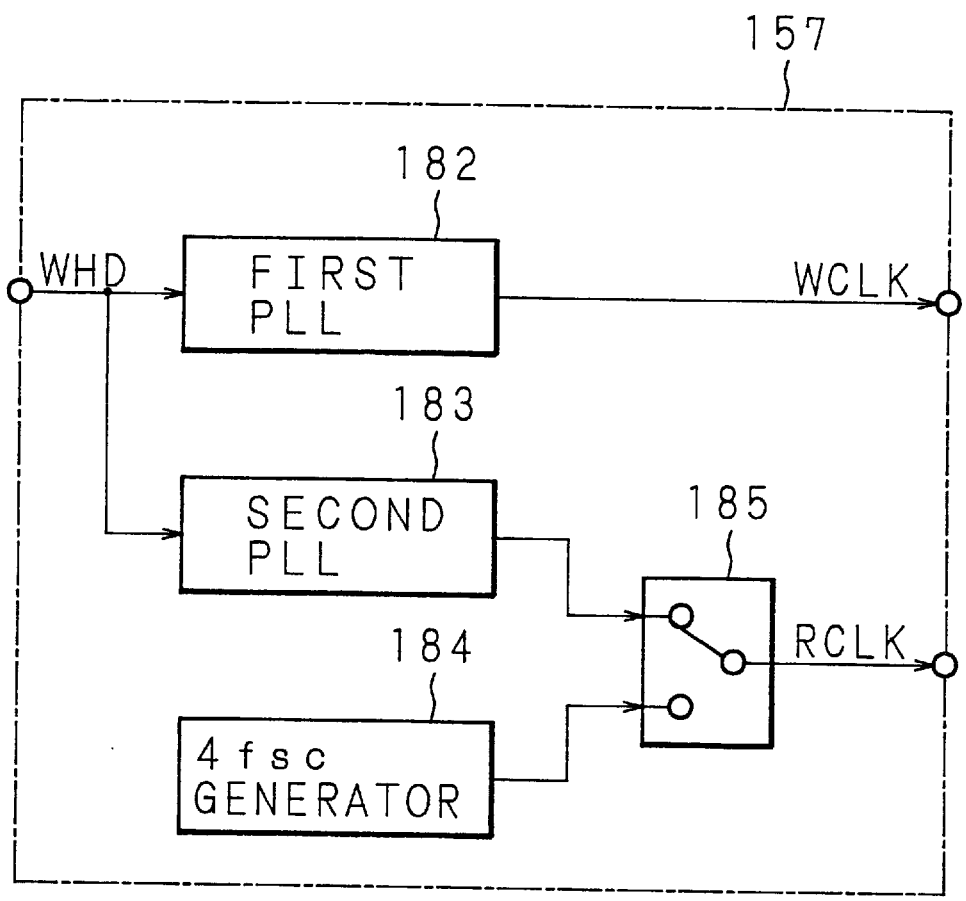
FIG. 39 is a block diagram showing a clock generator according to the 15th embodiment.

FIG. 39 shows a specific configuration of the clock generator 157. In FIG. 39, numeral 182 designates a first phase-locked loop (hereinafter referred to as "PLL") for generating a frequency signal equivalent to the frequency fHW of the write horizontal synchronizing signal WHD generated by the synchronization separator 156 to the 910th power and produces it as a write clock.

Figure 40:
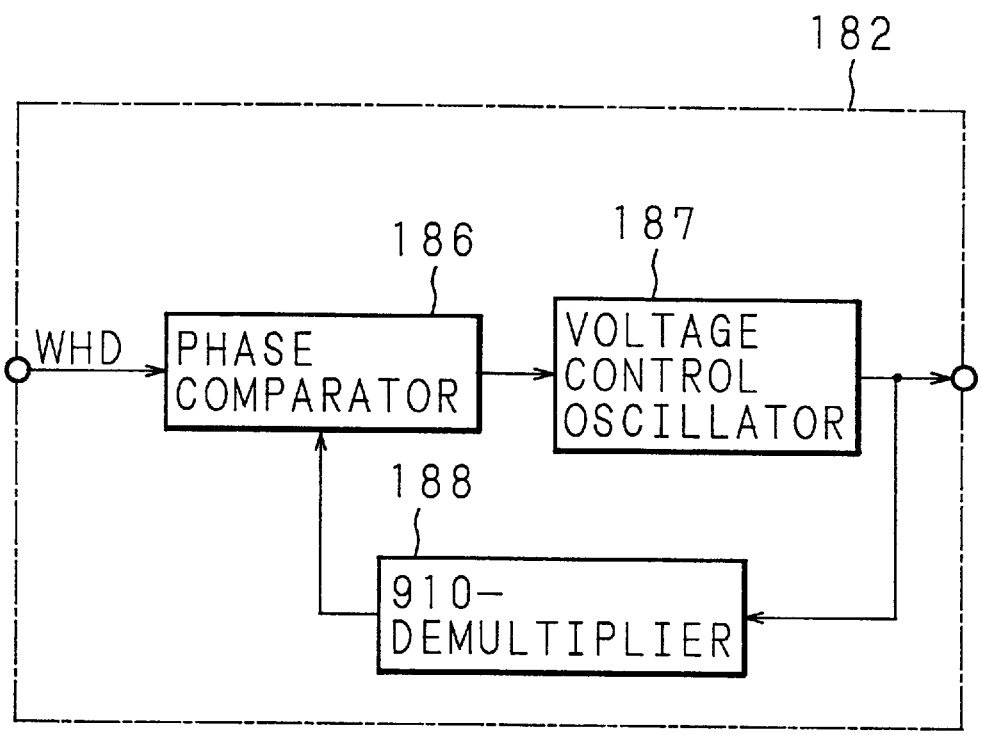
FIG. 40 is a block diagram showing a first PLL in the clock generator according to the 15th embodiment.

FIG. 40 is a block circuit diagram showing a specific configuration of the first PLL 182. In FIG. 40, numeral 186 designates a phase comparator for producing a voltage corresponding to the phase difference between the input signals of two systems, numeral 187 a voltage control oscillator for generating a signal with the frequency thereof changing in accordance with the voltage produced by the phase comparator 186, and numeral 188 a 910th frequency divider for dividing the frequency of the output signal of the voltage control oscillator 187 by a factor of 910. The phase comparator 186 compares the phase of the output signal of the voltage control oscillator 187 frequency-divided by 910 at the 910th frequency divider 188 with the phase of the write horizontal synchronizing signal WHD produced from the synchronization separator 156, and applies a voltage corresponding to the phase difference to the voltage control oscillator 187, thus constituting a PLL driven by the write horizontal synchronizing signal WHD.

The frequency-dividing ratio of the 910th frequency divider 188 has a factor of 910 determined by the fact that. the relationship between the horizontal synchronizing frequency fH and the frequency fsc of the color subcarrier in the NTSC video signal is assumed to be fsc=$^{455}/_{2}$×fH. The voltage-control oscillator 187 is capable of producing an output signal of a frequency four times the frequency fsc of the color subcarrier of the input video signal, i.e., 910 times the frequency fHW of the write horizontal synchronizing signal WHD.

Figure 41:
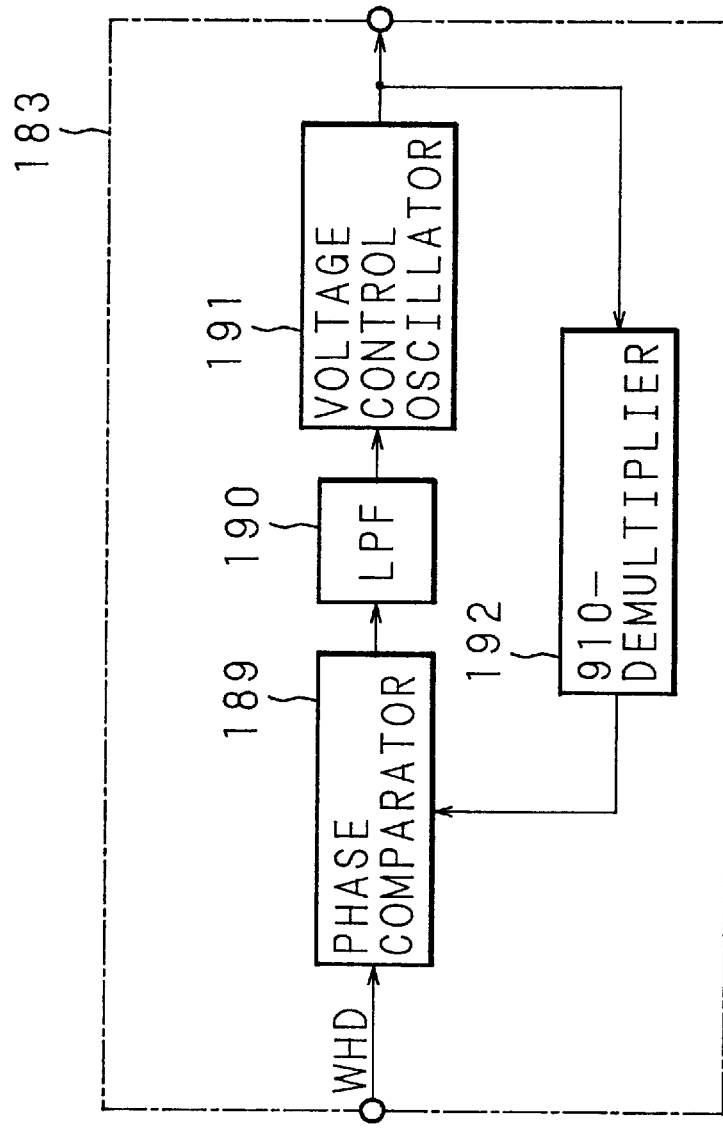
FIG. 41 is a block diagram showing a second PLL in the clock generator according to the 15th embodiment.

Also, in FIG. 39, numeral 183 designates a second PLL for producing a signal 910 times higher than the average frequency/fHW of the write horizontal synchronizing signal WHD. A specific configuration of the second PLL is shown in FIG. 41. In FIG. 41, numeral 189 designates a phase comparator, numeral 190 a low-pass filter (hereinafter referred to as "LPF") for extracting and producing a low frequency component of the output signal of the phase comparator 189, numeral 191 a voltage control oscillator for generating a signal of a frequency corresponding to the output voltage of the LPF 190, and numeral 192 a 910th frequency divider for dividing the frequency of the output signal of the voltage control oscillator 191 by a factor of 910. The phase comparator 189 produces a voltage signal corresponding to the phase difference between the write horizontal synchronizing signal WHD and the output signal of the 910 frequency-divider 192, and applies it to the LPF 190. As a result, the phase comparator 189, the LPF 190, the voltage-control oscillator 191 and the 910 frequency divider 192 constitute a PLL driven by the write horizontal synchronizing signal WHD, with a time constant of the loop determined by the characteristics of the LPF 190.

The phase comparator 189 compares the phase of the output of the voltage-control oscillator 191 with that of the write horizontal synchronizing signal WHD in the frequency dividing ratio of 910, and therefore the output signal of the voltage control oscillator 191 has a frequency 910 times the frequency fHW of the write horizontal synchronizing signal WHD. Further, by taking a large time constant of the loop, a signal of a frequency substantially equal to 910 times the average value of the frequency of the write horizontal synchronizing signal WHD can be produced from the voltage control oscillator 191 without responding to the varying high frequency components of the write horizontal synchronizing signal WHD.

In FIG. 39, numeral 184 designates a 4 fsc generator for generating a signal having a frequency four times the color subcarrier frequency fsc of NTSC standard with a stability of crystal accuracy, and numeral 185 a read clock selection switch for selecting the output signal of the second PLL 183 or that of the 4 fsc generator 184 and applies the resultant output thereof as a read clock RCLK.

The clock generator 157 operates differently according to whether the VCR for reproducing the video signal (hereinafter referred to as "video signal source VCR") accepts the external synchronization or not. In the case where the video signal source VCR is for business use according to U-matic standard and has an external sync input., the read clock selection switch 185 selects the output of the 4 fsc generator 184. When the video signal source VCR is for home use and has no external sync input, on the other hand, it selects the output of the second PLL 183. This is in order to match the average frequency between the write clock and the read clock of the field memories 164, 165, 166.

First, the operation will be explained of a video signal source VCR having an external sync terminal (hereinafter referred to as "sync mode"). In the case of sync mode, the read clock selection switch 185 selects the output of the 4 fsc generator 184. The 4 fsc generator 184 generates a signal of a frequency 4 times the color subcarrier frequency fsc of NTSC standard with crystal accuracy, and produces the output as a read clock RCLK through the read clock selection switch 185. The synchronizing signal generator 158 generates the read synchronizing signal RSYN on the basis of the read clock RCLK and produces it as an external synchronizing signal for the video signal source VCR.

The video signal source VCR performs the reproducing operation for the video signal on the basis of the read synchronizing signal RSYNC. Therefore, the average frequency of the horizontal synchronizing signal for the video signal produced from the video signal source VCP, i.e., the write horizontal synchronizing signal WHD is equal to ⅟₉₁₀ of the read clock RCLK. Since the first PLL 182 generates the write clock WCLK of a frequency 910 times the frequency of the write horizontal synchronizing signal WHD, the frequency of the write clock WCLK changes in accordance with the frequency of the write horizontal synchronizing signal WHU. The average value of the clock WCLK, however, is equal to the frequency of the read clock RCLK.

Now, the operation will be explained of the case in which the video signal source VCR has no external sync input terminal (hereinafter referred to as "the stand-alone mode"). In the case of stand-alone mode, the read clock selection switch 185 selects the output signal of the second PLL 183. The average frequency of the output signals of the first PLL 182 and the second PLL 183 is 910 times the average frequency of the write horizontal synchronizing signal WHD, i.e., four times the average frequency of the color subcarrier frequency fsc of the input video signal. Since the time constant of the loop of the second PLL 183 is set to a large value, however, the output of the first PLL 182 rapidly follows the change in the frequency of the write horizontal synchronizing signal WHD, while the output signal frequency of the second PLL 183 slowly follows the change in the frequency fHW of the write horizontal synchronizing signal WHD and is substantially equal to the average frequency of the write clock WCLK.

The reproduced video signal of the VCR of U-matic, Betamax, VHS and 8 mm standards, except for some models, is not subjected to correction of time-base error of the luminance signal but the time-base error of the color signal. As a result, the color signal is required to be subjected to the same time-base error as the luminance signal before time-base correction. In converting the color signal into two color difference signals R-Y, B-Y at the color decoder 160, therefore, the write clock WCLK divided by four at the 4-demultiplier 159 is used as a reference signal. Specifically, the write clock WCLK is generated by multiplying the horizontal synchronizing signal containing time-base error to 910th power as described above, and the resultant frequency is equivalent to four times the color subcarrier frequency. The write clock WCLK quartered in frequency, therefore, is equivalent to a color subcarrier containing time-base error, and the color difference signals R-Y, B-Y demodulated with the color subcarrier as a reference signal contains the same time-base error as the luminance signal.

The luminance signal and the two color difference signals R-Y, B-Y produced from the color decoder 160 are converted into digital signals at a timing of the write clock WCLK at the A/D converters 161, 162, 163 respectively, written into the field memories 164, 165, 166 and read out after one field. The write control of the field memories 164, 165, 166 is effected by the write memory controller 168 with reference to the write clock WCLK, and the read control by the read memory controller 169 with reference to the read clock RCLK.

Now, the operation for correcting time-base error will be explained. The write clock and read clock of the field memories 164, 165, 166 are generated from the write clock WCLK and the read clock RCLK outputted by the clock generator 157 respectively, and the average frequency thereof is 910 times the horizontal sync frequency. This amounts to the fact that a video signal of one horizontal period is recorded as picture element data.

Since the write clock WCLK is generated as a horizontal synchronizing signal of the input video signal having time-base error multiplied by a factor of 910, the frequency thereof is subjected to constant change with the time-base error. The frequency of the read clock RCLK, however, is substantially constant at a level four times the color subcarrier of NTSC standard with crystal accuracy 910 times the average value of the horizontal sync frequency of the input video signal. As a result, the field memories 164, 165, 166 are operated to write into the storage area corresponding to each picture element of the input video signal at a timing coincident with the time-base error and read out regularly, thereby stabilizing the time base of the signal read out.

In the process, in the case where the reproduction VCR is capable of external synchronization, the read operation of the field memories 164, 165, 166, which is performed with reference to the 4 fsc clock of crystal accuracy, is capable of producing an output video signal of a higher time-base accuracy. The digitized video signal which is written into the field memories 164, 165, 166 is of course not required to cover the whole video period but may represent an effective video period for both vertical and horizontal directions.

Figure 42:
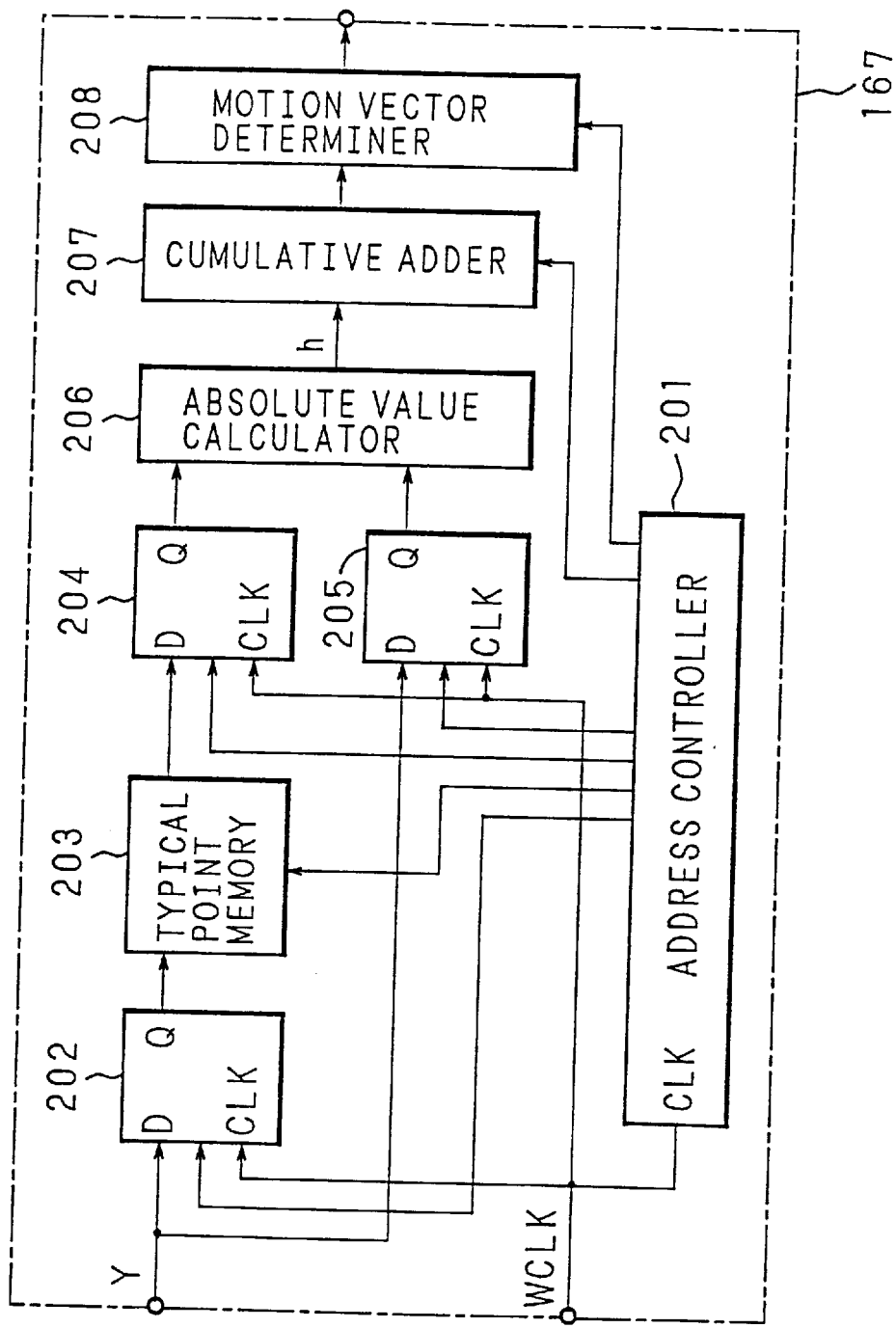
FIG. 42 is a block diagram showing an image swing detector according to the 15th embodiment.
Figure 43:
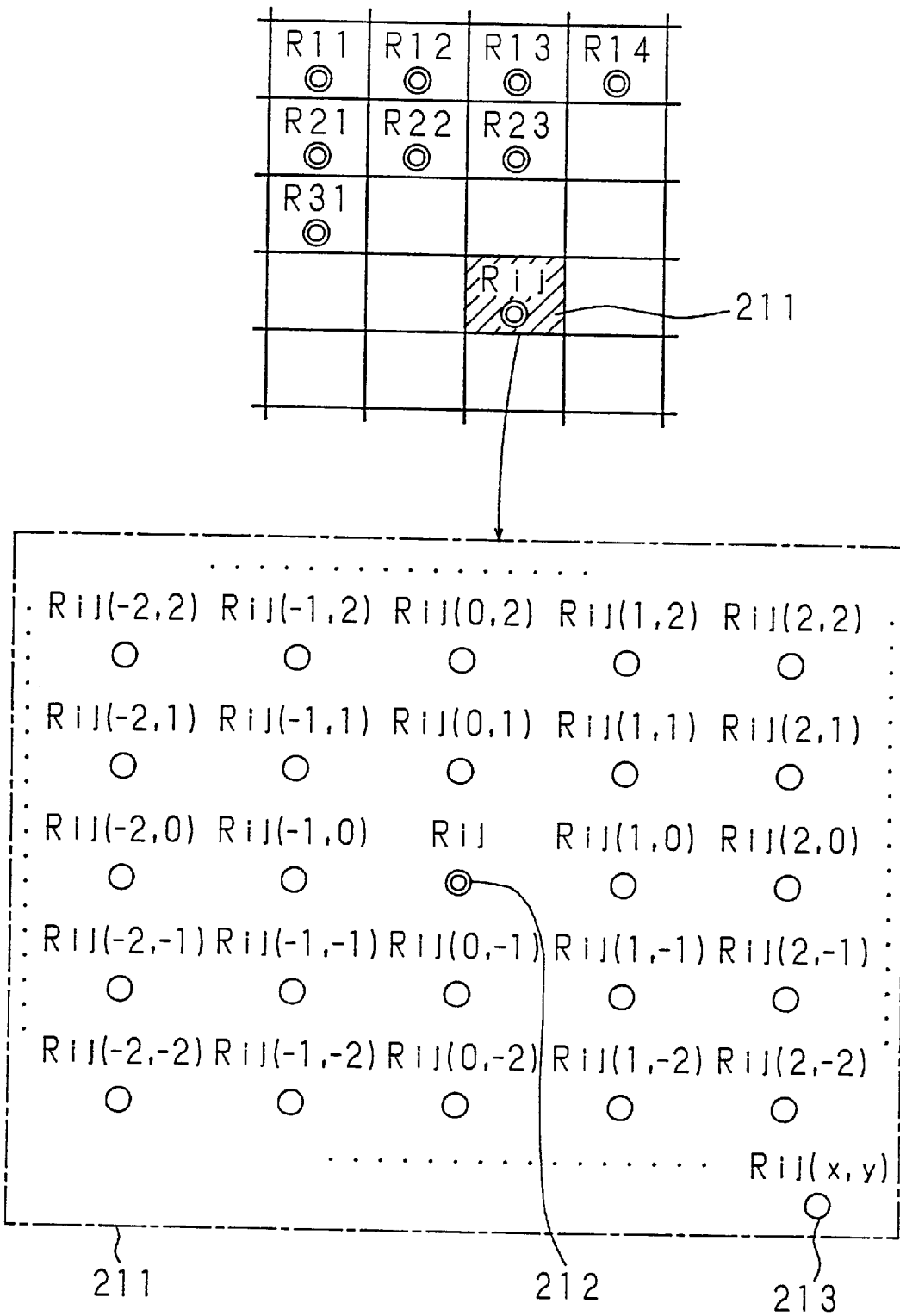
FIG. 43 is a diagram showing the relationship between an image block and typical points for explaining the data processing method according to the 15th embodiment.

The image swing detection unit 167 detects the motion vector of the whole image for each field by the well-known typical-point matching method. The typical-point matching method is to determine a motion vector for each field from the interfield correlationship between several picture elements selected as typical points and surrounding picture elements. FIG. 42 is a block diagram showing the image swing detection unit 167 according to a general typical-point matching method, and FIG. 43 a diagram showing the relationship between image blocks and typical points. The one-field image is divided into a predetermined number of blocks 211, each of which has one typical point Rij 212 at the center thereof. The level difference between the typical points one frame before and all the picture elements Pij (x, y) 213 in each block is calculated.

In FIG. 42, numeral 201 designates an address controller for controlling the operation timing of the whole circuit, numeral 202 a first latch circuit for latching the applied luminance signal at a timing of the picture element of a predetermined typical point, numeral 203 a typical point memory for writing the picture element data of the typical point latched at the first latch circuit 202 and reading it after storage of one field, numeral 204 a second latch circuit for latching the data on the picture element of a typical point read from the typical-point memory 203, numeral 205 a third latch circuit for latching the picture element data at a timing of correlation calculation with typical points, numeral 206 an absolute value calculator for calculating the absolute value of the difference between the picture element data on the typical point produced from the second latch circuit and the picture element data produced from the third latch circuit 205, numeral 207 a cumulative adder for cumulatively adding the output \f the differential absolute value calculator 206 together with the result of calculation of the picture elements having the same positional relation with each typical point, and numeral 208 a motion vector determiner for determining a motion vector with reference to the contents of the cumulative adder 207.

Now, the operation will be explained of an example of the calculation of the picture elements in the block 211. A predetermined picture element in the block 211 expected to provide a typical point 212 is written into a predetermined area of the typical point memory 203 through the first latch circuit 202. The data accommodated in the typical point memory 203 is read out delayed one field and sent to the absolute value calculator 206 through the second latch circuit 204. The data of the video signal of the present field, on the other hand, is sent out to the absolute value calculator 206 through the third latch circuit 205.

The typical point signal for one preceding field outputted from the second latch circuit 204 and the picture element signal of the present field produced from the third latch circuit 205 are processed in the absolute value calculator 206 to calculate the absolute value of the difference therebetween. These calculations are performed by block, and the output signals h of the absolute value calculator 206 are added successively to the table corresponding to the same address of the picture element in each block of the cumulative adder 207. The result of addition in the table is applied to the motion vector determiner 206, and finally, a motion vector value, i.e., the amount and direction in which the image position has moved in a field with a block address having a minimum sum are determined.

More specifically, the absolute value of the difference between the typical point Rij and the signal Sij (x, y) in horizontal direction X and vertical direction y is determined, and addition is made for x, y in the same positional relation of each typical point. A cumulative addition table Dxy is thus determined as shown by the equation below.

$$Dxy = \Sigma |Rij - Sij(x,y)|$$

The (x, y) associated with the minimum value of Dxy is determined as a motion vector for horizontal and vertical directions.

The above-mentioned operation of circuit elements is controlled by the control signal from the address controller 201. In the case where the input image contains a time-base error, the operation with a predetermined reference clock adversely affects the motion vector detection due to the change in the correlation between the typical point for each field and surrounding picture elements. According to the embodiment under consideration, the write clock WCKL is used as a reference clock for the operation of the image swing detection unit 167. The write clock WCLK changes at a timing according to the time-base error of the input video signal. Therefore, the sampling timing of the picture element also changes thereby to make the positional relation of picture elements in the screen substantially constant. As a result, the effect of the time-base error is eliminated.

The read memory controller 169 is adapted to control the field memories 164, 165, 166 in such a manner as to move the read position thereof in accordance with the output of the image swing detection unit 167, thereby stabilizing the image position in the read frame. This principle is similar to that of the prior art.

Figure 7:
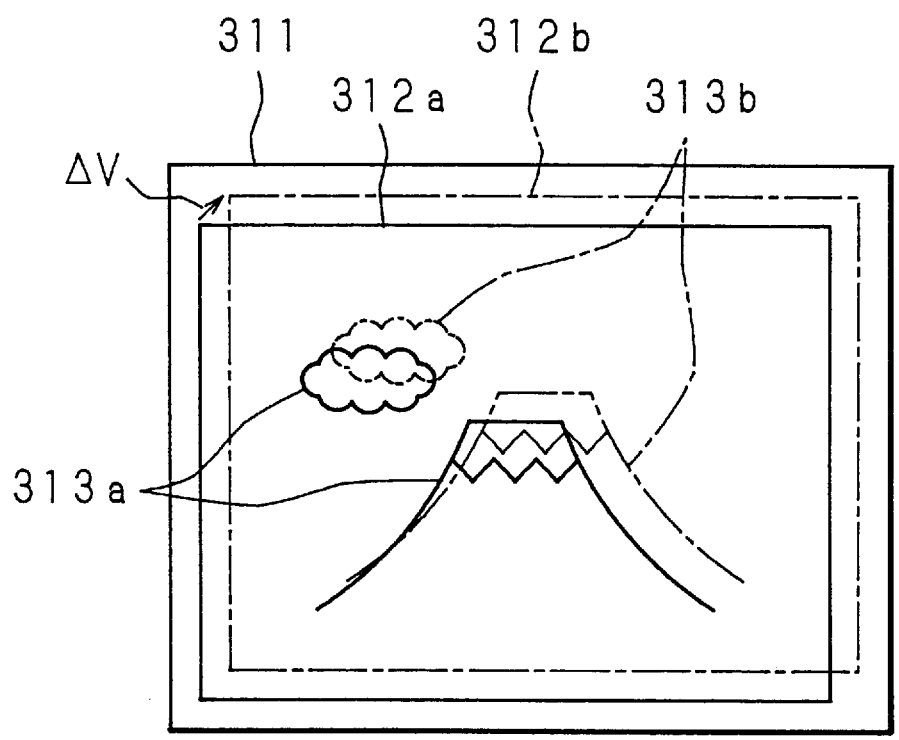
FIG. 7 is a diagram for explaining the principle of the image swing correction.
Figure 8:
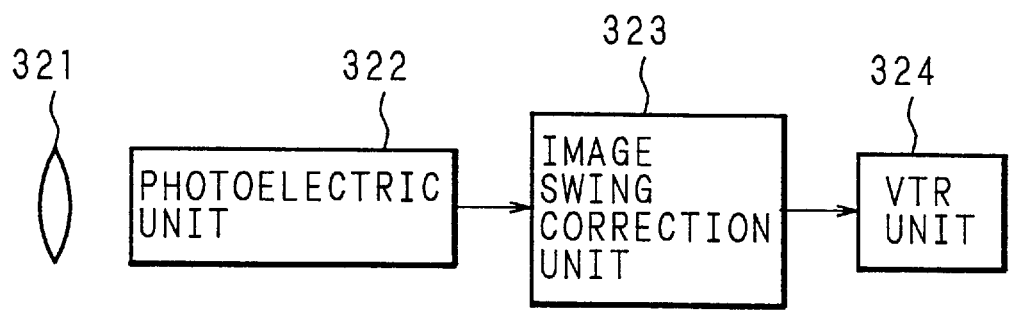
FIG. 8 is a block diagram showing the configuration of a conventional image swing correction system as built in a camcorder.

As shown in FIG. 7, a field of image constituted by the output signals of the field memories 164, 165, 166 is smaller than the effective screen size of the one-field image configured of the input video signal for swing correcting operation. The screen is thus enlarged to the original size by the interpolation/enlargement circuits 170, 171, 172 and then converted into an analog signal by the D/A converters 173, 174, 175.

Further, the luminance signal component produced from the D/A converter 175, together with the read synchronizing signal RSYNC produced from the synchronizing signal generator 158 added thereto by the synchronizing signal adding circuit 176, is sent out to the luminance signal output terminal 179 and the Y/C mixer 180. The two types of color difference signal produced from the D/A converters 173, 174, after being converted into a chroma signal of NTSC standard at the parallel modulator 177, is sent out to the chroma signal output terminal 178 and the Y/C mixer 180. The Y/C mixer 180 mixes the luminance signal produced from the synchronizing signal adding circuit 176 with the chroma signal produced from the parallel modulator 177, and applies the resultant composite video signal to the composite video signal output terminal 181. The chroma signal output terminal 178, the luminance signal output terminal 179 and the composite video signal output terminal 181 providing a Y/C separate output are capable of producing a video signal with time-base error and image swing thereof corrected appropriately.

As described above, according to the 15th embodiment, the time-base error of the applied video signal is detected, and in accordance with the detection output, the write clock phase of the memory is adjusted. By reading the data with clocks of predetermined intervals, the time-base error of the video signal is corrected while at the same time detecting the swing of the whole image configured of the video signal. In accordance with the result of detection, the read position of the field memory is moved thereby to correct the swing of the whole image.

Also, since the image swing detection unit is constructed as shown in FIG. 42, the motion vector can be detected accurately without being affected by the time-base error of the video signal. Further, in view of the fact that the read clock for controlling the read phase of the field memory can be switched between the high-accuracy internally-generated clock and the clock associated with the average frequency of the write clock of the field memory depending on whether the reproduction VCR is capable of external synchronization or not, the write operation may not compete with the read operation in the field memory.

(16th Embodiment)

Figure 44:
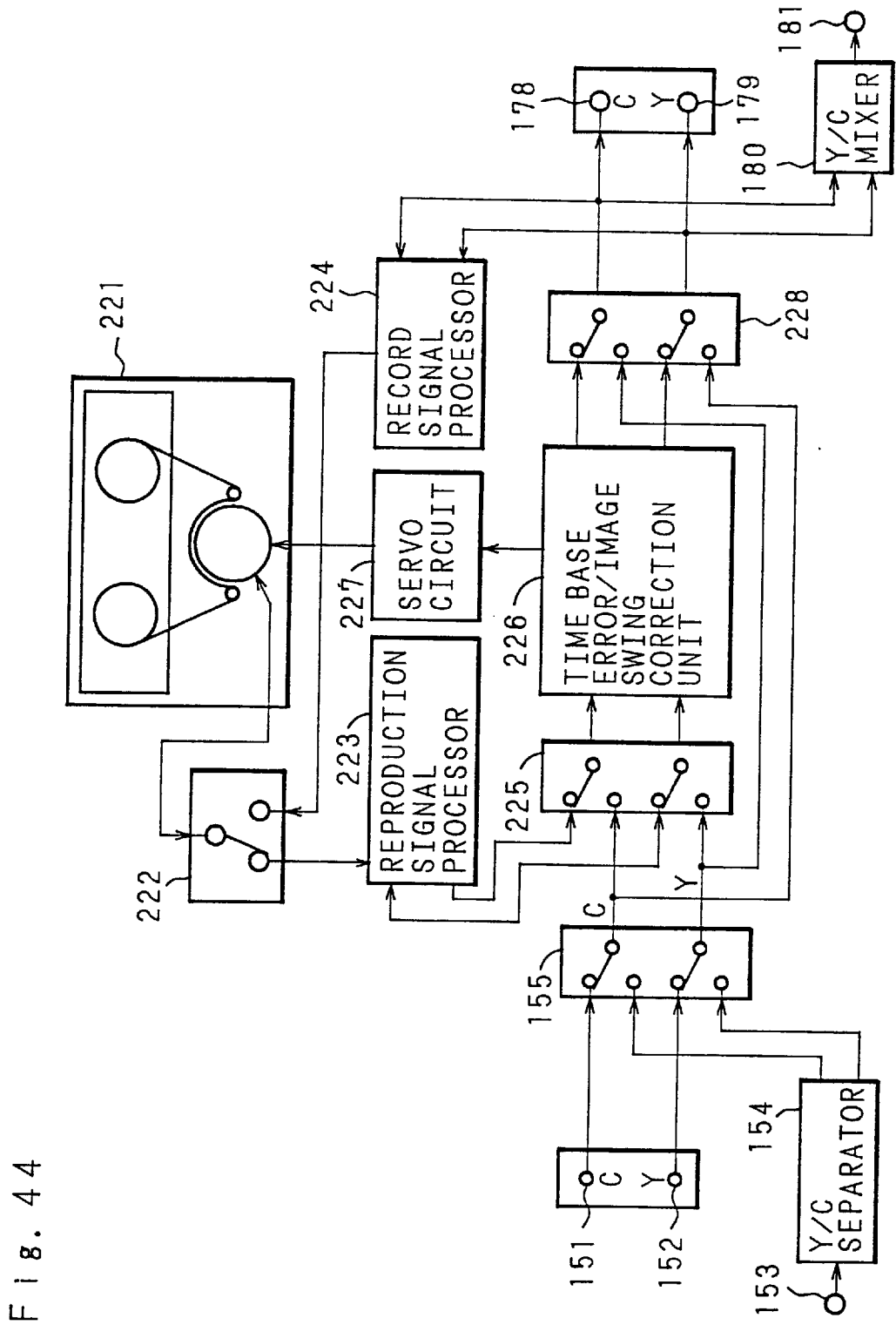
FIG. 44 is a block diagram showing an image swing correction apparatus according to a 16th embodiment of the invention.

Now, a 16th embodiment with an image swing correction apparatus built in the VCR will be described. FIG. 44 is a block diagram showing a general configuration of the 16th embodiment, in which the same reference numerals as those in FIG. 38 denote the same component parts respectively. In FIG. 44, numeral 221 designates an electromagnetic converter for recording an input electrical signal in magnetic tape as magnetic information while at the same time reproducing the magnetic information into an electrical signal, and numeral 222 a recording-reproduction signal change-over switch for selecting a recording signal or a reproduction signal and applies it to the electromagnetic converter 221.

Numeral 223 designates a reproduction signal processor for producing a video signal of NTSC standard from the output signal of the electromagnetic converter 221, numeral 224 a record signal processor for processing the video signal of NTSC standard to produce a recording signal of VHS format and applying the recording signal through the recording-reproduction signal change-over switch 222 to the electromagnetic converter 221, and numeral 225 a correction input signal selection switch for selecting and producing one of the video signals outputted from the reproduction signal processor 223 and the input change-over switch 155.

Further, numeral 226 designates a time base error/image swing correction unit for correcting the time-base error and the image swing of the image selected by the correction input signal selection switch 225, numeral 227 a servo circuit for controlling the electromagnetic converter 221 on the basis of the reference synchronizing signal produced from the time base error/image swing correction unit 226, and numeral 228 an output signal selection switch for selecting the output signals of the time base error/image swing correction unit 226 and the input change-over switch 155 and applying the resultant signal to the record signal processor 224.

Figure 45:
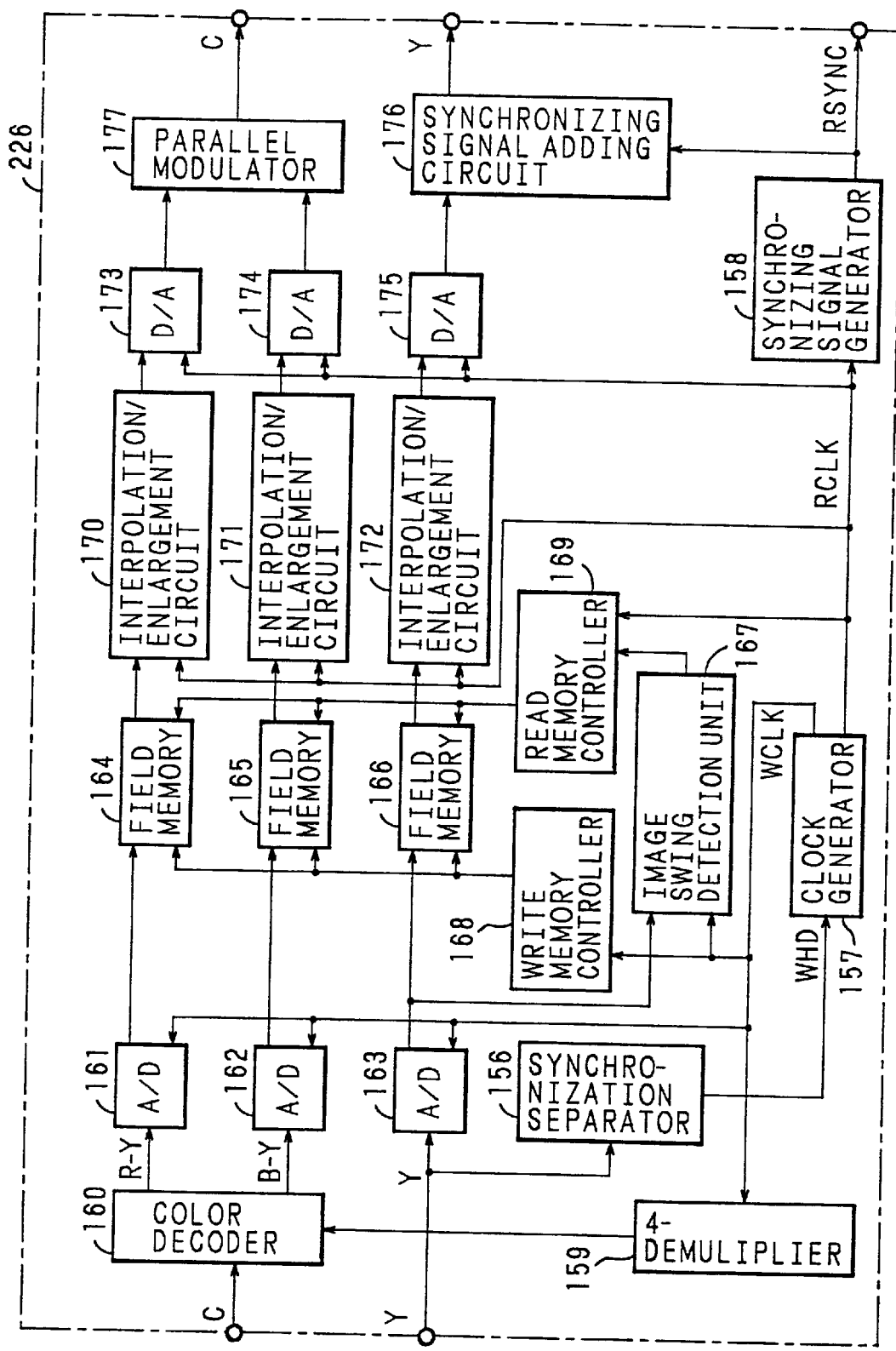
FIG. 45 is a block diagram showing a time-base correction and image swing correction unit according to the 16th embodiment.

FIG. 45 is a block diagram showing a configuration of the time base error/image swing correction unit 226. In FIG. 45, the same component parts are designated by the same reference numerals as the corresponding parts of FIG. 38 respectively. These parts operate exactly the same way and therefore will not be explained again.

Now, the operation will be explained. The system shown in FIG. 44 has two operation modes including reproduction and recording. First, reference is had to the reproduction mode. In reproduction mode, the recording-reproduction change-over switch 222 connects the electromagnetic converter 221 and the reproduction signal processor 223, and the correction input signal selection switch 225 connects the reproduced signal processor 223 and the time base error/image swing correction unit 226. Also, a clock having a frequency of 4 fsc with crystal accuracy is produced as a read clock RCLK produced by the clock generator 15 as in tile case where the reproduction VCR explained in the 15th embodiment accepts the external synchronization. The signal read from the magnetic tape of the electromagnetic converter 221 is converted into the luminance signal and the chroma signal at the reproduction signal processor 223. The output of the reproduction signal processor 223 is applied through the correction input signal selection switch 225 to the time base error/image swing correction unit 226. The time base error/image swing correction unit 226 corrects the time-base error and image swing of the video signal produced from the correction input signal selection switch 225, while at the same time generating a read synchronizing signal RSYNC and applying the same signal to the servo circuit 227. In the process, since the read operation of the field memories 164, 165, 166 in the time base error/image swing correction unit 226 is performed with reference to the 4 fsc clock of crystal accuracy, an output video signal high in time-base accuracy is produced.

The servo circuit 227 controls the reproducing operation of the electromagnetic converter 221 in accordance with the read synchronizing signal RSYNC. The read synchronizing signal RSYNC is generated on the basis of the read clock RCLK of the field memories 164, 165, 166 in the time base error/image swing correction unit 226. The reproducing operation of the electromagnetic converter 221 and the read operation of the field memories 164, 165, 166 are performed in synchronism with each other. The video signal produced from the time base error/image swing correction unit 226 is applied through the output signal selection switch 228 to the output terminals 178, 179 and the Y/C mixer 180. The Y/C mixer 180 mixes the chroma signal and the luminance signal produced from the output selection switch 228 and applies it to the output terminal 181.

In reproduction mode, the time-base error and image swing of the video signal reproduced on its own can be corrected in the above-mentioned manner, and therefore a stabilized video signal can be produced to the video signal monitor and the recording VCR.

Now, the recording mode will be explained. In the case where the VCR providing a signal source is an ordinary home-use VCR, it is common practice not to subject the reproduced video signal to time base correction. It is possible, however, to eliminate the time-base error of a recorded image beforehand by using the apparatus according to the 16th embodiment as a recorder for compilation.

In recording mode, the recording-reproduction signal selection switch 222 connects the electromagnetic converter 221 and the record signal processor 224 to each other, while the correction input selection switch 225 connects the input change-over switch 155 and the time base error/image swing correction unit 226 to each other. Also, a clock having an average frequency of the write clock WCLK is produced as a read clock RCLK produced from the clock generator 157, as in the case where the reproduction VCR is incapable of external synchronization as explained in the 15th embodiment The video signal from the VCR providing a signal source is applied to the input terminals 151, 152 or the input terminal 153. The chroma signal and the luminance signal applied to the input terminals 151, 152 or the chroma signal and luminance signal separated at the Y/C separator 154 are selected at the input change-over switch 155.

The chroma signal and the luminance signal selected at the input change-over switch 155 are applied through the correction input signal selection switch 225 to the time base error/image swing correction unit 226 thereby to correct the time-base error and image swing appropriately. The output signal of the time base error/image swing correction unit 226 is applied to the record signal processor 224 through the output signal selection switch 228 and is converted into a record signal of VHS standard. The output signal of the record signal processor 224 is applied to the electromagnetic converter 221 and is recorded in the magnetic tape. Also, since the recording operation of the electromagnetic converter 221 is controlled by the servo circuit 227 on the basis of the read synchronizing signal RSYNC produced from the time base error/image swing correction unit 226, competition between the read operation of the field memories of the time base error/image swing correction unit 226 and the recording operation of the electromagnetic converter 221 is eliminated.

In recording mode, as described above the time-base error and image swing of the video signal applied from an external circuit are corrected for recording purposes.

Although the read clock WCLK is generated with reference to a synchronizing signal of the input video signal as a reference according to the 15th and 16th embodiments, the burst signal or other reference signals may alternatively be used with equal effect. Also, in spite of the fact that the image swing detection unit uses a motion vector detector according to the typical point matching method, the invention is not limited to such a configuration, but may comprise other motion vector detectors such as gradient or Fourier transform. Further, the invention is not confined to the video signal of NTSC standard, but other standards such as PAL or SECAM are also applicable. The video signal recording-reproducing apparatus, which is a VCR of VHS standard according to the embodiments described above, is not limited to such standards but other systems including an optical disk or VCR of β or 8 mm or other appropriate standards are equally usable. Furthermore, unlike in the aforementioned embodiments in which the video signal is processed as a luminance signal and color difference signals (R-Y, B-Y), the invention is not limited to such a condition but RGB, Y/C separate and Y/C composite are some of other conditions applicable according to the invention.

As a consequence, according to the 16th embodiment, the reproducing operation of the VCR is controlled with reference to a read clock produced from a clock generator, whereby the reproducing operation of VCR is synchronized with the read operation of a field memory, while producing an output video signal having a time base accuracy based on a high-accuracy internal clock.

As this invention may be embodied in several forms without departing from the spirit of essential characteristics thereof, the present embodiment is illustrative and not restrictive, since the scope of the invention is defined by the appended claims rather than by the description preceding them, and all changes that fall within metes and bounds of the claims, or equivalence of such metes and bounds thereof are therefore intended to be embraced by the claims

What is claimed is:

1. An image pick-up apparatus comprising:
    optical zoom means for performing optical zoom; electronic zoom means for receiving an image of a digital video signal prior to enlargement and for enlarging the image of the digital video signal;

facial image detection means for detecting a human face area from the digital video signal;

zoom control means for controlling said optical zoom means and said electronic zoom means based on a position and size of the face area; and means for determining from which portion of the digital video signal prior to enlargement, the image of the digital video signal enlarged is located and for displaying the image of the digital video signal prior to enlargement, received by said electronic zoom means and the image of the digital video signal enlarged by said electronic zoom means.

2. The image pick-up apparatus of claim 1, further comprising:

object detection means for detecting an object in any area of the digital video signal; and focus control means for controlling said optical zoom means to focus said image pick-up apparatus on the object in any area of the digital video signal.

3. The image pick-up apparatus of claim 2, wherein the object in any area of the digital video signal is not near a center of the digital video signal.

4. The image pick-up apparatus of claim 2, further comprising:

a focus detector circuit for focusing on the object detected by said object detection means and outputting a focus command;

a focus lens; and a focus lens control circuit for moving said focus lens in accordance with the focus command from said focus detector circuit.

* * * * *